US008219423B2

(12) United States Patent
Hersch

(10) Patent No.: US 8,219,423 B2
(45) Date of Patent: Jul. 10, 2012

(54) TRANSFERRING INSURANCE POLICIES

(75) Inventor: Stuart Hersch, New York, NY (US)

(73) Assignee: CFPH, LLC, New York, NY (US)

( * ) Notice: Subject to any disclaimer, the term of this patent is extended or adjusted under 35 U.S.C. 154(b) by 697 days.

(21) Appl. No.: 12/118,597

(22) Filed: May 9, 2008

(65) Prior Publication Data

US 2009/0281840 A1    Nov. 12, 2009

(51) Int. Cl.
*G06Q 40/00* (2012.01)
(52) U.S. Cl. ............................. 705/4; 705/35; 705/37
(58) Field of Classification Search ................ 705/4, 35, 705/37
See application file for complete search history.

(56) References Cited

U.S. PATENT DOCUMENTS

| | | | |
|---|---|---|---|
| 4,969,094 A | 11/1990 | Halley et al. | |
| 5,673,402 A | 9/1997 | Ryan et al. | |
| 5,926,800 A * | 7/1999 | Baronowski et al. | 705/35 |
| 5,999,917 A | 12/1999 | Facciani et al. | |
| 6,219,651 B1 | 4/2001 | Bublitz et al. | |
| 6,473,737 B2 | 10/2002 | Burke | |
| 6,684,189 B1 | 1/2004 | Ryan et al. | |
| 6,684,190 B1 | 1/2004 | Powers et al. | |
| 6,693,651 B2 * | 2/2004 | Biebesheimer et al. | 715/837 |
| 7,081,091 B2 | 7/2006 | Merrett et al. | |
| 7,519,552 B2 | 4/2009 | Phelps | |
| 7,529,760 B2 * | 5/2009 | Jennery | 1/1 |
| 7,734,484 B2 | 6/2010 | Lutnick et al. | |
| 7,742,966 B2 * | 6/2010 | Erlanger | 705/37 |
| 2001/0011223 A1 | 8/2001 | Burke | |
| 2002/0042770 A1 | 4/2002 | Slyke et al. | |
| 2002/0072975 A1 * | 6/2002 | Steele et al. | 705/14 |
| 2002/0087534 A1 | 7/2002 | Blackman et al. | |
| 2002/0111896 A1 | 8/2002 | Ben-Levy et al. | |
| 2002/0116231 A1 | 8/2002 | Hele et al. | |
| 2003/0110061 A1 | 6/2003 | Lakenbach et al. | |
| 2003/0125992 A1 | 7/2003 | Rogers et al. | |
| 2003/0220867 A1 * | 11/2003 | Goodwin et al. | 705/37 |
| 2004/0044609 A1 | 3/2004 | Moore | |

(Continued)

FOREIGN PATENT DOCUMENTS

JP        2004-265076        9/2004

(Continued)

OTHER PUBLICATIONS

Analyzing an Emerging Industry: Viatical Transactions and the Secondary Market for Life Insurance Policies; Joseph Giacalone; Southern Business Review; 2001; 7 pages.*

(Continued)

*Primary Examiner* — Gregory Johnson
(74) *Attorney, Agent, or Firm* — Glen R. Farbanish

(57) ABSTRACT

A server may receive from a trading system information on an insurance policy, in which the information may include privacy related information. The server may compare the privacy related information to at least one predefined characteristic and determine that there is a match between the privacy related information and the characteristic. Based at least in part on there being a match, the server may filter-out the insurance policy such that the information on the insurance policy is not provided to a workstation in use by a participant. Alternatively, the server may determine that there is not a match between the privacy related information and the characteristic and provide the information, minus the privacy related information, to the workstation.

20 Claims, 9 Drawing Sheets

U.S. PATENT DOCUMENTS

| | | | | |
|---|---|---|---|---|
| 2004/0059646 | A1 | 3/2004 | Harrington et al. | |
| 2004/0064334 | A1* | 4/2004 | Nye | 705/1 |
| 2004/0064391 | A1* | 4/2004 | Lange | 705/36 |
| 2004/0098327 | A1 | 5/2004 | Seaman | |
| 2004/0177021 | A1 | 9/2004 | Carlson et al. | |
| 2004/0267647 | A1* | 12/2004 | Brisbois | 705/35 |
| 2005/0027626 | A1 | 2/2005 | Garcia | |
| 2005/0125261 | A1* | 6/2005 | Adegan | 705/4 |
| 2005/0177473 | A1 | 8/2005 | Angle | |
| 2005/0182670 | A1* | 8/2005 | Burgess | 705/4 |
| 2005/0187869 | A1* | 8/2005 | Buerger | 705/39 |
| 2005/0192849 | A1* | 9/2005 | Spalding | 705/4 |
| 2005/0197857 | A1 | 9/2005 | Avery | |
| 2005/0210048 | A1 | 9/2005 | Beres et al. | |
| 2005/0246267 | A1 | 11/2005 | Nichols | |
| 2005/0273423 | A1* | 12/2005 | Kiai et al. | 705/38 |
| 2006/0031151 | A1* | 2/2006 | Dorr | 705/37 |
| 2006/0122871 | A1 | 6/2006 | Cowley et al. | |
| 2006/0178979 | A1* | 8/2006 | Levine et al. | 705/37 |
| 2006/0206438 | A1 | 9/2006 | Sakaue et al. | |
| 2006/0287893 | A1* | 12/2006 | Weiss et al. | 705/4 |
| 2006/0287894 | A1 | 12/2006 | Weiss et al. | |
| 2006/0293990 | A1 | 12/2006 | Schaub | |
| 2006/0293992 | A1* | 12/2006 | Blair | 705/35 |
| 2006/0294002 | A1 | 12/2006 | Brett | |
| 2007/0050217 | A1 | 3/2007 | Holden | |
| 2007/0226015 | A1 | 9/2007 | Lutnick et al. | |
| 2007/0299760 | A1 | 12/2007 | Lange et al. | |
| 2008/0104021 | A1* | 5/2008 | Cai et al. | 707/3 |
| 2008/0177582 | A1* | 7/2008 | O'Brien et al. | 705/4 |
| 2008/0183507 | A1 | 7/2008 | Lutnick et al. | |
| 2009/0048961 | A1* | 2/2009 | Mott | 705/37 |
| 2009/0164257 | A1* | 6/2009 | Ramsden et al. | 705/4 |
| 2009/0192832 | A1 | 7/2009 | Phelps | |
| 2009/0204442 | A1* | 8/2009 | Logsdon et al. | 705/4 |
| 2009/0204446 | A1* | 8/2009 | Simon et al. | 705/4 |
| 2009/0271284 | A1* | 10/2009 | Arbib | 705/26 |
| 2010/0211405 | A1 | 8/2010 | Lutnick et al. | |

FOREIGN PATENT DOCUMENTS

| | | |
|---|---|---|
| JP | 2004-310761 | 11/2004 |
| WO | WO 2007/047605 | 4/2007 |

OTHER PUBLICATIONS

Viatical and Life Settlement Transactions; J Belth; Contingencies. org; Mar./Apr., 2002; 4-pages.*

An Introduction to the Use of Viatical and Life Settlements; Damien Rios; 13-pages.*

"Purchasing of life insurance by cancer patient; venture company; the first in Japan; name change; refused by insurance company; the patient side to file a suit in the near future", Tokyo Shimbun, Feb. 7, 2005 (p. 1, front—in Japanese).

* cited by examiner

Advanced Search Criteria
                                    202
UPID:     LK - 888896789

Total Results(s): 1

UPID      206      208         210    212    214        216
                 Policy   State of            Age    Face      Auction              Status
                 Type    Residence   Gender          Value     Duration
                                                                                                222
(Hide)  LK-888896789 ● Whole   AK      Male   50    $700,000  0dd: 0hr:  Submitted (Related Policies)
                       Life                   Yrs.            0min                   [Watch]
         204a    302

204

[BACK]

| Watch | | | | |
|---|---|---|---|---|
| Policy Information | UPID: LK-888896789 | Type of Sale: Primary | Related Policies | Chain of Custody |
| | Policy Type: Whole Life | | | |
| | Face Value: $700,000 | Cash Surrender Value: $70,000 | Current Face Amount: $660,000 | |
| | Insurance Company / S&P Rating: AAA Life Insurance Company, A- | | | |
| | Has a Withdrawal of Face Amount Been Taken? Yes | Amount Withdrawn: $40,000 | | |
| | Account Value: $40,000 | Death Benefit $40,000 | | |
| | Annual Premium: $40,000 | Next Premium Due Date: Jan. 01, 2008 | | |
| | Premium Frequency: Annually | State of Issue: Alabama | | |
| | Policy Issue Date: Jan. 01, 1925 | Policy Date: Jan. 01, 1929 | | |
| | Is there a Loan Against the Policy? Yes | Loan Amount: $40,000 | Interest Rate: 4.0% | |
| Primary Insured Information | | | | |
| | Date of Birth: Jan. 1958 | Age: 50 yrs and 4 mo | | |
| | Domicile State: AK | Country: United States | | |
| | Gender: Male | | | |
| | Impairments: ALS, Alzheimer's, Breast Cancer, Build / Overweight, Cancer | | | |

| Owner Information | | | |
|---|---|---|---|
| Type of Owner: | Individual | Domicile State: | Alabama |

| Insurable Interest and Premium Finance | | |
|---|---|---|
| Has or will the original insured receive any remuneration for securing the policy?: | Yes | See Insurable Interest and Premium Finance questionnaire in Policy Documents for Details |
| Since inception of the policy, were the premiums or any portion thereof, financed by a 3rd party?: | Yes | |

| Transaction Fees | | | |
|---|---|---|---|
| Broker Commission: N/A | Marketplace fee: See Fee Schedule | Additional Expenses: | $4,500 |
| | | Amount | Type |
| | | $4,500 | Support |

| Auction Information | | | |
|---|---|---|---|
| Starting Bid: $70,000 | Bid Increment: $5,000 | Trade it Now Price: N/A | |
| Reason Auction is Still Pending: Auction Pending Review by Marketplace Administrator | | | |

| Policy Documents | | | | | | |
|---|---|---|---|---|---|---|
| | No. | Document Type | File | No. | Document Type | File |
| | 1 | Life Settlement Questionnaire | Not Submitted | 11 | LE (Fasano) | Not Submitted |
| | 2 | Policy, including beneficiary designations | Not Submitted | 12 | LE (21st) | Not Submitted |
| | 3 | Policy Application | Not Submitted | 13 | LE (ISC) | Not Submitted |
| | 4 | In Force Illustration Level to 100 | Not Submitted | 14 | LE (MidWest) | Not Submitted |
| | 5 | Verification of Coverage (VOC) | Not Submitted | 15 | Beneficiary Releases | Not Submitted |
| | | | | 16 | Background Release | Not Submitted |
| | | | | 17 | Disclosure of Authorization of UPI | Not Submitted |

Scheduled Auction Date: N/A

FIGURE 3B

Advanced Search Criteria

Age: =79

Total Search Result(s): 105

| UPID | Policy Type | State of Residence | Gender | Age | Face Value | Auction Duration | Status | | |
|---|---|---|---|---|---|---|---|---|---|
| LK-HHHHD6789 | Universal Life | AK | Male | 79 yrs. | $500,000 | N/A | N/A | Related Policies | Watch |
| LK-KKKKE6789-TTTQ • | Whole Life | AK | Male | 79 yrs. | $600,000 | 60dd:0hr:0min | Auction Scheduled Apr 26 | | |
| LK-0B0006789-FFFH | Whole Life | AK | Male | 79 yrs. | $500,000 | N/A | N/A | | |
| LK-SSSSI6789 | Universal Life (converted Term) | AK | Male | 79 yrs. | $600,000 | 0dd:0hr:0min | Submitted | | |
| LK-DDDDH6789-TTTQ | Whole Life | AK | Male | 79 yrs. | $600,000 | N/A | N/A | Related Policies | Watch |
| LK-MMMP6789-TTTQ | Universal Life (converted Term) | AK | Male | 79 yrs. | $500,000 | N/A | N/A | | |
| LK-RRRRM6789-TTTQ | Universal Life (converted Term) | AK | Male | 79 yrs. | $600,000 | N/A | N/A | | |
| LK-4444A6789-000A | Universal Life (converted Term) | AK | Male | 79 yrs. | $600,000 | N/A | N/A | Related Policies | Watch |
| LK-SSSSR6789 • | Whole Life | AK | Male | 79 yrs. | $800,000 | 0dd:0hr:0min | Submitted | Related Policies | Watch |
| LK-VVVVB6789 | Universal Life (converted Term) | AK | Male | 79 yrs. | $700,000 | 0dd:0hr:0min | Submitted | Related Policies | |
| LK-FFFFN6789 • | Whole Life | AK | Male | 79 yrs. | $500,000 | . | . | Related Policies | |
| LK-090006789 | Universal Life (converted Term) | AK | Male | 79 yrs. | $400,000 | . | . | Related Policies | |
| LK-RRRRN6789 | Universal Life (converted Term) | AK | Male | 79 yrs. | $450,000 | . | . | Related Policies | |
| LK-LLLLW6789 | Universal Life (converted Term) | AK | Male | 79 yrs. | $650,000 | 0dd:0hr:0min | Submitted | Related Policies | Watch |

Current UPID

| | |
|---|---|
| 204 — UPID: | LK-888896789 ● |
| 206 — Policy Type: | Whole Life | 208 — State of Residence: | AK |
| 210 — Gender: | Male | 212 — Age: | 50 yrs. |
| 214 — Face Value: | $700,000 | 218 — Insurance Company/S&P Rating: | AAA Life Insurance Company/A- |
| 216 — Status: | Submitted | | |

Associated UPID(s)

30 Sec Auto Refresh  ☐ Refresh  ⟳

| No. | 204 UPID 204a | 206 Policy Type | 208 State of Residence | 210 Gender | 212 Age | 214 Face Value | 218 Insurance Company/ S&P Rating | 216 Status |
|---|---|---|---|---|---|---|---|---|
| 1 | LK-0D0006789 ● 302 | Second to Die (Joint) Universal Life, 2 Living | AK | Male | 80 yrs. | $500,000 | AAA Life Insurance Company/A- | -- |
| 2 | LK-DDDN6789 ● | Second to Die (Joint) Universal Life, 1 Living | AK | Male | 108 yrs. | $650,000 | AAA Life Insurance Company/A- | 38 days 13 hrs left |
| 3 | LK-4444T6789 ● | Whole Life | AK | Male | 80 yrs. | $800,000 | AAA Life Insurance Company/A- | Auction Scheduled for Apr 24 |
| 4 | LK-KKKKE6789 ● | Whole Life | AK | Male | 79 yrs. | $600,000 | AAA Life Insurance Company/A- | Auction Scheduled for Apr 26 |
| 5 | LK-SSSSI6789 ● | Universal Life | AK | Male | 79 yrs. | $600,000 | AAA Life Insurance Company/A- | Submitted |
| 6 | LK-EEEEI6789 ● | Whole Life | AK | Male | 80 yrs. | $500,000 | AAA Life Insurance Company/A- | -- |

FIGURE 6A

| | | | | | | |
|---|---|---|---|---|---|---|
| 7 | LK-0A0006789 • | Universal Life | AK | Male | 50 yrs. | $400,000 | AAA Life Insurance Company/A- | -- |
| 8 | LK-TTTTK6789 • | Universal Life | AK | Male | 50 yrs. | $700,000 | AAA Life Insurance Company/A- | Submitted |
| 9 | LK-8888G6789 | Universal Life | KS | Male | 88 yrs. | $200,000 | Acacia Life/A | -- |
| 10 | LK-CCCCZ6789 | Universal Life | UT | Male | 36 yrs. | $1,000,000 | American General Life Insurance Company/A++ | Submitted |
| 11 | LK-SSSSR6789 • | Whole Life | AK | Male | 79 yrs. | $800,000 | AAA Life Insurance Company/A- | Submitted |
| 12 | LK-1111F6789 | Universal Life (Converted Term) | AK | Male | 80 yrs. | $600,000 | AAA Life Insurance Company/A- | Submitted |
| 13 | LK-VVVVB6789 | Universal Life (Converted Term) | AK | Male | 79 yrs. | $700,000 | AAA Life Insurance Company/A- | Submitted |
| 14 | LK-FFFFN6789 • | Whole Life | AK | Male | 79 yrs. | $500,000 | AAA Life Insurance Company/A- | -- |
| 15 | LK-090006789 | Universal Life | AK | Male | 79 yrs. | $400,000 | AAA Life Insurance Company/A- | -- |

TRANSFERRING INSURANCE POLICIES

BACKGROUND

This application relates to transfer systems and in particular, to the transferring of insurance policies.

BRIEF DESCRIPTION OF THE FIGURES

FIG. 2 shows an example graphical display/interface according to an embodiment of the invention.

FIG. 3A and FIG. 3B show another example graphical display/interface according to an embodiment of the invention.

FIG. 4 shows a further example graphical display/interface according to an embodiment of the invention.

FIG. 6A and FIG. 6B show a further example graphical display/interface according to an embodiment of the invention.

SUMMARY OF THE INVENTION

Figure 1:
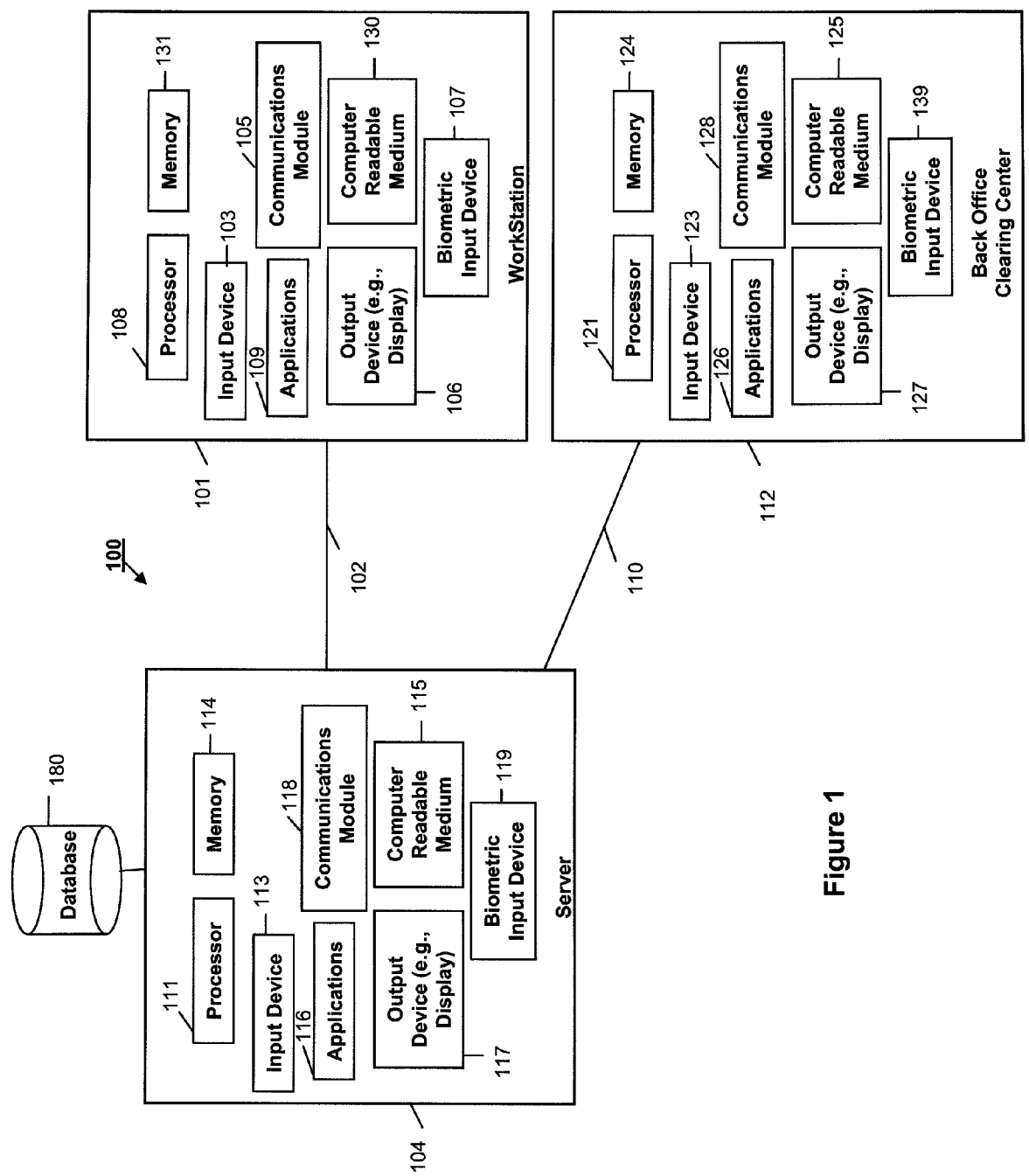
FIG. 1 shows an auction/trading system according to an embodiment of the invention.

According to an embodiment of the invention, an apparatus may include at least one computing device having instructions associated therewith that when executed by the at least one computing device make the at least one computing device operable to: receive from a participant a request to obtain information on insurance policies that match at least one criteria; forward the request to a server; receive from the server information on at least one insurance policy that matched the at least one criteria, in which the information on the at least one insurance policy may include first information and second information; compare the second information on the at least one insurance policy to at least one predefined characteristic; determine that there is a match between the second information and the at least one predefined characteristic; based at least in part on determining that there is the match between the second information and the at least one predefined characteristic, filter-out the at least one insurance policy such that the information on the at least one insurance policy is not provided to the participant; determine that there is not a match between the second information and the at least one predefined characteristic; and based at least in part on determining that there is not the match between the second information and the at least one predefined characteristic, provide the first information but not the second information on the at least one insurance policy to the participant.

In one aspect, the at least one predefined characteristic may include an identity of a possible insured, and in which to determine that there is the match between the second information and the at least one predefined characteristic may include to determine that an insured of the at least one insurance policy matches the identity of the possible insured. In another aspect, the at least one predefined characteristic may include an identity of a possible owner of insurance policies, and in which to determine that there is a match between the second information and the at least one predefined characteristic may include to determine that an owner of the at least one insurance policy matches the identity of the possible owner of insurance policies. In a further aspect, the at least one predefined characteristic may include an identity of an individual, and in which to determine that there is a match between the second information and the at least one predefined characteristic may include to determine that an insured of the at least one insurance policy is related to the individual.

In one aspect, the first information may include information accessible to the participant even though the participant may not own the at least one insurance policy, and the second information may include information not accessible to the participant unless the participant owns the at least one insurance policy.

According to an embodiment of the invention, an apparatus may include at least one computing device having instructions associated therewith that when executed by the at least one computing device make the at least one computing device operable to: receive from a server information on at least one insurance policy, in which the information on the at least one insurance policy may include first information and second information; compare the second information on the at least one insurance policy to at least one predefined characteristic; determine that there is a match between the second information and the at least one predefined characteristic; based at least in part on determining that there is the match between the second information and the at least one predefined characteristic, filter-out the at least one insurance policy such that the information on the at least one insurance policy is not communicated to a workstation in use by a participant; determine that there is not a match between the second information and the at least one predefined characteristic; and based at least in part on determining that there is not the match between the second information and the at least one predefined characteristic, communicate the first information but not the second information to the workstation.

DETAILED DESCRIPTION OF THE INVENTION

A life insurance policy is a contract in which an issuer/insurance company may agree to make a monetary payment(s) (e.g., a death benefit or insurance proceeds) to a designated beneficiary(s) upon the death of a person(s) named in the policy (i.e., the insured), which person may or may not also be the policy owner/holder. In exchange, the policy owner may pay a regularly scheduled fee/payment (e.g., a premium payment) to the insurance company. When the insured dies, the insurance company may pay the death benefit to the beneficiary(s).

As used herein, the term insurance company(s) may refer to any entity(s) that issues any insurance policy. Such an entity may, for example, set certain guidelines for the payment terms of premiums.

Accordingly, a life insurance policy may include one or more of several features, including:
1. A death benefit (e.g., a predetermined amount of payment such as $1,000,000);
2. A beneficiary, which may be a person and/or entity that is entitled to receive the death benefit;
3. An insured individual upon whose death the death benefit is payable to the beneficiary;
4. A policy owner or holder, which may be a person or entity and which may or may not be the insured individual; and
5. A premium payment, which is a payment amount the policy owner may be obligated to pay (e.g., periodically) to the insurance company during a period of insurance coverage in exchange for the right to have the death benefit paid to the beneficiary.

One skilled in the art will recognize that a life insurance policy may include various other features and structures than those discussed above. For example, a life insurance policy may include an investment/savings component (e.g., a cash value account), which accumulates a cash value over time. The policy owner may be able to access the cash value by making withdrawals from the cash value or borrowing against the cash value. The policy owner may also be able to access the cash value by terminating the life insurance policy (e.g., ending the period of insurance coverage, ending the obligation to have payments made, ending the right to have the death benefit paid to the beneficiary). The amount paid to the policy owner for terminating the life insurance policy may be referred to as the cash surrender value, which may be the cash value or a value less than the cash value (e.g., due to surrender charges, due to the policy owner having made withdrawals, etc).

Types of life insurance policies may include, for example, a term/temporary life insurance policy and a permanent life insurance policy, types of which may include, for example, a whole life insurance policy and a universal life insurance policy.

A term life insurance policy is a policy, for example, that provides a stated death benefit upon the death of the insured individual, provided that the death occurs within a specific time period (e.g., anytime before a predetermined date, anytime before the insured reaches a predetermined age, etc.). The policy may not provide any other returns (e.g., a savings component) beyond the stated death benefit.

A permanent life insurance policy is a policy, for example, that provides for insurance coverage for the life of the insured individual. Accordingly, under such a policy, upon the inevitable death of the insured individual a death benefit may be made to the policy's beneficiary(s). A permanent life insurance policy may also include an investment/savings component.

A policy owner, in various fashions, may terminate his interest in an insurance policy. For example, as discussed above, a life insurance policy may include a cash surrender value. When a policy includes such a feature, a policy owner may terminate the policy early (e.g., prior to the death of the insured individual) in exchange for the insurance company making a payment (e.g., the cash surrender value) to the policy owner. However, the true value of an insurance policy may not equate to the cash surrender value as set forth in the policy.

As an alternative to terminating the policy with the insurance company, a policy owner may also sell the insurance policy to a third party, which may be a person(s) and/or entity(s), for example, the policy owner and third party thereby entering into an agreement. Such a transaction may be referred to as a life settlement transaction and the agreement referred to as a life settlement agreement. Generally, in a life settlement transaction, the insured individual may not have a known life-threatening or terminal illness or condition. A particular form or subset of life settlements are viatical settlements. A viatical settlement transaction is the sale of a life insurance policy to a third party when the insured is terminally ill (e.g., having a life expectancy of less than two years). Hereinafter, the term life settlement/life settlement transaction/life settlement agreement will be used to refer to both life settlements and viatical settlements and more generally, to any other type of settlement regarding the sale, assignment, transfer, devise, lease, bequest, etc. of the ownership of and/or beneficial interest in, or any portion thereof, any insurance policy, possibly for compensation.

In particular, in a life settlement transaction the policy owner may transfer/sell, for example, an insurance policy to a third party in exchange for something of value, such as a monetary payment, from the third party. The third party may then become the new owner of, or gain entitlement to, the life insurance policy and in particular, may gain rights to the beneficial interest in the policy (e.g., the third party may become the beneficiary, although other structures may be used), collecting, for example, the entire death benefit of the policy upon the death of the insured individual. Accordingly, the third party may assume all the responsibilities set forth in the insurance policy for the "owner," including for example, being responsible for all future premium payments to the insurance company. Accordingly, when a life settlement transaction occurs, the insurance company is not relieved from its obligation to pay the death benefit to a beneficiary(s) upon the death of the insured individual.

In general, one or more brokers may facilitate (for a transaction fee, for example) the life settlement transaction between a policy owner and a third party purchaser.

As an example of a life settlement transaction between two parties/entities (e.g., a "Person A" such as a policy owner and a "Person B" such as a purchaser), Person A may apply with an insurance company for a policy to insure an insured individual (such as Person A). The insurance company may determine (e.g., based on the life expectancy of the insured individual) a monthly premium payment for the policy. In turn, the policy may designate a death benefit that is payable to a named beneficiary(s) upon the death of the insured individual. Assuming Person A purchases the policy, after a period of time Person A may decide to terminate or sell the policy prior to the death of the insured individual.

Assuming the policy includes a cash surrender value, the insurance company may make, for example, a monetary payment to Person A in accordance with the surrender value in exchange for Person A terminating the policy. Assuming Person A accepts the offer, the insurance company is relieved from its obligation to pay the death benefit to the beneficiary(s) upon the death of the insured individual.

As an alternative, Person A may decide to sell the insurance policy (or a portion thereof) to Person B, thereby entering into a life settlement agreement with Person B. Again, one or more brokers may facilitate the life settlement transaction between Person A and Person B. Here, Person B may offer to pay Person A a monetary sum, possibly greater than the cash surrender value, in exchange for becoming the policy owner and obtaining an interest in/right to the beneficial interest of the policy. If Person A accepts the offer, Person B may pay the monetary sum (possibly less any broker fees) to Person A. In turn, Person A may transfer ownership of the policy to Person B, for example, including assigning/transferring/changing, for example, the beneficial interest of the insurance policy to Person B, for example. Person B, in turn, may assume the responsibilities of Person A as set forth in the terms of the policy, including being obligated to pay any monthly premiums. Accordingly, the insurance company is not relieved from its obligation to pay the death benefit to the beneficiary(s) (here, Person B, for example) upon the death of the insured individual. In particular, upon the death of the insured individual, the insurance company may pay the death benefit to Person B, for example.

Assuming Person A and Person B enter into a life settlement agreement, the new policy owner, Person B, may further transfer/sell, for example, the life insurance policy (i.e., transfer/sell the life settlement contract), or a portion thereof, to another person(s)/entity(s), such as Person C. Again, one or more brokers may facilitate the sale of the life insurance policy between Person B and Person C. Here, Person C may offer to pay Person B a monetary sum (possibly greater than or less than the initial amount paid to Person A by Person B and/or possibly greater than the cash surrender value) in exchange for becoming the policy owner and obtaining an interest in/right to the beneficial interest of the policy. If Person B accepts the offer, Person C may pay the monetary sum (possibly less any broker fees) to Person B. In turn, Person B may transfer ownership of the policy to Person C, for example, including assigning/transferring/changing, for example, the beneficial interest of the insurance policy to Person C, for example. Person C, in turn, may assume the responsibilities of Person B, including being obligated to pay any monthly premiums to the insurance company. Accordingly, upon the death of the insured individual, the insurance company may pay the death benefit to Person C, for example. As one skilled in the art will recognize, Person C may then also resell the insurance policy prior to the death of the insured individual, etc.

According to embodiments of the invention, an electronic trading system may be provided that allows, for example, for the transferring (e.g., the trading, auctioning, assigning, buying/selling/reselling, etc.) of insurance policies. In particular, such a system may allow an original policy owner to initially transfer or sell a life insurance policy. Such a transfer may result in a life settlement agreement (or similarly, a viatical settlement agreement). Hereinafter, a policy that is being transferred or has been transferred for the first time may be referred to as a "life settlement policy" (again, which may include either a life settlement or viatical settlement) and such a transaction may be referred to as a "primary" or "first time" transaction, transfer, or sale, etc. Alternatively and/or in addition, such a system may allow a secondary or subsequent owner of a life insurance policy to retransfer or resell, for example, the insurance policy. Hereinafter, a policy that is being transferred or has been transferred at least a second time may be referred to as a "resale policy" and any such transaction may in general be referred to as a "secondary" transaction, transfer, or sale, etc. Hereinafter, reference to the transfer, transferring, sell, sale, selling, resell, reselling, buy, buying, assign, assigning, auctioning, purchase, purchasing, etc. of a "life insurance policy(s)", "insurance policy(s)", or "policy(s)" may refer to either the transferring of a life settlement policy(s), resale policy(s), or both and in addition, may generally refer to a transfer in ownership of and/or entitlement to a life insurance policy (or a portion thereof), and a transfer in an interest in/right to the beneficial interest of the policy (or a portion thereof). In addition, reference to the transfer or transferring of a life insurance policy may generally refer to any other type of transfer in ownership of and/or entitlement to the life insurance policy (or a portion thereof), and a transfer in an interest in/right to the beneficial interest of the policy (or a portion thereof), including a sale, purchase, assignment, devise, lease, bequest, etc.

As an example, U.S. patent application Ser. No. 11/613, 182 (U.S. Patent Application Publication No. 2007/0226015), filed Dec. 19, 2006, entitled "Products and Processes For Processing Information in a Market for Life Instruments," by Howard W. Lutnick and Stuart Hersch, and the contents of which are hereby incorporated by reference in their entirety, discloses an electronic trading system in which life settlement policies and resale polices may be transferred.

Referring now to FIG. 1 there is shown an electronic trading system 100 according to an embodiment of the invention for transferring life settlement policies and/or resale policies. In particular, system 100 may support the auctioning of life settlement and/or resale policies in which the owners of such policies may list these policies for sale via system 100 and in which potential buyers may bid on the listed policies via system 100. Nonetheless, one skilled in the art will recognize that system 100 may provide other formats including, for example, (a) a reverse auction format where a potential buyer of life insurance policies may specify criteria, for example, of a desired policy to purchase, and owners of life insurance policies may submit quotes at which they are willing to sell a policy that meets the criteria; (b) an advertising format where owners of life insurance policies may list policies for sale at set prices and where potential buyers may submit indications to purchase the policies at the set prices; (c) a bid/offer format where potential buyers and sellers of life insurance policies may submit bids/offers for policies and in which the system may auto-match bids/offers and/or in which buyers and sellers may submit hits/takes of the bids/offers, etc. Again, one skilled in the art will recognize that system 100 may support other formats for "transferring" life insurance policies. For purposes of description, system 100 will described as an auction system for the buying and selling of life insurance policies.

As shown in FIG. 1, system 100 may include at least one server 104, one of more workstations 101 connected to server 104 either directly or through a communications network 102, and a back office clearing center 112 connected to server 104 either directly or through a communications network 110. Server 104 may control/oversee the auctioning of insurance policies including, for example, 1. the receiving from insurance policy owners (initial and/or secondary), for example, insurance policies to be listed for auction;
2. the receiving from potential buyers of insurance policies bids on listed policies being auctioned;
3. the searching and sorting of insurance policies that will be auctioned, are currently being auctioned, and/or that have been auctioned;
4. the managing of and/or the providing of access to information related to insurance policies including, for example, insurance policies that will be auctioned, are currently being auctioned, and/or that have been auctioned;
5. the providing of status information (e.g., time left in the auction, etc.) on policies that are being auctioned;
6. the providing of status information on bids (e.g., current high bid, etc.) submitted on policies that are being auctioned; and
7. the processing of submitted bids to:
    a) determine winning/losing bids, for example, thereby transacting the purchase and sale of policies;
    b) determine policies that failed to sell (e.g., because a reserve price was not reached);
    c) provide confirmations to sellers and buyers when policies have sold and at what price, etc.; and
    d) provide notifications to sellers of policies that failed to sell and indications to potential buyers of losing bids.

Workstations 101 may provide users/participants (e.g., buyers and sellers of insurance policies) of system 100 access to the system and may, for example, allow participants to:

1. submit to server 104 life insurance polices (and information related thereto) to be listed for sale/auction;
2. cancel life insurance polices that have been be listed for sale/auction;
3. submit/modify/cancel bids on insurance policies that are or will be auctioned;
4. submit search and/or sort requests on insurance policies that will be auctioned, are currently being auctioned, and/or that have been auctioned;
5. request and/or review (e.g., through visual and/or audible output) information related to insurance policies including, for example, insurance policies that will be auctioned, are currently being auctioned, and/or that have been auctioned;

6. request and/or review (e.g., through visual and/or audible output) status information on policies that are being auctioned;
7. request and/or review (e.g., through visual and/or audible output) status information on bids submitted on policies that are being auctioned;
8. obtain confirmations on successfully sold and/or purchased policies and at what price; and
9. obtain notification on policies that failed to sell and/or on losing bids, etc.

Back office clearing center 112 may, at least in part, assist in, cause, and/or provide functions related to clearing a purchased policy once a winning bid has been determined and/or verifying that a purchased policy is cleared. The clearing of a purchased policy may include, for example, the receiving of monetary funds (e.g., equal to the winning bid amount) from the buyer of the insurance policy and the sending of such funds, at least in part, to the seller of the policy, for example, and/or the transferring of a portion of such funds to any brokers, for example, and/or to system 100 (e.g. a service fee). Similarly, the clearing of a purchased policy may include, for example, the transferring of monetary funds from an account of a buyer of the insurance policy to the account of the seller of the policy, for example, and/or the transferring of a portion of such funds to an account of any broker, for example, and/or to an account associated with system 100 (e.g. a service fee). Back office clearing center 112 may, at least in part, assist in receiving/sending/transferring of such funds. The clearing of a purchased policy may also include the preparation and/or execution of a life settlement agreement in the case of a first time sale of a policy and/or may include the preparation and/or execution of an agreement(s) for the transferring/changing of the ownership of the policy and/or the beneficial interest in the policy. Such agreements may involve the buyer, seller, and insurance company (e.g., the insurance company may need to be notified of any changes in ownership and the beneficiary). Back office clearing center 112 may, at least in part, assist in transferring and/or executing such agreements.

Server 104, workstations 101, and back off clearing center 112 may provide additional features and functions than those described above and as further discussed herein and alternatively, may not provide all the features and functions described above and as further discussed herein. In addition, various workstations within system 100, for example, may not all provide all the same features and functions.

One skilled in the art will recognize that while system 100 may be described above and further herein as having certain features and functions being performed by server 104, workstations 101, and back office clearing center 112, the disclosed features and functions may be performed by other elements of the system or combinations thereof. For example, functions/features that are described as being performed by back office clearing center 112 may at least in part be performed by server 104. Alternatively, system 100 may not include a back office clearing center 112 and all functions/features may be performed by, for example, server 104. As another example, functions/features that are described as being performed by server 104 may at least in part be performed by workstations 101, such as in the case of a partially distributed system. Alternatively, system 100 may not include a server 104 and all functions/features may be performed by workstations 101, such as in the case of a fully distributed system.

The users/participants of system 100 may include, for example, the sellers of life insurance polices that may interact with system 100 via workstations 101, and the buyers of life insurance policies that may also interact with system 100 via workstations 101. The sellers of life insurance policies (i.e., the user/participants that may use workstations 101) may include the actual policy owners or alternatively, agents thereof including, for example, brokers. For example, in the case of a life settlement policy (i.e., the initial sale of a policy), a licensed broker may be required to interact with system 100 on behalf of the policy owner, performing the actual sale of the policy. Similarly, the buyers of insurance policies (i.e., the user/participants that may use workstations 101) may include the actual entities/individuals that will obtain ownership of (or entitlement to) the purchased policies or alternatively, agents thereof including, for example, brokers. The owners of insurance policies seeking to sell such policies may include, for example, individuals, entities (for example, a company, an investment fund), or combinations thereof and in particular, may include the initial and/or any secondary policy owner. Similarly, the actual purchasers of policies may include, for example, individuals, entities (for example, a company, an investment fund), or combinations thereof. Other users of system 100 may include, for example, a system administrator(s) and/or customer representative(s) associated with server 104 and/or clearing center 112.

According to various embodiments of the invention, in addition to, or alternatively to, an user/participant utilizing a workstation 101 to interact with system 100/server 104 to buy and sell insurance policies, a workstation 101 (or a system interfaced to a workstation 101) may be automated to interact with server 104 to buy and sell insurance policies, at least in part. For example, a workstation 101 may be programmed to monitor bids on a given policy and to automatically submit new bids to server 104. Alternatively and/or in addition, server 104 may be operable to buy and sell insurance policies, at least in part, on behalf of buyers and sellers. For example, based on instructions received from a buyer via a workstation 101, server 104 may be programmed to monitor bids, including the highest submitted bids, on behalf of a buyer and automatically increase a buyer's bid when the highest submitted bid surpasses the buyer's bid.

Hereinafter, the terms "user," "participant," "seller participant," "seller," "buyer participant," and "buyer" will be used to refer to any individual (e.g., actual owner of a policy, actual purchaser of a policy, agent thereof, a broker thereof, etc.) that may utilize a workstation 101 to interact with system 100 to at least view, transfer, buy, and/or sell policies and in addition, any automated system that may utilize system 100, a least in part, to at least view, transfer, buy, and/or sell policies.

According to an embodiment of the invention, when an agent, for example a broker, uses system 100 on behalf of an actual owner (and thereby seller) and/or actual purchaser of an insurance policy, the broker may receive a fee, including a flat fee or a percentage fee (such as a percentage of the sale price), or a combination thereof. Similarly, system 100 (e.g., an operator/owner thereof or an operator/owner of server 104) may receive a fee, including a flat fee or a percentage fee (such as a percentage of the sale price) for listing and/or facilitating in the sale of an insurance policy.

Referring now more specifically to server 104, the server may be any general purpose or special purpose computing device and in particular, may be any suitable server, processor, computer, mainframe computer, computing device, data processing device, and/or any combination thereof. As shown in FIG. 1, server 104 may include one or more processors 111, a memory 114, and one or more applications 116, which may be operable to control/oversee the auctioning of insurance policies as briefly discussed above, for example, and as further disclosed herein. Applications 116 may be embodied as computing instructions including, for example, one or more software modules that reside in memory 114 and execute there from on processor 111 and/or one or more firmware and/or hardware modules. Server 104 may also include one or more communications modules 118 for interfacing with and communicating over communications network(s) 102 and/or 110 (and possibly other communications networks not shown) and for transmitting and/or receiving information to/from workstations 101. Server 104 may also include a computer readable medium 115 (e.g., disk drive) for storing applications 116, for example.

Server 104 may also include at least one output device 117 and at least one input device 113, which devices may be used for example, by an administrator. Example output devices 117 may include at least one display, such as a CRT (cathode ray tube) or an LCD (liquid crystal display) monitor, one or more LEDs (light-emitting diodes), and at least one audio output (e.g., a speaker). Example input devices 113 may include a mouse, a touch-sensitive pad, a pointer, a stylus, a trackball, a hard button, a keypad and/or keyboard with one or more keys representing alphanumeric characters, a wheel, a touch-sensitive monitor, and/or an audio input (e.g., a microphone). Server 104 may also include at least one biometric input device 119 for entering biometric information, such as a fingerprint, to gain access to server 104.

While server 104 is shown as a single server, one skilled in the art will recognize that server 104 may include a plurality (e.g., at least two) of servers, including redundant/backup servers. According to an embodiment of the invention, server 104 may, at least in part, be a web server, such as an http (hypertext transfer protocol) web server.

Referring now more specifically to workstations 101, a workstation may be any general purpose or special purpose computing device including, for a example, a mobile/cellular/portable phone, a PDA (personal digital assistant), a pocket PC (personal computer), a computer, a computing device, a data processing device, a personal computing device, a laptop computer, a mainframe computer, a dumb terminal, a display device, a pager, or any other device or combination thereof configured and/or operable to allow users/participants access to system 100, including server 104, and in general to allow seller and/or buyer participants, in combination with server 104, to sell and buy insurance policies and/or to request and/or to review information related thereto. As indicated above, any given workstation 101 of system 100 may not provide all the features and functions disclosed herein and different workstations may provide different features and functions. According to an embodiment of the invention, system 100 may include different types of workstations 101. One skilled in the art will recognize that other types of workstations are possible.

According to an embodiment of the invention, a workstation 101 may be a stationary device or a device tethered to a stationary object and may be collocated with server 104 or may be located in a remote location from server 104. Alternatively, a workstation may be a mobile device that may or may not need to be co-located with server 104.

Referring again to FIG. 1, a workstation 101 may include one or more processors 108, a memory 131, and one or more applications 109 that may operate in conjunction with applications 116 to provide one or more features and functions disclosed herein. Applications 109 may be embodied as computing instructions including, for example, one or more software modules that reside in memory 131 and execute there from on processor 108 and/or one or more firmware and/or hardware modules. When applications 109 are embodied as one or more software modules, these software modules may pre-loaded on the workstation, stored on a computer readable medium 130 (e.g., a disk), for example, and thereafter used repeatedly. Alternatively or in addition, each time a participant uses a workstation 101 to interact with system 100 and in particular server 104, for example, an application 109 may be loaded from server 104 or a server related thereto, for example (e.g., as web applications), to at least provide the requested feature/function. One skilled in the art will recognize that other configurations are possible. According to an embodiment of the invention, a workstation 101 may, at least in part, operate as a web client (e.g., include a Web browser).

According to an embodiment of the invention, a workstation may also include one or more communications modules 105 for interfacing with and communicating over communications network(s) 102 (and possibly other communications networks not shown) and for transmitting and/or receiving information to/from server 104. A workstation 101 may also include at least one output device 106 for conveying to a participant information as disclosed above and further herein including, for example, information related to insurance policies, status information on policies that are being auctioned, status information on bids submitted on policies that are being auctioned, status information related to polices that have been successfully sold and/or purchased, etc. Example output devices 106 may include at least one display, such as a CRT or an LCD monitor, one or more LEDs (light-emitting diodes), and at least one audio output (e.g., a speaker). A workstation 101 may also include at least one input device 103 that allows a participant to submit to system 100/server 104 information as disclosed above and further herein including, for example, life insurance polices (and information related thereto) to be listed for sale, bids on insurance policies being auctioned, search and/or sort requests, requests for information including status information related to insurance policies and/or submitted bids, etc. Example input devices 103 may include a mouse, a touch-sensitive pad, a pointer, a stylus, a trackball, a hard button, a keypad and/or keyboard with one or more keys representing alphanumeric characters, a wheel, a touch-sensitive monitor, and/or an audio input (e.g., a microphone). A workstation 101 may also include at least one biometric input device 107 for entering biometric information, such as a fingerprint, to gain access to system 100.

As indicated, the features and functions disclosed herein may be provided through a combination of applications 109 executing on workstations 101 and applications 116 executing on server 104, for example. One skilled in the art will recognize that any portion of any feature or function disclosed herein may execute on server 104 and workstations 101. For example, according to an embodiment of the invention, a feature or function may execute on the server with a workstation merely presenting information to and receiving inputs from a participant. According to another embodiment of the invention, a feature or function may execute on a workstation, which in turn may present results to the server. One skilled in the art will recognize that other variations are possible.

Referring now more specifically to back office clearing center 112, the clearing center may be any general purpose or special purpose computing device and in particular, may be any suitable server, processor, computer, mainframe computer, computing device, data processing device, personal computing device, laptop computer, etc. and/or any combination thereof. As shown in FIG. 1, back office clearing center 112 may include one or more processors 121, a memory 124, and one or more applications 126, which may be operable to assist in, cause, and/or provide functions related to the clearing of a purchased policy and/or the verifying that a purchased policy is cleared as briefly discussed above, for example, and as further disclosed herein. Applications 126 may be embodied as computing instructions including, for example, one or more software modules that reside in memory 124 and execute there from on processor 121 and/or one or more firmware and/or hardware modules. Back office clearing center 112 may also include one or more communications modules 128 for interfacing with and communicating over communications network(s) 110 (and possibly other communications networks not shown) and for transmitting and/or receiving information to/from server 104. Back office clearing center 112 may also include a computer readable medium 125 (e.g., disk drive) for storing applications 126, for example.

Back office clearing center 112 may also include at least one output device 127 and at least one input device 123, which devices may be used for example, by an administrator. Example output devices 127 may include at least one display, such as a CRT or an LCD monitor, one or more LEDs, and at least one audio output (e.g., a speaker). Example input devices 123 may include a mouse, a touch-sensitive pad, a pointer, a stylus, a trackball, a hard button, a keypad and/or keyboard with one or more keys representing alphanumeric characters, a wheel, a touch-sensitive monitor, and/or an audio input (e.g., a microphone). Back office clearing center 112 may also include at least one biometric input device 139 for entering biometric information, such as a fingerprint, to gain access to back office clearing center 112.

While back office clearing center 112 is shown as a single device/server, one skilled in the art will recognize that back office clearing center 112 may include a plurality of devices/servers, including redundant/backup device/servers.

Referring now more specifically to communications network 102, according to an embodiment of the invention, this network provides a mechanism for workstations 101 and server 104 to communicate and exchange information as disclosed herein. Example information may include the loading of applications 109 to workstations 101 from server 104, security information, such as logins and passwords for a participant to gain access to server 104 and conduct trades, and any graphical, textual, and/or audible representations of information, commands, options, and selections exchanged between workstations 101 from server 104. One skilled in the art will recognize that other information is possible. Accordingly, communications network 102 may be any network that allows, in whole or in part, for the transmission of graphical, textual, and/or audible information, and for the transmission of information in any format including digital and/or analog format.

According to an embodiment of the invention, communications network 102 may be a shared network through which a plurality of workstations 101 communicate with server 104. According to an embodiment of the invention, communications network 102 may include a plurality of different networks, which may or may not be interconnected and which may or may not be based on different technologies. Server 104 may interface each network individually and/or may interface one or more networks through a common access point. Different workstations may interface different networks. According to an embodiment of the invention, communications network 102 alternatively and/or in addition may include, at least in part, a direct connection between a given workstation 101 and server 104. According to an embodiment of the invention, communications network 102 may be a private and/or public network, and depending on the security needs of the information being exchanged between server 104 and workstations 101, may include, at least in part, the public Internet.

According to an embodiment of the invention, communications network 102 may be based on any known and/or future technologies including, wireless technologies, wireline technologies, fiber-optic technologies, etc. or any combinations thereof. Example wireless technologies may include, for example, licensed or license-exempt technologies and in particular, may include Code Division Multiple Access (CDMA), Global System for Mobile Communication (GSM), General Packet Radio Service (GPRS), WiFi (802.11x), WiMax (802.16x), and/or satellite-based technologies. Example wireline technologies may include the Public Switched Telephone Network (PSTN), Digital Subscriber Line (DSL), Integrated Services Digital Network (ISDN), cable modem technologies, and/or LAN (local area network) based technologies. Other technologies may include frame relay, asynchronous transfer mode (ATM), a virtual private network (VPN). One skilled in the art will recognize that other technologies and combinations of technologies may be used.

Referring now more specifically to communications network 110, according to an embodiment of the invention, this network provides a mechanism for back office clearing center 112 and server 104 to communicate and exchange information. Example information may include any information necessary for clearing center 112 to clear a trade, such as information related to the policy that has been sold, the price, commissions, service fees, the buyer and seller, etc. One skilled in the art will recognize that other information is possible. In general, communications network 110 may be any network that allows, in whole or in part, for the transmission of graphical, textual, and/or audible information, and for the transmission of information in any format including digital and/or analog format.

According to an embodiment of the invention, communications network 112 and communications network 102 may or may not share common resources, and may or may not be interconnected. According to an embodiment of the invention, communications network 110 and communications network 102 are the same network. According to an embodiment of the invention, communications network 110 may include a plurality of different networks, which may or may not be based on different technologies. According to an embodiment of the invention, communications network 110 alternatively and/or in addition may include, at least in part, a direct connection between back office clearing center 112 and server 104. According to an embodiment of the invention, communications network 110 may be a private and/or public network, and depending on the security needs of the information being exchanged between back office clearing center 112 and server 104, may include, at least in part, the public Internet. According to an embodiment of the invention, communications network 110 may be based on any known and/or future technologies including, wireless technologies, wireline technologies, fiber-optic technologies, etc. or any combinations thereof, as similarly described for communications network 102.

As shown in FIG. 1, system 100 may also include one or more databases, such as database 180, including possibly one or more redundant and/or backup databases, that are accessible to at least server 104 and possibly workstations 101 (either directly or via server 104) and possibly back office clearing center 112 (either directly or via server 104). The term "database" as used herein is not intended to limit how the information maintained therein is stored and/or accessed. For example, database 180 may be a database management system separate from or part of server 104, for example. Alternatively, database 180 may reside within a computer readable medium (e.g., computer readable medium 115) within server 104, for example, and information may be maintained therein by server 104 as flat files, for example. As another example, database 180 may be one or more dynamic data structures (e.g., arrays) within memory 114 of server 104, for example, and may be maintained therein by the server, for example. Alternatively, information may be maintained using any combination of these implementations and other implementations.

According to an embodiment of the invention, database 180 may store information and/or data related to life insurance policies, including life settlement policies and resale policies, and information and/or data related to the sale/transfer of such policies, as further disclosed herein. For example, database 180 may maintain information and/or data related to:

1. Life insurance policies to be sold: According to an embodiment of the invention, database 180 may maintain information related to life settlement and resale policies that have been submitted to system 100/server 104 for auction/sale by, for example, a seller participant via a workstation 101. According to an embodiment of the invention, in the case of a resale policy submitted for sale, the initial/primary sale of the policy and/or any other secondary sale of the policy may have occurred, at least in part, outside system 100/server 104. Alternatively, the initial/primary sale of the policy and any other secondary sale of the policy may have all occurred via system 100/server 104. According to an embodiment of the invention, life settlement and resale policies that have been submitted to server 104 for sale may be considered to be in either a pending state and/or an active/live state (One skilled in the art will recognize that while policies may be described herein as being in one of several states, fewer, additional, different and/or no states may also be used).
   a) Pending state: According to an embodiment of the invention, a policy in the pending state may include a policy intended to be auctioned but for which information must still be submitted and/or obtained before the policy can be auctioned/offered for sale to bidders. Such information may at least include that information necessary for a potential buyer participant to sufficiently evaluate the policy in order to determine a value for the policy, such as a fair market value. For example, such information may include, a copy of the policy, authorization from the insured to use and/or disclose non-public personal information and protected health information about the insured, medical records of the insured, life expectancy report(s) on the insured, an in-force illustration, verification of coverage, etc. One skilled in the art will recognize that additional information may be required before a policy may be auctioned/offered for sale to bidders. According to an embodiment of the invention, a policy in the pending state may also include a policy for which all information has been submitted and/or obtained but the policy is awaiting approval before the policy can be auctioned/offered for sale to bidders. For example, according to an embodiment of the invention, an administrator of system 100/server 104, for example, may need to approve a policy before the policy can be auctioned/offered for sale to bidders. According to an embodiment of the invention, a policy in the pending state may also include a policy that has been approved and is ready to be auctioned/offered for sale to bidders but the auction period (e.g., a period of time during which the auction of the policy is in operation or in other words, a period of time during which the policy may be actively bidded on) has not begun.
   b) Active/live state: According to an embodiment of the invention, a policy in the active/live state may include a policy for which the auction period is running and on which bids are actively being made.
2. Life Insurance Policies that were submitted for sale: According to an embodiment of the invention, database 180 may also maintain information related to life settlement and resale policies that were actively auctioned/offered for sale via system 100/server 104 and are now in a closed state.
   a) Closed state: According to an embodiment of the invention, a policy in the closed state may include a policy for which the auction period expired/ended and for which:
      the policy failed to successfully sell/trade because, for example, a minimum bid/selling amount/price was never obtained.
      the policy successfully sold but failed to successfully clear.
      the policy sold and is still in the process of being cleared.
      the policy sold and successfully cleared.
      According to an embodiment of the invention, a policy in the closed state may also include a policy for which the auction period expired/ended early because, for example, a desired bid/sale price of the seller participant was obtained.
3. Life Insurance Policies that were submitted for sale and withdrawn: According to an embodiment of the invention, database 180 may also maintain information related to life settlement and resale policies that were submitted to system 100/server 104 for auction/sale and are now in a closed state because the policy was withdrawn from auction/sale by the seller participant. For example, according to an embodiment of the invention, the seller participant may withdraw the policy from sale while the policy is in the pending state, active/live state, and/or being cleared. According to an embodiment of the invention, database 180 may also maintain information related to life settlement and resale policies that were submitted to system 100/server 104 for auction/sale and are now in a closed state because the policy, while in the pending state, was withdrawn from sale by an administrator, for example, and/or by server 104, for example, because information necessary to sell the policy was not obtained and/or the policy did not obtain approval for sale.
4. Life Insurance Policies submitted for information purposes: According to an embodiment of the invention, database 180 may also maintain information related to insurance policies, including life settlement and resale policies, that were submitted to system 100/server 104 not for auction/sale but rather, were entered into database 180 merely for informational purposes, as further disclosed herein. Such policies may include, for example, policies that are still being held by the initial policy owner and are not for sale, policies that have been sold one or more times outside system 100, and/or policies that are no longer active because, for example, the term expired, the premium payments lapsed, the owner terminated the policy by collecting the cash surrender value, etc.

One skilled in the art will recognize that database 180 may maintain information and/or data related to other types of insurance policies than those listed and discussed above.

According to various embodiments of the invention, the information and/or data stored in database 180 for a given policy may include any one or more various types of information, including for example that listed below (one skilled in the art will recognize that for a given policy, database 180 may store other types of information in addition to that discussed herein):

1. Information specific to the life insurance policy: According to an embodiment of the invention, database 180 may maintain information related to the structure of the insurance policy including:
   a) The type of life insurance policy: Database 180 may maintain information on the type of the insurance policy including, for example, an indication as to whether the policy is, for example, (a) a term life insurance policy, (b) a convertible term life insurance policy, (c) a permanent life insurance policy, such as a whole life insurance policy, a universal life insurance policy, variable universal life insurance policy, (d) a permanent life insurance policy that has been converted (i.e., a converted term policy), (e) a second to die point) life insurance policy such as a second to die universal life insurance policy, etc. For a term life insurance policy and a convertible term life insurance policy, database 180 may maintain an indication of the term of the policy. For a convertible term life insurance policy, database 180 may also maintain, if applicable, an indication of a final conversion option expiry date after which the policy is non-convertible, an indication of a final conversion option expiry age (i.e., of the insured) after which the policy is non-convertible and/or an indication of a minimal age that the insured must be before the policy can be converted, an indication of whether the policy has an exclusion period in the early years of the policy during which the convertible term policy is non-convertible. For a permanent life insurance policy, database 180 may maintain, for example, an indication of whether the policy was converted from a term policy, the date of the conversation, and which owner performed the conversion.
   b) Face Value: Database 180 may maintain information on the face value of the policy including for example, the face value of the policy as written, the current face value as a result of withdrawals against a cash account, etc.
   c) Issuer: Database 180 may maintain information on the issuer of the insurance policy (e.g., an insurance company) including, for example, a name of the issuer, and possibly a current rating of the creditworthiness of the issuer. For example, ratings may be performed by and obtained from companies such as Standard & Poor, Moody's Investors Service, etc.
   d) Policy Number: Database 180 may maintain a policy number of a policy as assigned by the issuer.
   e) Universal identifier: Database 180 may maintain a unique identifier for a given policy. The identifier may be a policy number assigned by the issuer. The identifier may alternatively and/or additionally be some other universal identifier (e.g., a universal policy identifier, or UPID). Such a universal identifier may be assigned, for example, to a given policy by system 100/server 104 (and thereby unique, for example, to system 100 and/or beyond), by an issuer when issuing a policy (and thereby unique, for example, to the issuer and/or beyond), by a governing entity. As another example, a single entity may maintain and thereby provide such universal identifiers upon a request from system 100/server 104, an issuer of the policy, etc. As another example, such a universal identifier may be formed from a set of rules, or universal rules, such that system 100/server 104, an issuer, etc. may be able to form the universal identifier. For example, the universal identifier may be a combination of a social security number and a policy number. According to an embodiment of the invention, the universal identifier may have a form such that each policy associated with system 100 has such an identifier and may be uniquely identified by and within system 100 by the identifier. According to an embodiment of the invention, the identifier may also have a form such that a buyer/seller participant in general, for example, viewing the identifier may not be able to determine the specific policy, insured, owner, and/or beneficiaries, for example, associated with that policy without having more information.
   f) Issue date and state: Database 180 may maintain information on the issue date of the policy and the associated state of issuance.
   g) The insured individual(s): Database 180 may maintain information on the insured individual(s) of a policy as further disclosed herein including, for example, information on the primary insured individual and, if applicable, information on a secondary insured individual (e.g., in the case of a second to die insurance policy), etc.
   h) Beneficiary(s): Database 180 may maintain information on the beneficiary(s) of a policy as further disclosed herein.
   i) Policy owner(s): Database 180 may maintain information on the policy owner(s) of a policy as further disclosed herein.
   j) Premium Payment: Database 180 may maintain information on the premium payment including, for example, the current amount of the premium payment, the structure of the premium payment (e.g., whether the payment is fixed or changing), the premium frequency, and the next premium due date. Database 180 may also maintain information related to whether the amount of the premium payment has changed (e.g., as a result of converting the policy or changing coverage) and if so, the pervious amount(s) of the premium payment.
   k) Cash Account: Database 180 may maintain, if applicable, information related to a cash account associated with a policy including, for example the current cash value of the account.
   l) Death benefit: Database 180 may maintain information related to the current amount of the death benefit including for example, any reductions in the death benefit as a result of withdrawals and/or loans against the cash account, if applicable.
   m) Cash Surrender Value: Database 180 may maintain information related to the current cash surrender value of the policy.

2. Information related to the insured of a life insurance policy: According to an embodiment of the invention, database 180 may maintain information related to the insured individual of a given insurance policy as further disclosed below. One skilled in the art will recognize that if the policy has more than one insured individual (e.g., such as a joint or group policy), database 180 may maintain such information for each individual.
   a) Name: Database 180 may maintain the name (e.g., a first, middle, and/or last name) of the insured individual including, for example, a current name, any previous name that was changed such as a maiden name, aliase(s), and/or a nickname(s), etc.
   b) Demographics: Database 180 may maintain demographic information associated with an individual including, for example, ethnicity, religion, age, sex, current and past citizenships, marital status (e.g., married, singled, divorced, widowed, separated,) etc.

c) Address: Database 180 may maintain the address (e.g., street address, town, county, state, country, etc.) of the insured individual including, for example, a primary residence, a secondary residence, a mailing address, and/or any previous such addresses.

d) Date of birth: Database 180 may maintain a date of birth of the insured individual.

e) Place of birth: Database 180 may maintain a place of birth (e.g., street address, town, county, state, country, etc.) of the insured individual.

f) Contact information: Database 180 may maintain a phone number of the insured individual including, for example, a current land line number, a current VoIP number, a current cellular number, a current work number, and/or any previous such numbers. Database 180 may also maintain an email address(es) of the insured individual.

g) Identification Number: Database 180 may maintain an identification number of the insured individual including, for example, a social security number, current/past employee identification numbers, driver's license number, etc. According to an embodiment of the invention, database 180 may determine and assign a unique identification number to an insured individual. Such a number may have relevance only with system 100 or alternatively, beyond/outside system 100.

h) Health related information: Database 180 may maintain information related to the insured individual's health including, for example, current and past medical conditions. Database 180 may maintain information related to the insured individual's current and past doctors. Database 180 may maintain information related to current and/or past smoking use by the individual, current and/or past alcohol use by the individual, etc.

i) Degrees: Database 180 may maintain information related to the insured individual's education including, for example, degrees held, professional licenses held, etc. Database 180 may also maintain information may related to colleges/universities/technical institutions/trade institutions, etc. that the insured individual attended and/or graduated from and the years attended.

j) Occupation(s): Database 180 may maintain information related to the insured individual's current and/or past occupations including, for example, the industry (e.g., health care, teaching, etc.), the field of occupation (e.g., lawyer, doctor, etc.), specific companies, etc. Database 180 may also maintain information related to the specific positions held by the insured individual, the responsibilities/tasks performed by the insured individual in each position, etc. Database 180 may also maintain information related to the duration of time and/or dates the individual performed each position.

k) Hobby(s): Database 180 may maintain information related to the insured individual's current and past hobbies and information related to the duration of time and/or dates the individual engaged in such hobbies.

l) Genealogy/Relatives: Database 180 may maintain information related to the insured individual's ancestors including, for example, parents, grandparents, great-grandparents, etc. Database 180 may maintain information related to the insured individual's sibling(s), first/second/etc. cousins, aunts, uncles, etc. Database 180 may also maintain information on the insured individual's children (natural, adopted), grandchildren, etc. Database 180 may also maintain information on any dependents of the insured individual. The information database 180 may maintain on such individuals may include whether the individual is living/deceased, and any other information discussed herein including, for example, name, address, place of birth, etc.

m) Husbands/Wives/Significant Others: Database 180 may maintain information related to the insured individual's current and past husbands/wives/significant others, etc. The information database 180 may maintain on such individuals may include any information discussed herein including, for example, name, address, place of birth, etc.

3. Information related to the beneficiary of policy: According to an embodiment of the invention, database 180 may maintain information related to the beneficiary(s) of a given insurance policy including, for example:

a) Current Beneficiary: Database 180 may maintain an indication as to the current beneficiary(s) of a given policy. The beneficiary may include, for example, an individual, an entity (e.g., a corporation), a trust, a financial fund, etc. When the beneficiary is an individual, database 180 may maintain any of the information disclosed herein for an insured, for example.

b) Previous Beneficiary: Database 180 may maintain an indication as to any previous beneficiary(s) of a given policy that was subsequently removed and/or changed. When the beneficiary of a policy has been removed and/or changed, database 180 may maintain information as to when the beneficiary was changed (e.g., date) and by which owner(s) of the policy. Database 180 may maintain information as to why a beneficiary is removed and/or changed (e.g., death of beneficiary, sale of policy, etc.). When the previous beneficiary is an individual, database 180 may maintain any of the information disclosed herein for an insured, for example.

4. Information related to the owner of a policy: According to an embodiment of the invention, database 180 may maintain information related to the owner of a given insurance policy as further disclosed below. One skilled in the art will recognize that if the policy has more than one owner at a given time, database 180 may maintain such information for each owner.

a) Current Owner: Database 180 may maintain an indication as to the current owner(s) of a given policy. The owner may include, for example, an individual, an entity (e.g., a corporation), a trust, a financial fund, etc. When the owner is an individual, database 180 may maintain any of the information disclosed herein for an insured, for example.

b) Previous Owner: Database 180 may maintain an indication as to any previous owner(s) of a given policy that have been removed and/or changed. When the owner of a policy has been removed and/or changed, database 180 may maintain information as to when the owner was removed and/or changed including, for example, the date and time the owner was removed and/or changed as further disclosed herein, for example. Database 180 may maintain information as to why an owner of a policy is removed and/or changes (e.g., death of an owner, sale of a policy, an assignment of a policy, a devise of a policy, a bequest of a policy, etc.). When the previous owner is an individual, database 180 may maintain any of the information disclosed herein for an insured, for example.

5. Information related to the state of a policy: According to an embodiment of the invention, database 180 may maintain information related to the current state of a policy with respect to system 100. For example, database 180 may maintain an indication as to whether the policy is in a pending state, active state, or closed state and how the policy reached that state (e.g., the policy is in a closed state because the policy was withdrawn from sale). Database 180 may also maintain an indication as to the status of a policy with respect to a given state and how the policy reached that status within the state (e.g., the policy is in the closed state and has a withdrawn status because the seller participant withdrew it from sale).

6. Information related to the status of a policy: According to an embodiment of the invention, database 180 may maintain information related to the status of a policy including, for example, whether the policy is still active or terminated and possibly why a policy is terminated (e.g., because premium payments lapsed, the term lapsed, the insured is deceased, an owner terminated the policy by collecting the cash surrender value, etc).

7. Information related to the number of times a policy has been transferred: According to an embodiment of the invention, database 180 may maintain information related to the number of times ownership of a policy (at least in part) has been transferred (e.g., sold) including for example, an initial transfer and each subsequent transfer of ownership. In particular, database 180 may maintain an indication as to whether a policy has never been transferred, is in the process/has been transferred once, is in the process/has been transferred twice, etc.

8. Information related to a primary/first time transfer of a policy: According to an embodiment of the invention, database 180 may maintain information (if applicable) related to the first time a policy was transferred from an initial owner of the policy to a second owner (i.e., primary/first time transaction) as further disclosed herein. The primary/first time transfer may have been the result of a sale, an assignment, a devise, a bequest, etc. of a policy.
   a) Type of transaction: Database 180 may maintain an indication as to the type of transaction that resulted in the policy being transferred from an initial owner of the policy to a second owner. For example, database 180 may maintain an indication as to whether the transaction was a sale (and in particular, the type of sale—auction, advertisement, reverse auction, etc.), an assignment, a devise, a bequest, etc.
   b) Transferor: Database 180 may maintain an indication (e.g., name, identification number, etc.) as to the transferor(s) (e.g., a seller) of the policy (i.e., the initial owner of the policy). The transferor may include, for example, an individual, an entity (e.g., a corporation), a trust, a financial fund, etc. When the transferor is an individual, database 180 may maintain any of the information disclosed herein for an insured, for example.
   c) Transferee: Database 180 may maintain an indication (e.g., name, identification number, etc.) as to the transferee(s) (e.g., a buyer) of the policy (i.e., the second owner of the policy). The transferee may include, for example, an individual, an entity (e.g., a corporation), a trust, a financial fund, etc. When the transferee is an individual, database 180 may maintain any of the information disclosed herein for an insured, for example.
   d) Transfer price: Database 180 may maintain, if applicable, information related to the amount of money (e.g., a selling price) paid by the transferee in exchange for the policy. One skilled in the art will recognize that the transferor may have received less than the transfer price (e.g., is broker fees are removed there from).
   e) Date: Database 180 may maintain information related to when the policy was transferred between the transferee and transferor. Such information may include a date, time, etc.
   f) Beneficiary: Database 180 may maintain information related to any changes in the beneficiary(s) of the policy as a result of the transfer. For example, database 180 may maintain an indication (e.g., name, identification number, etc.) as to the previous beneficiary(s) and an indication (e.g., name, identification number, etc.) as to the new beneficiary(s).
   g) Additional information related to the sale of a policy: Assuming the transaction was a sale of a policy, additional information maintained by database 180 may include:
      Selling broker: Database 180 may maintain an indication (e.g., name, identification number, etc.) as to a broker that assisted the seller in selling the policy. The broker may include, for example, an individual, an entity, etc.
      Buying broker: Database 180 may maintain an indication (e.g., name, identification number, etc.) as to a broker that assisted the buyer in buying the policy. The broker may include, for example, an individual, an entity, etc.
      Date: Database 180 may maintain information related to when the policy was sold. Such information may include a date, time, etc. In particular, such information may include a date the policy was initially offered for sale, a date an offer (e.g., a bid) to purchase the policy was accepted, the date the transaction closed, etc.
      Offered prices: Database 180 may maintain information related to each of the prices at which a seller offered to sell a policy and/or each of the prices at which a buyer(s) offered to purchase a policy. Database 180 may also maintain an indication (e.g., name, identification number, etc.) of each such buyer. Alternatively and/or in addition, database 180 may maintain a range of such prices (i.e., a range of prices at which a seller offered to sell a policy and/or a range of prices at which buyers offered to buy a policy).
      Length of auction/sale period: Database 180 may maintain information related to a length of time a policy was offered for sale (e.g., length of an auction period). For example, the length of time may include from when a policy was initially offered for sale (e.g., when bids were initially accepted) to when an offer to purchase the policy was accepted.
      Commissions: Database 180 may maintain information related to any commissions paid to a seller's broker and/or to a buyer's broker. Commissions may include, for example, flat fees, percentage of sale price, etc.
      Other payments: Database 180 may maintain information related to any other payments (e.g., fees) paid in relation to an initial sale of a policy. Such payments may include payments made to system 100, for example, in connection with facilitating the transaction.

9. Information related to a secondary transfer of a policy: According to an embodiment of the invention, database 180 may maintain (if applicable) information related to any secondary transaction/transfer of ownership of a policy (i.e., any transaction subsequent to the primary/first time transaction). Again, any secondary transaction may be the result of a sale, an assignment, a devise, a bequest, etc. of a policy. Information related to a secondary transaction of a policy may include the information disclosed herein with reference to a primary/first time transaction of a policy.

10. Information related to an unsuccessful transfer of a policy: According to an embodiment of the invention, database 180 may maintain (if applicable) information related to any attempted transaction/transfer of ownership of a policy (including, for example, any attempted primary/first time transaction of a policy and/or any attempted secondary time transaction of a policy) that was not successfully completed. Again, any attempted transaction may include an attempted sale, assignment, devise, bequest, etc. of a policy. Example information database 180 may maintain includes a) Type of transaction: Database 180 may maintain an indication as to the type of the attempted transaction (e.g., a sale (and in particular, the type of sale—auction, advertisement, reverse auction, etc.), an assignment, a devise, a bequest, etc.).

b) Reason(s) why attempted transaction failed to complete: Database 180 may maintain an indication(s) as to why an attempted transaction of a policy failed to complete. Reasons may include, for example, a seller withdrew the policy from sale, an administrator of server 104/system 100, for example, withdrew the policy from sale (e.g., because information necessary to sell the policy was not obtained and/or the policy did not obtain approval for sale), the policy failed to successfully sell/trade because, for example, a minimum bid/selling amount/price was never obtained, the policy successfully sold but failed to successfully clear, etc.

c) Name of transferor: Database 180 may maintain an indication (e.g., name, identification number, etc.) as to the transferor(s) (e.g., a seller) of the policy as similarly discussed above.

d) Name of transferee: Database 180 may maintain an indication (e.g., name, identification number, etc.) as to a transferee(s) (if applicable) of a policy to which the policy was not successfully transferred.

e) Transfer price: Database 180 may maintain information related to the amount of money (e.g., a selling price) that was agreed upon (if applicable) between a transferor and transferee in exchange for a transfer of the policy.

f) Date: Database 180 may maintain information related to when (e.g., a date, time, etc.) the attempted transfer of the policy took place and/or subsequently failed to take place.

g) Additional information related to an attempted sale of a policy: Assuming the attempted transaction was a sale of a policy, additional information maintained by database 180 may include:

Name of selling broker: Database 180 may maintain an indication (e.g., name, identification number, etc.) as to a broker that assisted a seller in an attempted sale of the policy.

Name of buying broker: Database 180 may maintain an indication (e.g., name, identification number, etc.) as to a broker that assisted a possible buyer in an attempted purchase of the policy.

Date: Database 180 may maintain information related to when the attempted transfer of the policy took place. Such information may include a date, time, etc. In particular, such information may include a date a policy was initially offered for sale, a date an offer (e.g., a bid) to purchase the policy was accepted, the date the transaction closed, the date the attempted transaction failed to complete (e.g., date policy was withdrawn from sale), etc.

Offered prices: Database 180 may maintain information related to each of the prices at which a seller offered to sell a policy and/or each of the prices at which a buyer(s) offered to purchase a policy. Database 180 may also maintain an indication (e.g., name, identification number, etc.) of each such buyer. Alternatively and/or in addition, database 180 may maintain a range of such prices (i.e., a range of prices at which a seller offered to sell a policy and/or a range of prices at which buyers offered to buy a policy).

Length of sale/auction period: Database 180 may maintain information related to a length of time a policy was offered for sale. For example, the length of time may include from when a policy was initially offered for sale (e.g., when bids were initially accepted) to when the transaction failed to complete.

11. Information related to loans/liens and withdrawals against the policy: According to an embodiment of the invention, database 180 may maintain information related to any loans or withdrawals related to an insurance policy including, for example:

a) Cash account and withdrawals: Database 180 may maintain, if applicable, information related to whether there has been a withdrawal(s) from a cash account associated with a policy. In particular, for each cash withdrawal, database 180 may maintain an indication as to which owner(s) of the policy made the withdrawal, on which date the withdrawal was made, the amount of the withdrawal, etc.

b) Cash account and loans: Database 180 may maintain, if applicable, information related to loans made against a cash account associated with a policy. In particular, for each loan, database 180 may maintain an indication as to which owner(s) of the policy took the loan, the initial amount of the loan, the date the loan was taken, whether the loan is outstanding or has been repaid, the interest rate, the premium amounts, etc. For outstanding loans, database 180 may also maintain the date on which the loan is to be repaid by and the outstanding balance of the loan. For repaid loans, database 180 may also maintain the date the loan was repaid in full and which owner(s) repaid the loan.

c) Loans against the policy: Database 180 may maintain, if applicable, information related to loans that name(d) the policy as collateral (i.e., whether the policy has been collaterally assigned). In particular, for each loan, database 180 may maintain an indication as to which owner(s) of the policy took the loan, the initial amount of the loan, the date the loan was taken, whether the loan is outstanding or has been repaid, the interest rate, the premium amounts, which entity provided the loan and thereby holds/held rights to the policy as collateral, etc. For outstanding loans, database 180 may also maintain the date on which the loan is to be repaid by and the outstanding balance of the loan. For repaid loans, database 180 may also maintain the date the loan was repaid in full and which owner(s) repaid the loan.

12. Premium Financing: Database 180 may maintain, if applicable, information related to whether premiums of the policy have been financed and the terms of such financing.

Again, one skilled in the art will recognize that for a given policy, database 180 may store/maintain other/additional information.

According to various embodiments of the invention, database 180 may maintain any of the above discussed information in one or more forms. For example, for a given policy, database 180 may have various fields representing any of the above described information, with values for those fields entered in a structured form such that the fields/values may be searchable. Here, for example, each field may represent a discrete piece of information. As another example, database 180 may maintain various fields representing any of the above described information with values for those fields entered in free-form and/or unstructured form such that the values themselves may or may not be searchable. Here, for example, numerous pieces of information may be maintained in one field. As another example, database 180 may maintain various fields with each field representing a specific document. Accordingly, accessing the field may provide access to the document. Here, for example, numerous pieces of information may be maintained in each document. The documents may be stored in a searchable (e.g., a text document) or non-searchable form (e.g., a scanned document, or picture). Example documents maintained by database 180 for a given policy may include a copy of the policy and any riders, copies of health documents, copies of an illustration, etc.

According to various embodiments of the invention, any of the information discussed above, for example, may be entered/submitted into and/or updated at database 180 in various fashions as discussed below:

1. A seller participant: According to an embodiment of the invention, information may be submitted to system 100/server 104 by a seller of a policy, with the information then being submitted into/updated at database 180. For example, when system 100/server 104 are being used for the first time to sell a life settlement policy and/or resale policy, a seller participant may initially submit the information, which is then subsequently submitted into database 180. Alternatively, when system 100/server 104 are being used for a second or subsequent time to sell a life insurance policy, a seller participant may update previously submitted information, in addition to submitting new information, with the information then being submitted into and/or updated at database 180.

According to various embodiments of the invention, a seller participant may submit/update information to system 100 in various fashions. For example, a seller participant may submit/update information at workstation 101, with workstation 101 then conveying the information to server 104 and server 104 then automatically submitting/updating the information at database 180, and/or with workstation 101 automatically submitting/updating the information at database 180. Alternatively, if server 104 obtains the information from a workstation 101, an administrator of server 104, for example, may review the information and then submit/update the information to database 180. According to an embodiment of the invention, a seller participant may submit/update information at workstation 101 in various fashions. For example, workstation 101 may present to a seller participant a graphical interface/display with one or more data entry fields, menus, and/or selectable options, for example, through which the seller participant may submit/update information. Server 104 may cause workstation 101 to present such an interface. As another example, workstation 101 may allow a seller participant to audibly enter information, which information may be interpreted by workstation 101 and/or server 104 and automatically entered into database 180 by workstation 101 and/or server 104 and/or which information may be reviewed/received by an administrator of server 104, for example, and which administrator may then submit the information to database 180. As another example, a seller participant may create files (such as text files or scanned files) at workstation 101, for example, and/or submit files to workstation 101, for example, and then submit these files in whole or in part via workstation 101 to server 104, for example. For example, workstation 101 and/or server 104 may automatically review the files for selective information with workstation 101 and/or server 104, for example, then automatically submitting the information to database 180. Alternatively, an administrator of server 104, for example, may review the files once received by server 104, for example, and then submit the information to database 180. Alternatively, the files may be submitted in whole to database 180. One skilled in the art will recognize that a seller participant may submit/update information at workstation 101 for subsequent conveyance to server 104 and database 180, for example, in other fashions including, for example, email, SMS, etc.

According to another embodiment of the invention, a seller participant may submit/update information to system 100 by contacting an administrator (e.g., customer service representative) of system 100/server 104, for example, with the administrator then submitting/updating the information at database 180. For example, a seller participant may call, fax, email, meet face-to-face with, etc. an administrator.

2. A buyer participant: According to an embodiment of the invention, information may be submitted to system 100/server 104 by a buyer participant, with the information then being submitted into/updated at database 180. For example, a buyer participant may submit/update such information in conjunction with the buyer participant interacting with system 100 to purchase policies. A buyer participant may submit/update information to system 100 and subsequently database 180 as similarly described above for a seller participant.

3. A participant: According to an embodiment of the invention, information may be submitted to system 100/server 104 by any participant, with the information then being submitted into/updated at database 180. For example, a participant that owns a policy, but is not necessarily selling the policy, and/or that simply has information on a policy may submit/update such information. As another example, the issuer of a policy may submit/update such information. Any such a participant may submit/update information to system 100 and subsequently database 180 as similarly described above for a seller participant.

4. An administrator: According to an embodiment of the invention, an administrator (e.g., a service representative) of system 100/server 104, for example, may obtain and/or determine the information and then submit/update the information into database 180. For example, according to various embodiments of the invention, an administrator may converse with a seller and/or buyer participant as discussed above, for example. As another example, an administrator may converse with health care providers (e.g., doctors), life insurance companies, lending institutions, etc. to obtain such information.

5. Automatically by server 104: According to an embodiment of the invention, server 104 (and/or a system associated with server 104), for example, may access systems external to system 100 to obtain such information and then submit/update the information into database 180. For example, assuming server 104 has proper security/authorization access, server 104 may access one or more systems of healthcare providers, one or more systems of life insurance companies, etc.

According to another embodiment of the invention, server 104 may automatically obtain such information in the course of conducting a transaction/sale and submit/update the information at database 180. For, example, server 104 may determine the buyer participant of a purchased policy, the winning bid by this participant, the date/time of sale, etc. and automatically submit this information to database 180.

According to another embodiment of the invention, server 104 may automatically generate information (e.g., a universal identifier) and submit/update the information at database 180.

6. Automatically by workstation 101: According to an embodiment of the invention, a workstation 101, for example, may access systems external to system 100 to obtain such information and then submit/update the information into database 180 either directly, or by sending the information to server 104 and/or an administrator thereof, for example.

According to another embodiment of the invention, a workstation 101 may automatically obtain such information in the course of conducting a transaction/sale and submit/update the information at database 180, possibly through server 104 and/or an administrator thereof. According to another embodiment of the invention, a workstation 101 may automatically generate information and submit/update the information to database 180, possibly through server 104 and/or an administrator thereof.

One skilled in the art will recognize that information may submitted/updated at database 180 in other fashions than those discussed above.

According to an embodiment of the invention, each policy maintained in database 180 may be uniquely accessed and/or indexed based on a policy number of the policy and/or a universal/unique identifier assigned to the policy. Again, such a universal identifier may be assigned, for example, to a given policy by system 100/server 104, for example, when the policy is initially submitted to database 180, for example. Alternatively, such a universal identifier may be assigned, for example, to a given policy by an issuer when issuing a policy, and/or by a governing entity, etc. Accordingly, given a policy number/universal identifier, database 180 may return one or more pieces of information on the corresponding policy.

According to an embodiment of the invention, a profile, such as a standard profile, may be maintained for each policy maintained in database 180. In general, such a profile may include a subset of the information discussed above and in particular, may include information that may be provided and/or made available to participants (including buyer and seller participants) via workstations 101. For example, the profile may include information on a policy that a participant may request from server 104 (and thereby database 180) via a workstation 101 and which may be subsequently made available to the participant via workstation 101 by server 104, such as through a display.

According to an embodiment of the invention, the profile on a given policy may include any of the information discussed above. According to a particular embodiment of the invention, the profile on a given policy may include any of the information discussed above excluding, however, any "privacy related" information. In particular, according to an embodiment of the invention, not all information maintained by database 180 on a given policy may be accessible to all participants of system 100. Such information may be referred to as "privacy related" information and may include any information that may be used to specifically identify, for example, the insured of the policy, the beneficiary of the policy, the current owner of the policy, the specific policy itself (e.g., the policy number), the broker assisting in selling a policy, etc. (privacy related information may include other types of information). According to an embodiment of the invention, privacy related information may only be accessible to certain participants (such as the current owner of a policy) and/or may only be accessible to a participant(s) depending on a state of the policy. For example, a buyer participant may not have access to privacy related information until that participant is deemed to have submitted a winning bid for the policy and is in the process of closing on the policy and/or has closed on the policy, and is thereby the new owner of the policy.

According to an embodiment of the invention, the profile for a given policy may include, for example:

1. The universal identifier assigned to a policy.
2. "Information specific to the life insurance policy" (as discussed above) other than, for example, the policy number, identity of the insured, identity of the owner, and identity of the beneficiary.
3. "Information related to the insured of a life insurance policy" (as discussed above) other than, for example, specific information that may be used to identify the insured.
4. A copy of the insurance policy with privacy related information removed
5. Copies of medical records with privacy related information removed, etc.

According to an embodiment of the invention, server 104 may create such a profile as a policy is submitted to system 100, such as for sale, and may update the profile as additional information is obtained and/or changes. According to an embodiment of the invention, server 104 may maintain such a profile in database 180. According to another embodiment of the invention, server 104 may create the profile (e.g., selectively access the information from database 180) as the profile is requested by a participant.

Buying and Selling Life Insurance Policies

Referring now more specifically to the buying and selling of insurance policies, a seller participant may initially access system 100 to submit an insurance policy for sale. In particular, according to an embodiment of the invention, a seller participant may access server 104 via a workstation 101 and through one or more graphical interfaces/displays, indicate a desire to sell an insurance policy. As a result of indicating a desire to sell a policy and assuming the insurance policy is a life settlement policy and is thereby being sold for the first time or is a resale policy that is being sold for the first time via system 100, workstation 101 may prompt/instruct (possibly as a result of server 104 and possibly through one or more graphical interfaces/displays) a seller participant to enter/submit any of the information discussed above including, for example, information specific to the life insurance policy, information related to the insured of the policy, information related to any prior transfer of the policy (i.e., such as in the case of a resale policy) and/or attempted but unsuccessful transfer of the policy, etc.

As discussed above, a seller participant may submit information at workstation 101 in various fashions. For example, workstation 101 may present to the seller participant a graphical interface/display with one or more data entry fields, menus, and/or selectable options, for example, through which the seller participant may submit information. As another example, a seller participant may create files (such as text files or scanned files) at workstation 101, for example, and/or submit files to workstation 101, for example, and then submit these files in whole or in part via workstation 101, for example.

As the seller participant submits information to workstation 101, workstation 101 may communicate the information to server 104, for example, where the information may be subsequently submitted to database 180, as discussed above. One skilled in the art will recognize that the seller participant may submit information in other and/or additional fashions including, for example, by contacting an administrator (e.g., customer service representative) of system 100/server 104, as discussed above.

As a result of indicating a desire to sell a policy and submitting one or more pieces of information on the policy, server 104 may assign, for example, a universal identifier to the policy and return the identifier to the seller participant via workstation 101. As discussed above, the universal identifier may have a form such that while the seller participant can identify the submitted policy by the identifier, other participants (e.g., buying and selling) viewing the identifier may not be able to identify the specific policy and/or the insured/seller participant/owner/beneficiaries/etc. associated with the policy.

According to an embodiment of the invention, as a result of indicating a desire to sell a policy and submitting one or more pieces of information on the policy, server 104 and/or an administrator associated therewith, for example, may interact with one or more other systems and/or individuals to obtain any additional information related to the policy to be sold. Proper authorization (e.g., release forms) may need to be first obtained from the seller participant, insured, etc. before such information can be obtained. For example, interactions may occur with one or more health care providers to obtain prior medical/health information on the insured and/or to obtain a current (possibly to be performed) medical evaluation of the insured. As another example, interactions may occur with the issuer of the policy. As a further example, interactions may occur with one or more evaluation firms to obtain one or more life expectancy evaluations/reports of the insured of a policy. Again, such additional information may be subsequently submitted to database 180, as discussed above.

In addition to a seller participant selling a life settlement policy and/or a resale policy that is being sold for the first time via system 100 as discussed above, a seller participant may also access server 104 via a workstation 101 to resell a resale policy that has been previously sold via system 100 (including a policy that may have been transferred at least once without system 100). As a result of indicating a desire to sell such a policy, workstation 101 may prompt/instruct (possibly as a result of server 104 and possibly through one or more graphical interfaces/displays) the seller participant to enter/submit and/or update any of the information discussed above. According to another embodiment of the invention, because database 180 may already contain information on such a policy, workstation 101 may prompt/instruct the seller participant to simply identify the policy by providing, for example, the policy number and/or a universal identifier and may also prompt/instruct the seller participant to provide any updates/changes to the policy. Once the seller participant submits information to workstation 101, workstation 101 may communicate the information to server 104, for example, where the information may be subsequently submitted to database 180, as discussed above. Assuming such a policy already has an assigned universal identifier, as a result of indicating a desire to resell such a policy, server 104 may assign, for example, a new universal identifier to the policy and return the new identifier to the seller participant via workstation 101. Alternatively, the previous identifier may be maintained.

According to an embodiment of the invention, as a result of indicating a desire to resell a resale policy, server 104 and/or an administrator associated therewith, for example, may again interact with one or more other systems and/or individuals to obtain any additional information related to the policy (e.g., prior medical/health information on the insured and/or a current medical evaluation of the insured, one or more life expectancy evaluations of the insured of a policy, etc). Again, such additional information may be subsequently submitted to database 180.

As discussed above, according to an embodiment of the invention, server 104 may create a profile for a policy as the policy is submitted to system 100 for sale and may update the profile as additional information is obtained and/or changes.

As discussed above, a policy submitted to system 100 may be in, for example, one of three states including, for example, a pending state, an active/live state, and a closed state (again, one skilled in the art will recognize that while policies may be described herein as being in one of several states, fewer, additional, different and/or no states may also be used). According to one embodiment of the invention, as a result of a seller participant indicating a desire to sell a policy as discussed above, server 104 may cause the policy to proceed initially from the pending state, to the active/live state, to the closed state.

In particular, according to an embodiment of the invention, as a result of a seller participant indicating a desire to sell a policy as discussed above, server 104 may cause the policy to proceed initially to the pending state. In this state, information as discussed above may be obtained for the policy and in particular, that information necessary for a potential buyer participant to sufficiently evaluate the policy in order to determine a value for the policy, such as a fair market value, may be obtained. Once such information is obtained, the policy may need to go through an approval process. Thereafter, server 104, for example, may deem the policy as ready to proceed to the active/live state.

The active/live state may include, for example, a period of time (e.g., an auction period) during which buyer participants may submit bids on the policy. The start date/time of the auction period and the duration (e.g., length of time) of the auction period may be predetermined by server 104, for example, and/or by the seller participant. According to an embodiment of the invention, the seller participant may also indicate a starting bid price/amount and/or minimum bid/selling price/amount the seller participant is willing to accept for the policy (e.g., if the minimum price is not obtained at the end of the auction period, the policy may not sell, even though bids less than minimum price were submitted). The seller participant may also indicate a "trade it now" price, or in other words, a price at which the seller participant is willing to sell the policy if obtained, thereby ending the auction period.

During the active/live state, buyer participants, via a workstation 101, may submit one or more bids on a policy. Workstation 101 may communicate such bids to server 104, which in turn may communicate/make available the bids to other participants, including the seller participant and other buyer participants, via the workstations. Server 104 may continue to accept bids on a given policy for the duration of an auction period, for example, and/or until a given buyer participant submits a trade it now price, for example, which may cause server 104 to end the auction period.

According to an embodiment of the invention, at the end of the auction period server 104 may move a policy to the closed state, where a winning bid and thereby winning buyer participant is determined. Server 104 may notify, via workstations 101, the seller participant and the buyer participant (that submitted the winning bid) of the sale. During the closed state, the purchased policy may also be cleared. As indicated, back office clearing center 112 and/or server 104 may, at least in part, assist in, cause, and/or provide functions related to clearing a purchased policy and/or to verifying that a purchased policy is cleared. Again, the clearing of a purchased policy may include, for example, the receiving of monetary funds (e.g., equal to the winning bid amount) from the buyer participant and the sending of such funds, at least in part, to the seller participant, for example, and/or the transferring of a portion of such funds to any brokers, for example, and/or to system 100 (e.g. a service fee). Alternatively and/or in addition, the clearing of a purchased policy may include, for example, the transferring of monetary funds from an account of the buyer participant to the account of the seller participant, for example, and/or the transferring of a portion of such funds to an account of any broker, for example, and/or to an account associated with system 100 (e.g. a service fee). The clearing of a purchased policy may also include the preparation and/or execution of a life settlement agreement in the case of a first time sale of a policy and/or may include the preparation and/or execution of an agreement(s) for the transferring/changing of the ownership of the policy and/or the beneficial interest in the policy. Such agreements may involve the buyer participant, the seller participant, and the insurance company/issuer of the policy (e.g., the insurance company may need to be notified of any changes in ownership and the beneficiary). Back office clearing center 112 may, at least in part, assist in transferring and/or executing such agreements.

Obtaining and Viewing Policies

According to various embodiments of the invention, a participant (including, for example, buyer and/or seller participants) may request via a workstation 101, for example, to obtain information on one or more policies that are maintained by system 100 in database 180. Participants may make such requests for various reasons such as:

1. To obtain information on a given policy based on, or example, an interest in purchasing the policy.
2. To obtain status information on a given policy. For example, a participant may want to know whether a given policy is in the pending, active/live, or closed state and what is the status of the policy in that state. For example, system 100 may indicate that a policy is currently in the pending state and that an auction of the policy will begin in "x" hrs, or that the policy is currently in the active/live state and the auction period has "x" hours left, or that the policy is currently in the closed state and in the process of being cleared.
3. To obtain status information on a given policy that is being auctioned, such as the current high bid and the amount of time left in the auction.
4. To obtain an indication of all policies that meet one or more criteria, etc.

One skilled in the art will recognize that a participant may request information on one or more polices for other reasons.

As such, according to an embodiment of the invention, a participant may submit via a workstation 101 a request to obtain information on a specific/particular policy. Using an interface provided by workstation 101 (such as a graphical interface/display), a participant may designate a specific/particular policy such as through the policy's universal identifier. In turn, workstation 101 may communicate the request (together with the identifier) to server 104, for example. In turn, server 104 may submit the request to (e.g., by query) database 180. In response, database 180 may return to server 104 one or more pieces of information associated with the policy, such as one or more pieces of the profile information. In turn, server 104 may provide the information to workstation 101, which may then provide the information to the participant, such as through a graphical interface/display. One skilled in the art will recognize that information may flow from database 180 to a participant at a workstation 101, for example, in other fashions.

For example, according to an embodiment of the invention, there is shown in FIG. 2 an example graphical interface/display 200 that workstation 101 may cause to be displayed to a participant as a result of the participant requesting information on a given policy (such as by specifying a universal identifier 202). As shown, graphical interface/display 200 may include a subset of information (as shown by columns) maintained on the requested policy, such as a subset of the profile information. For example, graphical interface/display 200 may include the universal identifier 204 assigned to the policy, the type 206 of the policy, the state of residence 208 of the insured, the gender 210 of the insured, the age 212 of the insured, the face value 214 of the policy, and the status 216 of the policy relative to the state the policy is currently in (in this example, the policy is in the pending state). One skilled in the art will recognize that other information (and less information) may be provided/displayed and may be displayed in a format different from that shown.

According an embodiment of the invention, upon receiving graphical interface/display 200, a participant may request via workstation 101 to obtain additional information on the selected policy (in this example, by selecting the universal identifier 204a, which may be in a form of hyper-link, for example). In response to this request, workstation 101 may communicate the request (which may include the universal identifier 204) to server 104, for example, to obtain the additional information, which information may include additional profile information maintained on the policy. After obtaining the information from database 180, server 104 may provide the information to workstation 101, which may then provide the information to the participant, such as through a graphical interface/display. For example, according to an embodiment of the invention, there is shown in FIG. 3A and FIG. 3B a portion of an example graphical interface/display 300 that workstation 101 may cause to be displayed to a participant as a result of the participant requesting additional information on the given policy shown in FIG. 2. FIG. 3A shows an upper portion of graphical interface/display 300 and FIG. 3B shows a lower portion of graphical interface/display 300. Hereinafter, "FIG. 3" will be used to collectively refer to FIG. 3A and FIG. 3B. One skilled in the art will recognize that other information (and less information) may be provided/displayed and may be displayed in a format different from that shown.

According to another embodiment of the invention, a participant may submit via a workstation 101 a search request to obtain information on policies that meet one or more search criteria. For example, policies may be searched based on the state of the policies (e.g., the pending state, the active/live state, the closed state), elements of the life insurance policies (e.g., the issuer, the policy type, the face value, the death benefit, the premium), features of the insured (e.g., age, gender, impairments/illnesses, state of residence), and broker commissions (e.g., the size of the commissions). As such, using an interface provided by workstation 101 (such as a graphical interface/display), a participant may designate a search request and one or more search criteria. In turn, workstation 101 may communicate the request (together with the criteria) to server 104, for example, which may in turn submit the search request (e.g., query) to database 180. In response, database 180 may return to server 104 the universal identifier associated with each policy matching the search criteria and possibly one or more pieces of information associated with each policy, such as one or more pieces of the profile information. In turn, server 104 may provide the information to workstation 101, which may then provide the information to the participant, such as through a graphical interface/display. Again, one skilled in the art will recognize that information may flow from database 180 to a participant at a workstation 101, for example, in other fashions.

For example, according to an embodiment of the invention, there is shown in FIG. 4 a portion of an example graphical interface/display 400 that workstation 101 may cause to be displayed to a participant as a result of the participant making a search request based on an age (e.g., 79) of the insured, for example. As shown, graphical interface/display 400 may include a listing of policies and in particular, a plurality of rows 401a-d (etc.), with each row corresponding to a different policy. For each policy, graphical interface/display 400 may include a subset of information maintained on each policy (as shown by the columns), such as a subset of the profile information. For example, graphical interface/display 400 may include the universal identifier 204 assigned to each policy, the type 206 of each policy, the state of residence 208 of the insured for each policy, the gender 210 of the insured for each policy, the age 212 of the insured for each policy, the face value 214 of each policy, and the status 216 of each policy relative to the state the policy is currently in. One skilled in the art will recognize that other information (and less information) may be provided/displayed and may be displayed in a format different from that shown.

According an embodiment of the invention, upon receiving graphical interface/display 400, a participant may request via workstation 101 to obtain additional information on a given policy (e.g., by selecting a universal identifier 204a, which may be in a form of hyper-link, for example). In response to this request, workstation 101 may communicate the request (which may include the universal identifier 204 of the selected policy) to server 104, for example, to obtain the additional information, which information may include additional profile information maintained on the selected policy. After obtaining the information from database 180, server 104 may provide the information to workstation 101, which may then provide the information to the participant, such as through a graphical interface/display (e.g., similar to graphical interface/display 300).

Figure 5:
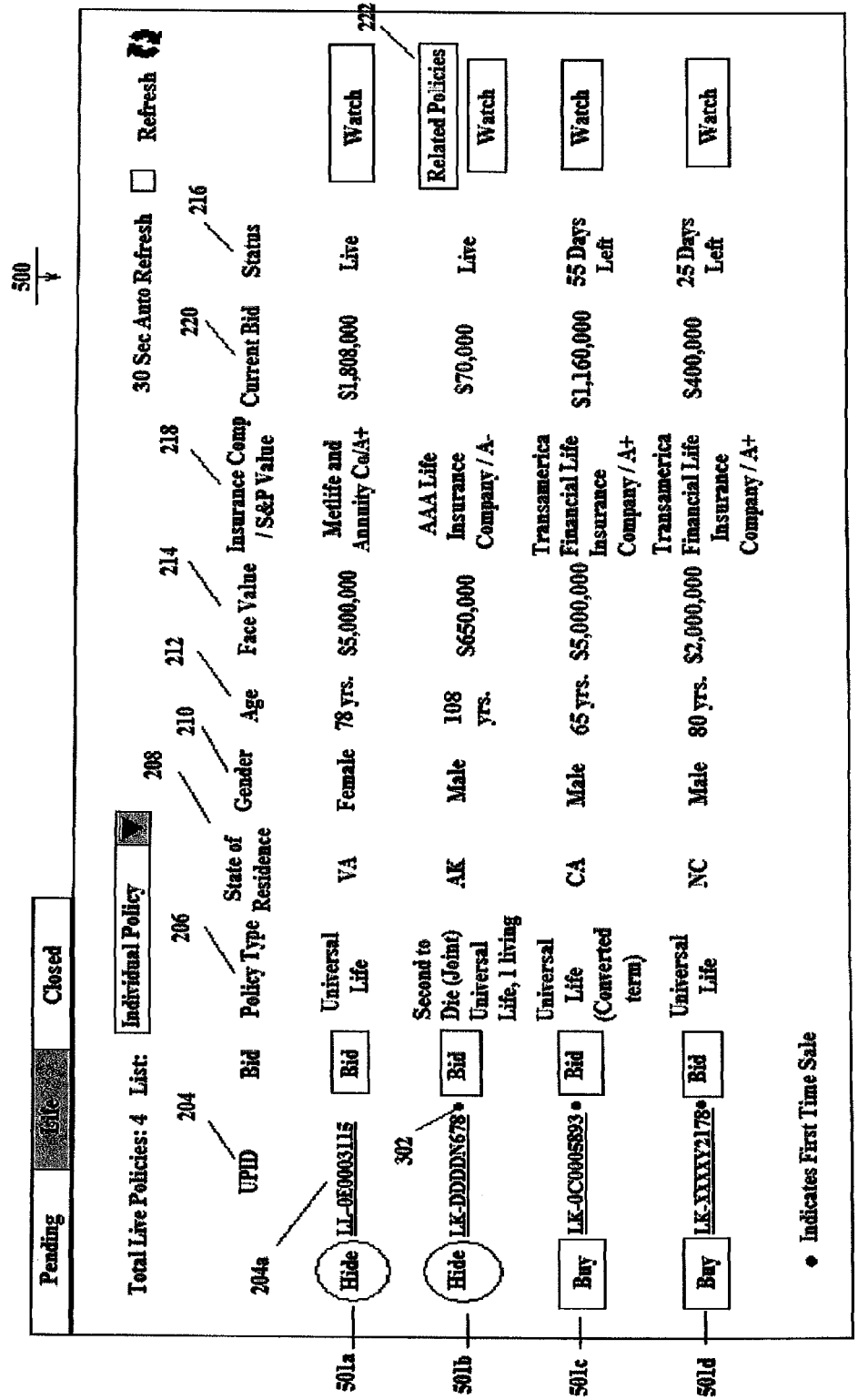
FIG. 5 shows another example graphical display/interface according to an embodiment of the invention.

As another example and according to another embodiment of the invention, there is shown in FIG. 5 an example graphical interface/display 500 that workstation 101 may cause to be displayed to a participant as a result of the participant making a search request to obtain all policies that are currently in the active/live state, for example. In response to this request, workstation 101 may provide to the participant (as a result of communicating with server 104, for example) all such policies. As shown, graphical interface/display 500 may include a listing of policies and in particular, a plurality of rows 501a-d (etc.), with each row corresponding to a different policy. For each policy, graphical interface/display 500 may include a subset of information maintained on each policy (as shown by the columns), such as a subset of the profile information. For example, graphical interface/display 500 may include the universal identifier 204 assigned to each policy, the type 206 of each policy, the state of residence 208 of the insured for each policy, the gender 210 of the insured for each policy, the age 212 of the insured for each policy, the face value 214 of each policy, and the status 216 of each policy relative to the active/live state, for example. Graphical interface/display 500 may also include the issuer/insurance company 218 of each policy and possibly a rating of the issuer (e.g., A creditworthiness evaluation may be performed on the insurance company. This creditworthiness evaluation may be based on existing ratings of the insurance company. Ratings may be performed by companies such as Standard & Poor, Moody, etc., or any other suitable or accepted ratings agency) and the current highest bid 220 for the policy. One skilled in the art will recognize that other information (and less information) may be provided/displayed and may be displayed in a format different from that shown. One skilled in the art will also recognize that a participant may make similar search requests to obtain all policies that are currently in the pending and/or closed state (a graphical interface/display for the closed state may also include the closing/winning bid for a policy).

According an embodiment of the invention, upon receiving graphical interface/display 500, a participant may request via workstation 101 to obtain additional information on a given policy (e.g., by selecting a universal identifier 204a of that policy). In response to this request, workstation 101 may communicate the request (which may include the universal identifier 204 of the selected policy) to server 104, for example, to obtain the additional information, which information may include additional profile information maintained on the selected policy. After obtaining the information from database 180, server 104 may provide the information to workstation 101, which may then provide the information to the participant, such as through a graphical interface/display (e.g., similar to graphical interface/display 300).

Again, one skilled in the art will recognize that policies may be searched and/or selected based on one or more other criteria than those discussed above.

Related Policies

According to an embodiment of the invention, one or more insurance policies maintained in database 180 may be deemed related. For example, two or more policies may be deemed related because they have one or more common insured. By relating policies, a seller and/or buyer participant, for example, may obtain information on a first policy via workstation 101, for example, as discussed above and then determine/obtain, such as by making a request, other policies that may be deemed related to the first policy. For example, according to an embodiment of the invention, a participant may view information on a first policy via workstation 101. In addition, workstation 101 may provide the participant the ability/option (e.g., via a selectable option, such as selectable option 222 in FIGS. 2-5) to make a request to obtain other policies that may be deemed related to the first policy. Based on such a request, information on these other policies (e.g., each policy's universal identifier) may be made available to the participant via workstation 101, for example. Thereafter, the participant may request additional information on the related polices by selecting any such policy.

For example, referring again to FIG. 2, a participant may wish to obtain other policies that are deemed related to the displayed policy (which may be referred to as a first policy). According to an embodiment of the invention, the participant may request to obtain such related policies by selecting, for example, button/option 222. One skilled in the art will recognize that the participant may make the request in other fashions. As a result of making the request, workstation 101 may communicate the request (e.g., together with the universal identifier 202 of the displayed/first policy) to server 104, for example. In turn, server 104 may submit the request (e.g., by query) to database 180. In response, database 180 may return to server 104 one or more pieces of information associated with the policies that are deemed related to the first policy, such as one or more pieces of the profile information for each such policy. In turn, server 104 may communicate the information to workstation 101, which may then provide the information to the participant, such as through a graphical interface/display. One skilled in the art will recognize that information may flow from database 180 to a participant at a workstation 101, for example, in other fashions. For example, referring to FIG. 6A and FIG. 6B there is shown a portion of an example graphical interface/display 600 that workstation 101 may cause to be displayed to a participant as a result of the participant making a request to obtain polices that may be deemed to be related to the first policy shown in FIG. 2. FIG. 6A shows an upper portion of graphical interface/display 600 and FIG. 6B shows a lower portion of graphical interface/display 600. Hereinafter, "FIG. 6" will be used to collectively refer to FIG. 6A and FIG. 6B. As shown, graphical interface/display 600 may include a first area 602 showing information related to the first policy and may include a second area 604 listing the policies deemed to be related to the first policy. In particular, second area 604 may include a plurality of rows 601*a-d* (etc.), with each row corresponding to a different policy. For each policy in area 604, graphical interface/display 600 may include a subset of information maintained on each policy (as shown by the columns), such as a subset of the profile information. One skilled in the art will recognize that other information (and less information) may be provided/displayed and may be displayed in a format different from that shown. According an embodiment of the invention, upon receiving graphical interface/display 600, a participant may request via workstation 101 for example to obtain additional information (such as additional profile information) on any of the displayed related policies (e.g., by selecting the universal identifier 204*a* of that policy). In response to this request, workstation 101 may communicate the request (which may include the universal identifier 204 of the selected policy) to server 104, for example, to obtain the additional information. After obtaining the information from database 180, server 104 may communicate the information to workstation 101, which may then provide the information to the participant, such as through a graphical interface/display (e.g., similar to graphical interface/display 300).

According to various embodiments of the invention, two or more policies may be deemed related for various reasons. For example, two or more policies may be deemed related because the policies have a single trait in common (e.g., each policy has the same insured; each policy has an insured that is male). As another example, two or more policies may be deemed related because the policies have two or more traits in common (e.g., each policy has an insured of a certain age and gender). According to an embodiment of the invention, a first policy may be deemed related to a second policy and to a third policy, however, the second and the third policies may not be deemed related. As such, requesting policies that are deemed related to the second policy may provide the first policy, requesting policies that are deemed related to the third policy may provide the first policy, and requesting policies that are deemed related to the first policy may provide the second and/or the third policy.

Several examples of how policies may be related are provided below. However, one skilled in the art will recognize that a plurality of policies may be determined/deemed related for other reasons.

1. A group of policies may be related because they have one or more insured in common.
2. A group of policies may be related because they currently have a common beneficiary.
3. A group of policies may currently have different beneficiaries but may be related because at some point in time, possibly different times, a given beneficiary(s) was common between the policies.
4. A group of policies may be related because they currently have a common owner.
5. A group of policies may currently have different owners but may be related because at some point in time, possibly different times, a given owner owned each policy.
6. A group of policies may be related because the same broker is currently assisting in selling each policy.
7. A group of policies may be related because at some point in time, possibly different times, the same broker may have assisted in (or is assisting in) selling each policy.
8. A group of policies may have different insured; however, the policies may be related because the insured of each policy has common/similar demographics (e.g., the insured of each policy was born in the same state; the insured of each policy now live (or at some time did live) in the same state, or town, etc.; the insured of each policy are of the same or approximately the same age; the insured of each policy are of the same sex; the insured of each policy have the same religion; etc.).
9. A group of policies may have different insured; however, the policies may be related because the insured of each policy has (or at some time had) the same occupation, or work (or at some time worked) in the same industry, or work (or at some time worked) for the same company/employer, etc.
10. A group of policies may have different insured; however, the policies may be related because the insured of each policy has (or at some time had) the same illness(s).
11. A group of policies may have different insured; however, the policies may be related because the insured of each policy has (or at some time had) the same hobby(s).
12. A group of policies may have different insured; however, the policies may be related because the insured of each policy has the same degree(s)/professional license(s), attended the same college(s)/university(s), graduated in the same year or approximately the same year, etc.
13. A group of policies may have different insured; however, the policies may be related because the insured of each policy are related through a common genealogy (e.g., the insured of the different policies are husband-wife; the insured of the different policies are siblings; the insured of the different policies are cousins; the insured of the different policies are parents-children; the insured of the different policies are grandparents-grandchildren, etc.).

According to an embodiment of the invention, two or more policies that are deemed related may or may not be in the same state. For example, one or more policies may be in the active state and one or more policies may be in the closed state.

According to an embodiment of the invention, a group of policies that are deemed related may include one or more policies that are maintained by system 100 for information purposes. Specifically, as discussed above, database 180 may maintain information related to insurance policies, including life settlement and resale policies, that were submitted to system 100/server 104 not for auction/sale but rather, were entered into database 180 merely for informational purposes. Such policies may include, for example, policies that are still being held by the initial policy owner and are not for sale, policies that have been sold one or more times outside system 100, policies that are no longer active because, for example, the term expired, the premium payments lapsed, the owner terminated the policy by collecting the cash surrender value, etc. As such, when a participant requests to obtain policies that are related to a first policy (such as a policy that is in the active state and currently being sold), the participant may be provided with at least one policy that, for example, is not for sale and has never been sold, and that is related to the first policy because the two policies have, for example, a common insured.

According to an embodiment of the invention, a participant requesting related policies may be able to determine the specific reason why two or more policies are deemed related. For example, two or more policies may be deemed related because the policies are of the same type (e.g., term or whole life), because the policies have the same issuer, because the policies have insured from the same state, because the policies have insured of the same age, etc. In such cases, for example, a participant may request policies that are deemed related to a first policy and by then viewing, for example, information returned on the first and related policies, recognize that the policies each have the same value for one or more fields of information. According to a further embodiment of the invention, a participant may be provided with an indication that specifically identifies why two are more policies are deemed related (e.g., workstation 101 may provide to the participant an indication that each of the provided policies has an insured of the same age).

According to an embodiment of the invention, a participant requesting related policies may not be able to determine the specific reason why two or more policies are deemed related. For example, two or more policies may be deemed related based on privacy related information. As indicated above, privacy related information may include information only accessible to certain participants (such as the current owner of a policy). For example, two or more policies may deemed related because they have the same/common insured(s), or because they have the same/common beneficiary(s), or because they have the same/common owner, etc. (i.e., the policies may be deemed related based on information that system 100 would not readily provide to just any participant). In such cases, for example, a participant may request policies that are deemed related to a first policy and by then viewing, for example, information returned on the first and related policies, may not be able to recognize/determine that the policies each have the same value for one or more fields of information and as such, may not may not be able to determine the specific reason why two or more policies are deemed related.

According to a further embodiment of the invention, while a participant requesting related policies may not be able to determine the specific reason why two or more polices are deemed related, the participant may be able to determine in general why two or more polices are deemed related. For example, as discussed above, two or more policies may be deemed related because they have a common insured. As also discussed above, system 100 may provide to a participant for a given policy the age, state of residence, and gender of the insured of the policy, but not the insured's name, for example. In such a case, for example, a participant may request policies that are deemed related to a first policy and by then viewing, for example, information such as the age, state of residence, and gender of the insured of each related policy, recognize that the policies each have the same values for these fields and thereby determine that the policies are related because of a common insured, but without being told the specific identity of the insured. According to a further embodiment of the invention, a participant may be provided with an indication that identifies in general why two are more policies are deemed related (e.g., workstation 101 may provide to the participant an indication that each of the provided policies has a common insured, but not the identity of the insured).

According to a further embodiment of the invention, a participant requesting related policies may not be able to determine the specific reason why two or more polices are deemed related and in addition, may not be able to determine and may not be provided with any indication in general as to why two or more polices are deemed related.

As discussed above, a first policy may be deemed related to at least a second policy and to a third policy, however, the second and the third policies may not be deemed related. For example, the first policy may be related to the second policy based on a first trait and may be related to the third policy based on a second trait. As such, if a participant requests policies that are deemed related to the first policy, the participant may be provided with both the second and the third policies, even though the second and third policies are not deemed related. According to an embodiment of the invention, the participant, depending on the reason(s) for the relationships between the policies, may or may not be provided with the specific and/or general reason as to why the first policy is related to the second policy and may or may not be provided with the specific and/or general reason as to why the first policy is related to the third policy.

According to another embodiment of the invention, in addition to the participant being able to request policies that are deemed related to the first policy, the participant may be able to specify (e.g., through a selectable option) the trait(s) used to determine which policies the first policy is related to. In particular, continuing with the above example, the first policy may be related to the second policy based on a first trait, such as the policies having a common insured. Similarly, the first policy may be related to the third policy based on a second trait, such as the policies having a common owner. According to an embodiment of the invention, the participant may be able to request all policies that are related to the first policy based on the trait of common insured. In response to this request, the participant may be provided with the second policy but not the third policy.

According to various embodiments of the invention, policies may become related within system 100 in various fashions. In particular, according to one embodiment of the invention, a first policy may be deemed related to one or more other policies in advance of a participant requesting to obtain policies that are related to the first policy. For example, related policies may be linked within database 180, for example, such that the first policy will have an associated link to a second policy and/or the second policy will have an associated link to the first policy. One skilled in the art will recognize that a relationship between two or more policies may be maintained in other fashions. Accordingly, if server 104 receives a request from a workstation 101, for example, to obtain policies related to a first policy, server 104 may query the database for the first policy and from this query determine and/or obtain the related policies based on the linking of the policies. Thereafter, server 104 may provide information associated with the related policies to workstation 101, which may then make the information available to a participant.

According to another embodiment of the invention, rather than making a determination that a first policy is related to one or more other policies and maintaining in database 180, for example, a link between such policies, a determination as to which policies may be related to the first policy may be made at the time a participant makes a request to obtain such related policies. For example, upon server 104 receiving a request from a workstation 101, for example, to obtain policies related to a first policy, server 104 may query the database based on one or more traits to determine and/or obtain policies that may be related to the first policy. Thereafter, server 104 may provide information associated with the related policies to workstation 101, which may then make the information available to a participant.

Referring more specifically to linking of related policies within database 180, related policies may be linked in various fashions and at various times. For example, when a policy is initially submitted to database 180, a determination may be made as to whether the policy is related to other policies already in the database. This determination may be made as the policy is initially submitted to database 180, as additional information is gathered on the policy such as from health care providers or the insurer, etc. As another example, a determination may be made on a periodic basis (e.g., each night at midnight; each hour, etc.) based at least in part on the information available on the policy at that time. In particular, according to an embodiment of the invention, when a first policy is initially submitted to database 180 (e.g., by a seller participant for auction/sale), server 104 and/or an administrator of server 104, for example, may automatically search/query the database for commonality between one or more traits of the first policy and other policies already in the database (e.g., common insured). Thereafter, server 104 and/or the administrator may review the policies obtained from the search/query and determine/deem the first policy to be related to one or more of the obtained policies. The one or more traits that are used to make a determination as to whether two or more policies are related may be predetermined and/or may be determined by an administrator, for example, upon viewing the policies. For example, two or more policies may be deemed related because they have the same value for a given trait (e.g., same issuer; same insured). As another example, two or more policies may be deemed related because they have related values for a given trait (e.g., the insured for each policy have different occupations but in the same industry). Again, one skilled in the art will recognize that two or more policies may be deemed related for any number of reasons. Once server 104 and/or an administrator, for example, deems the first policy to be related to one or more other policies, server 104 and/or the administrator may link the policies, as discussed above.

According to another embodiment of the invention, when particular information (e.g., an owner of a policy) on a policy is updated or changed (e.g., by a participant, by server 104, by an administrator, etc.) within database 180, a determination may be made at to whether the policy is now related to other policies already in the database or alternatively, no longer related to other policies in the database. Again, such a determination may be made as the information is changed/updated in the database and/or on a periodic basis, etc. As such, according to an embodiment of the invention and as similarly discussed above, when information on a first policy is updated/changed in database 180, server 104 and/or an administrator of server 104, for example, may search/query the database for commonality between the first policy and other policies already in the database as result of the change, for example. Thereafter, server 104 and/or the administrator may review the policies obtained from the search/query and determine/deem the first policy to be related to one or more of the obtained policies, and then link the policies. Alternatively, when information on a first policy is updated/changed in database 180, server 104 and/or an administrator of server 104, for example, may determine that the first policy is no longer related to one or more other policies that were previously deemed to be related to the first policy and remove any link between the policies.

According to another embodiment of the invention, when a seller and/or buyer participant, for example, submits a policy to system 100, the participant may make an indication that the policy is related to one or more other policies already in the database. For example, according to an embodiment of the invention, when a participant via a workstation 101, for example, submits a first policy to system 100, the workstation (either directly or as a result of server 104, for example) may prompt (e.g., via a graphical interface/display) the participant to specify whether the first policy is related to one or more other policies within database 180 and/or may prompt the participant to provide information that may be used to determine whether the first policy is related to one or more other policies within database 180. According to an embodiment of the invention, the participant may refuse to respond to any such prompt. Assuming the participant responds, workstation 101 may then forward the participant's response(s) to server 104 and/or an administrator of server 104, for example. Based on the response, server 104 and/or the administrator may then update database 180 to reflect that the first policy is related to the one or more other policies by linking, for example, the polices as discussed above. Alternatively, server 104 and/or the administrator, for example, may make a determination based on the participant's response as to whether the first policy is related to one or more other policies, and may then update database 180 to reflect any relationships based on the resulting determination.

According to another embodiment of the invention, assuming a seller and/or buyer participant, for example, changes/updates particular information on a policy via a workstation 101, the workstation may prompt the participant to specify whether the first policy is now related to one or more other policies already in the database or alternatively, no longer related to other policies in the database. Alternatively, the workstation may prompt the participant to provide information that may be used to determine whether the first policy is now related or no longer related to one or more other policies within database 180. Based on the participant's response, server 104 and/or an administrator may then update database 180 accordingly. Again, a participant may refuse to respond.

According to an embodiment of the invention, a participant via a workstation 101, for example, may specify in various fashions that a first policy is related to one or more other policies within database 180 (or no longer related to other policies in the database). For example, workstation 101 may prompt the participant to specify specific policies (e.g., via a policy number and/or universal identifier) within database 180 that should/may be related (or no longer related) to the first policy. In response, the participant may then provide the policy number and/or universal identifier of one or more policies, for example. Based at least in part on the participant's response, server 104 and/or an administrator may then update database 180 to reflect that the first policy is related to the one or more specified policies by linking the polices as discussed above, for example. Alternatively, server 104 and/or the administrator may review the specified policies and determine whether the first policy should be related to one or more of these specified policies. The one or more traits that may be used to make this determination may be predetermined and/or may be determined by an administrator, for example, upon viewing the first and specified policies. In a similar fashion, the participant may specify one or more policies that should not longer be related to the first policy as a result of a change to the first policy (such as the insured of the first policy having changed occupations).

As another example, workstation 101 may prompt the participant to specify specific policies (e.g., via a policy number and/or universal identifier) within database 180 that should/may be related (or no longer related) to the first policy and may also provide the participant with a specific trait(s) that would cause one policy to be related or not related to another policy. For example, workstation 101 may prompt the participant to specify any other policies in database 180 in which the insured of the first policy and these other policies are in the same occupation. In response, the participant may then provide the policy number and/or universal identifier of any such other policies. Based at least in part on the participant's response, server 104 and/or an administrator may then update database 180 to reflect that the first policy is related to the one or more other specified policies by linking the polices as discussed above, for example, and/or may make a determination at to whether the first policy should be related to one or more of these specified policies. In a similar fashion, the participant may specify one or more other policies that should not longer be related to the first policy as a result of a change to the first policy.

As another example, workstation 101 may prompt the participant to specify specific information corresponding to one or more traits that may cause the first policy and other policies in database 180 to be related (or no longer related). The one or more traits for which the participant provides information may either be predetermined by system 100/server 104 and/or determined by the participant. For example, workstation 101 may prompt the participant to enter one or more portions of the genealogy of the insured of the first policy (e.g., the name of the insured's mother or father). Based at least in part on the genealogy provided by the participant, server 104 and/or an administrator of server 104, for example, may then search/query database 180 for commonality between the first policy and other policies (e.g., other policies that have insured corresponding to the provided genealogy). Thereafter, server 104 and/or an administrator may review the policies obtained from the search/query and determine/deem the first policy to be related to one or more of the obtained policies. As another example, workstation 101 may prompt the participant to enter the occupation of the insured of the first policy. Based at least in part on the participant's response, server 104 and/or an administrator, for example, may then search/query database 180 for commonality between the first policy and other policies (e.g., other policies that have insured corresponding to the provided occupation) and may then determine/deem the first policy to be related to one or more of the other policies. Again, in a similar fashion, the participant may specify one or more other policies that should no longer be related to first policy as a result of a change to the first policy.

According to another embodiment of the invention, workstation 101 may prompt the participant to submit information on one or more other policies that are not currently in database 180 but are deemed by the participant to be related to the first policy (again, the participant may decline to respond/provide such information). Workstation 101 may also provide the participant with a specific trait(s) that would cause one policy to be related to another policy. For example, workstation 101 may prompt the participant to provide information on one or more other policies owned by the participant that have the same insured as the first policy but that are not currently in database 180/not for sale, for example. In response, the participant may submit to workstation 101, for example, select information on such other policies, resulting in these other policies getting submitted to database 180 and linked to the first policy and possibly other policies already in database 180. Alternatively, server 104 and/or the administrator may review the provided information on the other policies and determine whether the first policy should to be related to one or more of these specified policies. The one or more traits that are used to make this determination may be predetermined and/or may be determined by an administrator, for example, upon viewing the policies. As such, as discussed above, database 180 may maintain information related to life insurance policies that were submitted to system 100/server 104 not for auction/sale but rather, were submitted to database 180 merely for informational purposes.

According to another embodiment of the invention, similar to how a participant via a workstation 101, for example, may specify that a first policy is related (or no longer related) to one or more other policies within database 180, an insurer of a policy (and/or a system associated with an insurer), for example, may also specify that a first policy is/may be related (or no longer related) to one or more other policies within database 180. For example, as server 104 and/or an administrator obtains information on a first policy from an insurer of that policy, the insurer may make an indication (e.g., based on an inquiry from the server/administrator) that the first policy is/may be related to one or more other policies. For example, the insurer may specify specific policies (e.g., via a policy number and/or universal identifier) that should/may be related to the first policy, as similarly discussed above. Based at least in part on the insurer's response, server 104 and/or an administrator may then update database 180 to reflect that the first policy is related to one or more of the specified policies by linking the polices as discussed above, for example, and/or may make a determination as to whether the first policy should be related to one or more of these specified policies. Alternatively, the insurer may specify specific information corresponding to one or more traits that may cause the first policy and other policies in database 180 to be related, as similarly discussed above. Based at least in part on the specified information, server 104 and/or an administrator, for example, may then search/query database 180 for commonality between the first policy and other policies. Thereafter, server 104 and/or the administrator may review the policies obtained from the search/query and determine/deem the first policy to be related to one or more of the obtained policies and then update database 180 to reflect that the first policy is related to one or more of the obtained policies by linking the policies, as similarly discussed above.

One skilled in the art will recognize that policies may be deemed/determined related (or not related) and thereby linked/unlinked, for example, in other ways than those discussed above.

As indicated above, rather than making a determination that a first policy is related to one or more other policies and maintaining in database 180, for example, a link between such policies, a determination as to which policies may be related to a first policy may be made at the time a participant makes a request to obtain related policies. For example, upon server 104 and/or an administrator of server 104, for example, receiving a request from a workstation 101, for example, to obtain policies related to a first policy, server 104 and/or the administrator may search/query the database for commonality between one or more traits of the first policy and other policies already in the database (e.g., common insured). Thereafter, server 104 and/or the administrator may review the policies obtained from the search/query and determine/ deem the first policy to be related to one or more of the obtained policies. The one or more traits that are used to make a determination as to whether two or more policies are related may be predetermined and/or may be determined by an administrator, for example, upon viewing the policies and/or may be specified by a participant, for example. Once server 104 and/or the administrator, for example, deems the first policy to be related to one or more other policies, server 104 may communicate information associated with the related policies to workstation 101, which may then provide the information to the participant.

As discussed above, system 100 may allow a participant to make a request to obtain policies that may be deemed related to a first policy. As indicated, which policies are related to the first policy may be predetermined (e.g., linking) and/or determined as the participant makes the request. According to another embodiment of the invention, system 100 may automatically display, for example, policies to a participant at a workstation 101 in such a fashion that the participant may readily determine that certain policies are deemed related. For example, as discussed above, a participant may submit via a workstation 101 a search request to obtain information on policies that meet one or more search criteria, such as all policies that are currently in the active/live state. In turn, workstation 101 may communicate the request to server 104, for example, which may in turn submit the search request (e.g., query) to database 180. In response, database 180 may return to server 104 each policy matching the search criteria. In turn, server 104 may then determine from among these policies which policies may be related (again, such a determination may be made because certain policies are linked and/or server 104 and/or the administrator may review the policies obtained from the search/query and determine/deem based on one or more traits that certain policies should/may be related). Thereafter, server 104 may group, for example, related policies. For example, assuming the search produces "X" policies, server 104 may deem a first set of the policies to be related and make these a first group, a second set of the policies to be related and make these a second group, etc. Any given group may include only one policy in that the policy is not related to any other policy from the "X" policies. According to an embodiment of the invention, a policy may be in more than one group. Thereafter, server 104 may provide information on all "X" policies to workstation 101, but further denote the grouping of policies based on how the policies are related. In turn, workstation 101 may then provide the information to the participant, such as through a graphical interface/display.

According to an embodiment of the invention, the policies of each group may be displayed together (such as in successive rows) with some form of delineation (e.g., a line) between each group thereby allowing the participant to recognize related policies. According to an embodiment of the invention, the policies of each group may be displayed in a similar color and/or font (possibly or possibly not in successive rows). One skilled in the art will recognize that related policies (i.e., policies of each group) may be displayed/provided to the participant in other fashions that would allow the participant to recognize related policies. As discussed above, for any given group, a participant may or may not be able to determine and may or may not be provided with the specific reason why the polices are deemed related and in addition, may or may not be able to determine and may or may not be provided with any indication in general as to why policies are deemed related.

According to an embodiment of the invention, the grouping of related policies as discussed above may be a feature a participant may turn on/off.

Designating Primary/Secondary Transfers

As discussed above, database 180 may maintain an indication as to the number of times ownership a policy has been transferred (e.g., via sale) (at least in part). Again, for policies that may have been transferred at least once, all such transfers may have occurred via system 100 and/or at least one transfer may have occurred outside system 100. According to an embodiment of the invention, the indication as to the number of times a policy has been transferred as maintained by database 180 may include transfers that occurred outside system 100 (e.g., as discussed above, a seller participant may provide such information to system 100 when selling a policy via the system).

According to an embodiment of the invention, when a buyer and/or seller participant, for example, requests and obtains information on one or more policies (e.g., when specifying a particular universal identifier, when making a search request, when requesting related policies, when requesting additional information on a given policy, etc.) as discussed above, an indication as to the number of times ownership of a given policy has been transferred may be included in that information, as made available to the participant via a workstation 101, for example. According to an embodiment of the invention, the indication as to the number of times a given policy has been transferred as provided to a participant may only include the number of times the transfer occurred via sale (i.e., may exclude transfers that are not sales, such as bequests). According to another embodiment of the invention, the indication as to the number of times a given policy has been transferred as provided to a participant may include any transfer (e.g., sales and bequests).

According to various embodiments of the invention, the indication as to the number of times a given policy has been transferred may be provided to a participant in various fashions. For example, as shown in FIGS. 2 and 4-6, a "dot" 302 may be displayed/associated with a policy to indicate that the policy is in the process of and/or has been transferred once (i.e., a primary transaction). For example:

For a policy in the pending state: "dot" 302 may indicate that the policy, at the start of the associated auction period, is going to be auctioned for a first time.

For a policy in the active/live state: "dot" 302 may indicate that the policy is being auctioned for the first time.

For a policy in the closed state: "dot" 302 may indicate that the policy has been auctioned/sold once.

Similarly, if no such "dot" is displayed/associated with a policy (e.g., as shown in FIGS. 2 and 4-6), that policy may be in the process of and/or has been transferred at least twice (i.e., a secondary transaction). For example:

For a policy in the pending state: no "dot" 302 may indicate that the policy, at the start of the associated auction period, is going to be auctioned for at least a second time.

For a policy in the active/live state: no "dot" 302 may indicate that the policy is being auctioned for at least the second time.

For a policy in the closed state: no "dot" 302 may indicate that the policy has been auctioned/sold at least twice.

One skilled in the art will recognize that alternative ways may be used to indicate the number of times a policy has been transferred. For example, "dot" 302 may be displayed/associated with a policy to indicate that the policy is in the process of and/or has been transferred at least twice and no such "dot" may indicate that the policy may be in the process of and/or has been transferred once.

Similarly, one skilled in the art will recognize that rather than displaying/associating no "dot" 302 with a policy to designate that the policy may be in the process of and/or has been transferred at least twice, for example, a symbol other than a "dot" may be displayed/associated with such policies.

Similarly, rather than using a symbol(s) to indicate the number of times a policy has been transferred, certain colors and/or fonts and/or words may be used. For example, the universal identifier 204 of a policy as shown in FIGS. 2 and 4-6, for example, may be shown in a first color when the policy is in the process of and/or has been transferred once and may be shown in a second color when the policy is in the process of and/or has been transferred at least twice. As another example, a word, such as "primary" may be displayed/associated with a policy when the policy is in the process of and/or has been transferred once, and another word, such as "secondary" may be displayed/associated with a policy when the policy is in the process of and/or has been transferred at least twice.

According to another embodiment of the invention, rather than only indicating that a policy is in the process of and/or has been transferred at least twice, an indication specifically specifying/identifying the number of times the policy has been transferred may be provided. For example, an actual number (e.g., "3") and/or word ("three")) may be displayed/associated with a policy.

As similarly discussed above with reference to FIGS. 2 and 4-6, when a participant requests additional information on a given policy (e.g. as shown in FIG. 3), an indication 303 may also be provided to the participant to indicate the number of times the policy has been transferred (in FIG. 3, the word "primary" or "secondary" is shown being used, although other mechanisms may be used as discussed above).

According to an embodiment of the invention, an owner of a policy, for example, may specify/indicate (e.g., via a workstation 101, to an administrator of server 104, etc.) that server 104 should or should not make available to other participants the number of times the policy has been transferred. Such an indication (i.e., the turning on/off of this feature) may be maintained with the policy in database 180. As such, when a participant views, for example, one or more policies via workstation 101, for example, some policies may have associated/displayed therewith an indication as to the number of times the policy has been transferred and other policies may not. When a given policy has been configured by the owner of the policy to not have such information made available, the policy when viewed by a participant may include some designation that this information is not available.

As indicated above, a participant may submit via a workstation 101 a search request to obtain information on policies that meet one or more search criteria. According to an embodiment of the invention, a search criteria may include the number of times a policy has been transferred. For example, a search criteria may include any of: any policy that is in the process of and/or has been transferred once; any policy that is in the process of and/or has been transferred twice; any policy that is in the process of and/or has been transferred at least "x" times; any policy that is in the process of and/or has been transferred more than "y" times, etc.

Designating Chain-of-Custody

According to an embodiment of the invention, a seller and/or buyer participant, for example, may obtain information on a first policy via workstation 101, for example, as discussed above and then obtain, such as by making a request, not only an indication as to the number of times ownership of the policy has been transferred but information related to each transfer of ownership. In other words, according to an embodiment of the invention, a participant may obtain information on a first policy and then request a "chain-of-custody" for the policy, thereby obtaining information on the policy that shows how the policy moved from a first owner, to a second owner, etc., to the current owner and/or information related to each transfer and/or information related to each ownership. For example, as a participant views information on a first policy via workstation 101, the workstation may provide the participant the ability/option (e.g., via a selectable option, such as selectable option 402 in FIG. 3, for example) to make a request to obtain a chain-of-custody for the policy. One skilled in the art will recognize that the participant may make the request in other fashions (and from other graphical interfaces/displays, for example, including those shown in FIGS. 2 and 4-6). As a result of making the request, workstation 101 may communicate the request (e.g., together with the universal identifier 202 of the policy) to server 104, for example. In turn, server 104 may submit the request (e.g., by query) to database 180. In response, database 180 may return to server 104 one or more pieces of information associated with the chain-of-custody for that policy. In turn, server 104 may communicate the information to workstation 101, which may then provide the information to the participant, such as through a graphical interface/display. One skilled in the art will recognize that information may flow from database 180 to a participant at a workstation 101, for example, in other fashions.

As discussed above, certain information associated with a policy may be considered/referred to as "privacy related" information and as such, may not be accessible to certain participants when obtaining information on a given policy. Again, such information may include the identity of the insured, the identity of an owner of a policy, the identity of a beneficiary, the identity of a broker that is assisting/assisted in selling a policy, etc. According to various embodiments of the invention, the chain-of-custody for a policy may or may not include certain privacy related information (in general, the chain-of-custody may never include, for example, information that may be used to identify the insured of the policy).

For example, according to an embodiment of the invention, when a participant requests the chain-of-custody for a given policy, the participant may not be provided with the identity of the current owner of the policy or with the identity of any prior owner of the policy. Similarly, the participant may not be provided with the identity of a current broker assisting the current owner in selling the policy or with the identity of any prior broker that assisted a buyer and/or seller in buying or selling the policy. As another example, the participant may not be provided with the identity of the current beneficiary of the policy or with the identity of any prior beneficiary of the policy (the beneficiary of a policy may change as a result of the policy being transferred), etc.

According to another embodiment of the invention, certain information associated with the chain-of-custody for a policy that may be considered privacy related information may only be considered privacy related information if associated with the current owner of the policy. For example, when a participant requests the chain-of-custody for a policy, the participant may not be provided with the identity of the current owner of the policy, the identity of a current broker assisting the current owner in selling the policy, the identity of the current beneficiary, etc. However, the participant may be provided with the identity of one or more prior owners of the policy, the identity of one or more prior brokers that assisted prior owners in buying and/or selling the policy, the identity of one or more prior beneficiaries, etc.

According to an embodiment of the invention, certain information associated with the chain-of-custody for a policy that may be considered privacy related information may no longer be considered privacy related information after a certain number of transfers have occurred. For example, assume that a policy has transferred once from an original owner "A" to a second owner "B". If a participant requests the chain-of-custody for the policy, the participant may not be provided with the identity of the original owner "A" or the identity of the current owner "B". Assume now that the policy transfers again from second owner "B" to a third owner "C". If a participant now requests the chain-of-custody for the policy, the participant may not be provided with the identity of the current owner "B", but may now be provided with the identity of original owner "A".

According to an embodiment of the invention, certain information associated with the chain-of-custody for a policy that may be considered privacy related information may not be considered privacy related information after a certain period of time has passed. For example, assume again that a policy has transferred once from an original owner "A" to a second owner "B". Assume further that a participant now requests the chain of custody for the policy and that relative to this request, the transfer from "A" to "B" occurred within the past "X" months (e.g., relative to this request, the transfer occurred within some predetermined past period of time—such as some predetermine threshold period of time, such as "X" months). Because the transfer occurred within this predetermined threshold period of time, the participant may not be provided with the identity of the original owner "A" or with the identity of the current owner "B". Assume now that a participant requests the chain of custody for the policy and that relative to this request, the transfer from "A" to "B" occurred beyond the predetermine threshold period of time (e.g., more than "X" months ago). Because the transfer occurred beyond this predetermine threshold period of time, the participant may not be provided with the identity of the current owner "B", but may now be provided with the identity of original owner "A".

According to an embodiment of the invention, certain information associated with the chain-of-custody for a policy that may be considered privacy related information may not be considered privacy related information depending on the state the policy is in and/or the status of the policy in a given state. For example, assume that a policy is owned by owner "A" and that owner "A" is now seeking to sell the policy. Assume further that the policy is in the pending or active/live state and that a participant "C" now requests the chain-of-custody for the policy. Because the policy is in the pending or active/live state, the participant may not be provided with the identity of owner "A". Assume now that a participant "B" has purchased the policy and the policy in the closed state and that participant "C" now requests the chain-of-custody for the policy. Because the policy is now in the closed state, participant "C" may now be provided with the identity of owner "A". Alternatively, participant "C" may not be provided with the identity of owner "A" if the policy is in the process of being cleared but may be provided with the identity of owner "A" once the policy clears.

One skilled in the art will recognize that privacy related information in connection with the chain-of-custody of a policy may be provided to a participant in other fashions than those discussed herein.

According to an embodiment of the invention, the current owner of a policy may be able to configure system 100 (such as via a graphical interface/display at a workstation 101 and/or via a user profile, for example) as to the information provided to any other participant when that participant requests a chain-of-custody for the policy. For example, system 100 may be pre-configured to provide and similarly not provide for any given policy a predefined set of information. The current owner of a policy may be able to over-ride such a configuration. For example, the default configuration may be to not provide the identity of the current owner. The current owner may indicate that their identity may be provided in response to a chain-of-custody request. Similarly, the default configuration may be to not provide the identity of the current owner but to provide the identity of any prior owner of the policy. The current owner may indicate that the identity of each previous owner of the policy should not be provided in response to a chain-of-custody request. As another example, the default configuration may be to provide certain information at certain times (e.g., the provided information may be tied to the state (e.g., pending/active/closed) the policy is in) in response to chain-of-custody request and the current owner may be able to over-ride/change this timing. According to an embodiment of the invention, the current owner may not be able to over-ride certain default configurations of system 100, such as not allowing the identity of the insured to be provided in response to a chain-of-custody request.

Referring now to examples of information that may be provided to a participant when requesting the chain-of-custody for a policy, assuming, for example, the policy is being sold for a first time (e.g., is in the pending state awaiting start of an auction period, is in the active/live state, or is in the closed state but has not yet cleared), in response to a participant's request, the participant may be provided with no information and/or simply an indication as to the state the policy is in and the status of the policy in that state (e.g., the policy is in the closed state and in the process of being cleared).

Alternatively, assuming the policy has/had loans and/or withdrawals associated therewith (as described above), the participant may be provided with such information. For example, the participant may be provided with:

1. Information related to any cash withdrawal(s) made by the current owner from a cash account associated with the policy (e.g., the amount of each withdrawal and the date the withdrawal was made, and/or any other information as discussed above).
2. Information related to any loan taken by the current owner against a cash account associated with the policy (e.g., the amount of each loan, the date the loan was made, whether the loan is outstanding or has been repaid, and/or any other information discussed above).
3. Information related to any loan taken by the current owner that names/named the policy as collateral (e.g., the amount of each loan, the date the loan was made, whether the loan is outstanding or has been repaid, and/or any other information discussed above).
4. Information related to whether the owner has financed any premiums of the policy.

One skilled in the art will recognize that other information as disclosed herein, for example, may be provided.

As another example, assuming a policy has been transferred once (e.g., in the case of selling the policy, the sale has cleared), in response to a participant requesting the chain-of-custody for the policy, the participant may be provided, for example, with:

1. The type of transaction that resulted in the transfer of ownership, such as a sale (and in particular, the type of sale—auction, advertisement, reverse auction, etc.), an assignment, a devise, a bequest, etc.

2. The identity (e.g., the name) of the transferor—here, the original owner of the policy. Again, system 100 may withhold the identity of the transferee—here, the current owner of the policy.
3. The date (e.g., month, day, year, hour, minute, and/or sec, etc.) the transfer occurred (e.g., the date the sale of the policy cleared).
4. If the beneficiary changed as a result of the transfer, possibly the identity of the previous beneficiary. Again, system 100 may withhold the identity of the beneficiary.

Assuming the transfer of ownership was the result of a sale, the participant requesting the chain-of-custody may also be provided, for example, with:
1. The price (e.g., the winning bid amount) at which the policy sold.
2. The identity of any broker that may have assisted the transferor/seller in selling the policy and possibly the commission/amount paid to the broker.
3. The identity of any broker that may have assisted the transferee/buyer in buying the policy and possibly the commission/amount paid to the broker. Alternatively, system 100 may withhold this information.
4. Any service fees that may have been paid (such as to system 100 and any other trading/auction/selling system) in relation to selling the policy.
5. In addition to the price at which the policy sold, each of the prices (and/or range of prices) at which the seller offered to sell the policy and/or each of the prices (and/or range of prices) at which one or more participants offered to purchase the policy.
6. The length of time for which the policy was for sale.

As similarly discussed above, assuming the policy has/had loans and/or withdrawals associated therewith (as described above), the participant may also be provided with such information including, for example:
1. Information related to any cash withdrawal(s) made by the current owner and/or the previous owner from a cash account associated with the policy.
2. Information related to any loan taken by the current owner and/or the previous owner against a cash account associated with the policy.
3. Information related to any loan taken by the current owner and/or the previous owner that names/named the policy as collateral.
4. Information related to whether the current owner and/or the previous owner has financed any premiums of the policy.

One skilled in the art will again recognize that other information as disclosed herein, for example, may be provided. One skilled in the art will also recognize that when a policy has been transferred more than once, in response to a participant requesting the chain-of-custody for the policy, the participant may be provided with any of the above described information for each transfer, for example.

As described above, one or more transfers of a given policy may have occurred outside system 100 and as such, system 100/database 180 may have full information on such transfers, limited information on such transfers, or no information on such transfers. As such, according to an embodiment of the invention, when a participant requests a chain-of-custody for a given policy, the participant may be provided with information related to transfers that occurred both via system 100 and outside system 100. For transfers that occurred outside system 100, the participant may be provided with the same degree/extent of information as provided for transfers that occurred via system 100 and/or may be provided with a lesser degree of information (depending on the extent to which system 100/database 180 has been notified of the outside transfers). Similarly, assuming system 100 has only been notified that a transfer occurred outside system 100 for a given policy but has not been provided with specific information on the transfer, a chain-of-custody for that policy may include gaps, for example, that simply indicate that some transfer occurred. Similarly, assuming system 100 has not been notified that a transfer occurred outside system 100 for a given policy, a chain-of-custody for that policy may be incomplete.

According to an embodiment of the invention, in response to a participant requesting the chain-of-custody for the policy, in addition to the participant being provided with any of the information as described above, the participant may also be provided (as part of the chain-of-custody) information related to any unsuccessful transfer of ownership of the policy (again, such unsuccessful transfers may have occurred via system 100 and/or outside system 100) including, possibly, any unsuccessful transfers by the current owner of the policy. Such information may include, for example:
1. The type of transaction/transfer (such as a sale, an assignment, a devise, a bequest, etc.) that was not successful.
2. A reason(s) why the transfer was not successful (e.g., a minimum bid was not obtained and/or any other reasons including those discussed above).
3. The identity (e.g., the name) of the transferor that attempted to transfer the policy. Alternatively, system 100 may withhold the identity of the transferor assuming for example, the transferor is the current owner of the policy.
4. The identity of the transferee to which the policy was not successfully transferred.
5. The date (e.g., month, day, year, hour, minute, and/or sec, etc.) the attempted/unsuccessful transfer occurred.

Assuming the attempted/unsuccessful transfer of ownership was an attempted sale of the policy, the participant requesting the chain-of-custody may also be provided, for example, with:
1. The price at which a transferor and transferee may have agreed to transfer the policy (albeit, unsuccessful).
2. The identity of any broker that may have assisted the transferor/seller in attempting to sell the policy and possibly the commission the broker did receive and/or would have received if the transfer had been successful.
3. The identity of any broker that may have assisted the transferee/buyer in attempting to buy the policy and possibly the commission the broker did receive and/or would have received if the transfer had been successful.
4. Any service fees that may have been paid (such as to system 100 and any other trading/auction/selling system) in relation to attempting to sell the policy.
5. Each of the prices (and/or range of prices) at which the seller offered to sell the policy and/or each of the prices (and/or range of prices) at which one or more participants offered to purchase the policy.
6. The length of time for which the policy was for sale.

One skilled in the art will recognize that other information as disclosed herein, for example, may be provided.

According to various embodiments of the invention, a participant may be provided with the chain-of-custody for a requested policy in various fashions. For example, the chain-of-custody may be provided to the participant as part of a graphical interface/display, with each transfer shown/arranged in a vertical fashion from the most recent transfer to oldest transfer (or vise versa). As another example, the chain-of-custody may be provided to the participant as part of a graphical interface/display, with each transfer shown/arranged in a horizontal fashion, such as in a timeline like fashion. Each transfer may be displayed with a minimal set of information, allowing the participant to then select any given transfer and thereby "expand" the selected transfer to show additional information. One skilled in the art will recognize that the information may be provided to a participant in other fashions.

Rate at which a Policy is Transferred

According to an embodiment of the invention, a seller and/or buyer participant, for example, may obtain information on a first policy via workstation 101, for example, as discussed above and then obtain, such as by making a request (e.g., via a selectable option as similarly discussed above), a limited set of information related to the chain-of-custody for the policy and in particular, only information related to successful sales of the policy (e.g., information related to unsuccessful transfers and to transfers other than sales/auctions/etc. may be excluded).

According to another embodiment of the invention, the information provided to the participant may be further limited and include, for example, for each successful sale of the policy the date/time (e.g., month, day, year, hour, minute, and/or sec, etc.) the policy sold (e.g., cleared) and the price (e.g., the agreed upon sale price and/or the winning bid amount and/or the price minus any broker and/or system fees) at which the policy sold. As an example, such information may be provided via a workstation 101 to a participant as a chart, with each row of the chart, for example, including the date/time the policy sold and the price at which the policy sold on that date. The chart may be ordered in chronological order and/or based on the size of the sale prices (descending/ascending order). As another example, such information may be provided via a workstation 101 to a participant as a displayed graph, with one axis representing the dates/times the policy sold and another axis representing the prices at which the policy sold. In this fashion, a participant may be able to determine the rate at which a given policy is being purchased and sold and the price change over time. According to another embodiment of the invention, the date/time and the price information for each of the sales may be mathematically combined into a single numerical value, such as an average. Such computations may be performed by server 104 and/or workstations 101 and/or a combination thereof.

According to a further embodiment of the invention, the information provided to the participant may be even further limited and include, for example, for each successful sale of the policy only the date/time (e.g., month, day, year, hour, minute, and/or sec, etc.) the policy sold (e.g., cleared). Again, in this fashion, a participant may be able to determine the rate at which a given policy is being purchased and sold or in other words, the rate at which a policy is changing hands.

One skilled in the art will recognize that information (e.g., date/time and/or price) associated with the rate at which a policy is being purchased and sold may be obtained by a participant as a result of the participant requesting the information (e.g., via a selectable option a similarly discussed above). As another example, such information may be provided to a participant as part of different request. For example, such information may be provided to a participant when the participant requests the chain-of-custody for a policy, when the participant requests additional information on a given policy (e.g., as shown in FIG. 3), as part of an interface that allows a participant to bid on a policy, etc.

Rate at which a Policy is Bid Upon

According to an embodiment of the invention, a seller and/or buyer participant, for example, may obtain information on a first policy via workstation 101, for example, as discussed above and then obtain, such as by making a request (e.g., via a selectable option as similarly discussed above), a limited set of information related to a particular sale of a policy. In particular, according to an embodiment of the invention, a participant may obtain for a given sale of a policy each of the prices at which the seller offered to sell the policy (assuming the seller changed the price) and/or the date/time (e.g., month, day, year, hour, minute, and/or sec, etc.) at which the various prices were set. Alternatively (and/or in addition), a participant may obtain for a given sale of a policy each of the prices (e.g., bids) at which a buyer(s) offered to purchase the policy and/or the date/time (e.g., month, day, year, hour, minute, and/or sec, etc.) at which the various offers were made. Such information may be provided for a particular sale of a given policy that has already occurred. Alternatively and/or in addition, such information may be provided for a current sale of a policy. In particular, according to an embodiment of the invention, a participant may obtain for a policy that is currently being auctioned via system 100 (i.e., for a policy that is in the active/live state) each of the bid amounts that have been submitted by buyer participants and/or the dates/times (e.g., month, day, year, hour, minute, and/or sec, etc.) at which the bids were submitted.

As similarly described above, such date/time and price/bid information may be provided via a workstation 101 to a participant as a chart, with each row of the chart, for example, including an offered sale and/or purchase/bid price and the date/time the offer was made. The chart may be ordered by time and/or the size of the various offered prices. As another example, such information may be provided via a workstation 101 to a participant as a displayed graph, with one axis representing the dates/times the offered sale and/or purchase/bid prices were made and another axis representing the corresponding offered prices. According to another embodiment of the invention, the date/time and the price information for a given sale may be mathematically combined into a single numerical value, such as an average. Such computations may be performed by server 104 and/or workstations 101 and/or a combination thereof.

One skilled in the art will recognize that date/time and/or price information associated with a particular sale of a given policy may be obtained by a participant as a result of the participant requesting the information (e.g., via a selectable option as similarly discussed above). As another example, such information may be provided to a participant as part of a different request. For example, such information may be provided to a participant when the participant requests the chain-of-custody for a policy, when the participant requests additional information on a given policy (e.g., as shown in FIG. 3), etc. As another example, as part of an interface provided by a workstation 101 that allows a participant to bid on an active/live policy, system 100 may provide to the participant a chart and/or graph, for example, that shows the bids submitted thus far and the date/time each bid was submitted.

Filtering Out Unwanted Policies

In various circumstances and/or for various reasons, a seller and/or buyer participant, for example, may want to disregard a given policy (e.g., not view a given policy, not obtain information on a given policy, and/or not buy a given policy) because the policy has one or more characteristics. For example, a participant may not want to buy a policy because the insured of the policy is a particular person, because the insured of the policy is related to a particular person, because the broker assisting in selling the policy is a particular person and/or entity, because the owner of the policy is a particular person and/or entity, etc. However, as discussed above, such information for a policy may be considered/referred to as "privacy related" information and as such, may not be accessible to certain participants when obtaining information on the policy. As such, a participant may not be able to purposely disregard (e.g., not buy) a given policy by merely obtaining and viewing information on the policy because the information that the participant needs to make such a decision is not available to the participant.

According to an embodiment of the invention, a participant may establish a profile, for example, such as via a workstation 101, setting forth one or more characteristics of policies such that if a policy has the designated characteristic(s), the participant may disregard the policy. According to an embodiment of the invention, the one or more characteristics may be related to privacy related information. Thereafter, prior to policies being made available to a participant via workstation 101 for example, the policies may be compared to (or filtered through) the participant's profile (such as by server 104 and/or workstation 101) and if there is a match between one or more characteristics set forth in the profile and a policy, the matching policy may be "filtered out" and thereby not made available to the participant (i.e., thereby allowing the participant to disregard the policy). By having the policies compared to (or filtered through) the participant's profile, the polices may be disregarded by the participant without revealing to the participant privacy related information, for example.

As an example, a participant may establish as part of the profile:
1. The identification (e.g., name, social security number, etc.) of one or more insured (or possible insured) of insurance policies, thereby designating/indicating that the participant wishes to disregard any policy in which the insured of that policy corresponds to any those set forth in the profile.
2. The identification (e.g., name, social security number, etc.) of one or more particular persons, thereby designating\indicating that the participant wishes to disregard any policy in which the insured of that policy is related to any of the one or more particular persons.
3. The identification of one or more particular brokers (or possible brokers), thereby designating\indicating that the participant wishes to disregard any policy that is currently being sold through the assistance of a broker and in which the broker corresponds to any broker set forth in the profile.
4. The identification of one or more particular owners (or possible owners) of insurance policies (e.g., the identification of one or more seller participants), thereby designating\indicating that the participant wishes to disregard any policy in which the current owner (e.g., seller participant) of the policy corresponds to any those set forth in the profile.
5. The identification of one or more particular beneficiaries (or possible beneficiaries) of insurance policies, thereby designating\indicating that the participant wishes to disregard any policy in which the current beneficiary of the policy corresponds to any those set forth in the profile.

One skilled in the art will recognize that other characteristics may be set forth in a profile.

According to various embodiments of the invention, a participant may establish a profile via a workstation 101 (e.g., through a graphical interface/display), which profile may then be stored as a permanent file, for example, at workstation 101 that is in use by the participant and/or at server 104 (e.g., at database 180 and/or computer readable medium 115), for example. Accordingly, the participant's profile may exist beyond each use of system 100 by the participant (e.g., such as when the participant logouts of and/or ceases using system 100). As another example, a participant's profile may be set forth as a configuration of system 100, for example, which configuration the participant may establish each time the participant uses system 100 (e.g., each time a participant logs into and/or begins using system 100) and which exists only for the duration of that use. For example, the participant may set forth the configuration via a graphical interface/display provided by workstation 101.

According to an embodiment of the invention, whether a participant's profile is created as a permanent file and/or a temporary configuration, server 104, for example, may filter out policies on behalf of a participant that the participant wishes to disregard. For example, as discussed above, a participant may submit via a workstation 101 a request to obtain information on one or more policies (e.g., a search request with one or more search criteria—for example, all policies in a given state, all policies for which the insured is of a given age, etc.). For example, assuming the participant submits a search request, workstation 101 may communicate the request (together with the search criteria) to server 104, for example, which may in turn submit the search request (e.g., query) to database 180. In response, database 180 may return to server 104 one or more pieces of information for each policy matching the search criteria including, for example, privacy related information. In turn, server 104 may compare the policies to the participant's profile (i.e., filter the policies through the profile comparing, for example, privacy related information to the one or more characteristics set forth in the profile) and then remove from the policies any policy for which there is a match between one or more characteristics set forth in the profile and the policy. According to another embodiment of the invention, server 104 may submit the search request to database 180 such that the request includes the one or more characteristics from the participant's profile, thereby having database 180 not obtain any policy for which there is a match between one or more characteristics set forth in the profile and the policy. Regardless of how the policies may be filtered out, server 104 may thereafter provide information (minus privacy related information, for example) on the remaining policies to workstation 101, which may then provide the information to the participant, such as through a graphical interface/display. Accordingly, those policies that the participant wishes to disregard are removed by system 100 and not provided to the participant. In addition, the disregarded policies are removed without revealing to the participant privacy related information, for example. According to an embodiment of the invention, server 104 may provide to workstation 101 the number of policies that were removed as a result of the participant's profile, which number may also be provided to the participant.

As another example, when a participant requests policies that may be related to a first policy (as discussed above), server 104 (e.g., after obtaining the related policies) may also compare, for example, the "related" policies to the participant's profile, removing from the related policies any policy having characteristics corresponding to one or more characteristics set forth in the participant's profile.

According to another embodiment of the invention, whether a participant's profile is created as a permanent file and/or a temporary configuration, a workstation 101 that is in use by a participant, for example, may filter out policies that the participant wishes to disregard. As similarly discussed above, a participant may submit via the workstation a request to obtain information on one or more policies (e.g., a search request with one or more search criteria, or a request to obtain related policies, etc.). For example, assuming the participant submits a search request, the workstation may communicate the search request to server 104, for example, which may in turn submit the search request (e.g., query) to database 180. In response, database 180 may return to server 104 one or more pieces of information for each policy that matches the search criteria including, for example, privacy related information.

In turn, server 104 may thereafter provide the information on the obtained policies to the workstation. Thereafter, the workstation may compare the returned policies to the participant's profile (i.e., filter the policies through the profile comparing, for example, privacy related information to the one or more characteristics set forth in the profile) and then remove from the policies any policy for which there is a match between one or more characteristics set forth in the participant's profile and the policy. The workstation may then provide information on the remaining policies to the participant, such as through a graphical interface/display, removing, however, any privacy related information. Similar to above, the workstation may also provide to the participant the number of policies that were removed as a result of the participant's profile.

One skilled in the art will recognize that policies having characteristics corresponding to one or more characteristics set forth in a participant's profile may be "filtered out" in fashions other than those discussed above, including through a combination of server 104 and a workstation 101.

One skilled in the art will also recognize that a participant's profile for designating characteristics and thereby policies the participant wishes to disregard may bet set forth in fashions other than those discussed above. For example, each time a participant makes a request via a workstation 101, for example, to obtain and/or view policies (e.g., via a search request), the participant may designate one or more characteristics and thereby policies the participant wishes to disregard with respect to that request. For example, assuming server 104 provides the filtering, the workstation 101 may forward the designated one or more characteristics along with the request to server 104 such that server 104 may perform the filtering. Alternatively, assuming the workstation in use by a participant provides the filtering, the workstation may forward the request to server 104 and then upon receiving policies from server 104 in response to the request, use the designated one or more characteristics to filter the policies. Again, one skilled in the art will recognize that other variations are possible.

As discussed above, the one or more characteristics a participant may designate as part of the participant's profile, for example, may include/correspond to policy information that may be considered/referred to as "privacy related" information. Nonetheless, one skilled in the art will also recognize that the designated characteristics may also include/correspond to information that the participant could readily obtain/view once obtaining a policy (e.g., the gender of an insured).

As discussed above, the one or more characteristics a participant may designate as part of the participant's profile, for example, may include/correspond to current policy information. According to another embodiment of the invention, the one or more characteristics a participant may designate as part of the participant's profile may include/correspond to non-current policy information. For example, as discussed above a participant may establish as part of the profile the identification of one or more owners (or possible owners) of policies, thereby designating\indicating that the participant wishes to disregard any policy in which the "current" owner of the policy corresponds to any those set forth in the profile. According to an embodiment of the invention, a participant may also (and/or alternatively) establish as part of the profile the identification of one or more owners (or possible owners) of policies, thereby designating\indicating that the participant wishes to disregard any policy in which an owner that owned that policy at any time corresponds to any those set forth in the profile. As another example, a participant may establish as part of the profile the identification of one or more brokers (or possible brokers), thereby designating\indicating that the participant wishes to disregard any policy in which a broker that assisted in the buying and/or selling of that policy at any time corresponds to any those set forth in the profile. One skilled in the art will recognize that other examples are possible.

Assuming, for example, that a participant may designate one or more characteristics as a profile (e.g., as a permanent file and/or system configuration) as discussed above, according to another embodiment of the invention, system 100 may limit how often/how frequently the participant may alter the profile, for example. For example, a participant may be limited to modifying the profile to "y" times every "x" months, days, hours, and/or minutes, etc. and/or may be limited to modifying the profile to only "z" times per use of system 100 (e.g., once per user-session of system 100, where a user session may be the time between a participant logging into and out of system 100, for example). As another example, the participant may be limited to modifying a given characteristic set forth in a profile to "y" times every "x" months, days, hours, and/or minutes, etc. and/or may be limited to modifying a given characteristic to only "z" times per use of system 100. According to another embodiment of the invention, once a participant alters a profile and/or characteristic of the profile, the new profile (and/or modified characteristic) may not go into effect until a certain amount of time (e.g., "x" months, days, hours, and/or minutes, etc.) has passed. Once skilled in the art will recognize that other variations may be used including a combination of limiting the frequency in which a participant may alter a profile and controlling when an altered profile goes into effect.

Assuming, for example, that a participant may designate one or more characteristics as part of a request as discussed above, according to another embodiment of the invention, system 100 may limit how often/how frequently the participant may designate such characteristics. For example, a participant may be limited to making requests for policies in which the requests include designated characteristics to "y" times every "x" months, days, hours, and/or minutes, etc. and/or may be limited to including designated characteristics in requests to only "z" times per use of system 100. As another example, a participant may be limited to including a given characteristic in requests for policies to "y" times every "x" months, days, hours, and/or minutes, etc. and/or may be limited to including a given characteristic in requests to only "z" times per use of system 100. Once skilled in the art will recognize that other variations may be used.

Third Party Filtering Out of Unwanted Policies

As discussed above, a seller and/or buyer participant, for example, may want to disregard a given policy (e.g., not view a given policy, not obtain information on a given policy, and/or not buy a given policy) because the policy has one or more characteristics. For example, a buyer participant may not want to buy a policy because the insured of the policy is a particular person, because the insured of the policy is related to a particular person, because the broker assisting in selling a policy is a particular person and/or entity, because the owner of a policy is a particular person and/or entity, etc. However, as discussed above, such information for a policy may be considered/referred to as "privacy related" information and as such, may not be accessible to certain participants when obtaining information on the policy. According to an embodiment of the invention as discussed above, a participant may establish a profile, for example, setting forth one or more characteristics of policies (e.g., characteristics pertaining to privacy related information) such that if a policy has the designated characteristic(s), the participant may disregard the policy. As further discussed above, server 104 for example, may use such a profile to filter out policies that the participant wishes to disregard prior to providing such policies to the participant. Nonetheless, there may be various situations and/or reasons where a participant does not wish to disclose to server 104 for example the characteristic(s) and thereby policies that the participant wishes to disregard.

According to another embodiment of the invention as also discussed above, rather than server 104, for example, using a participant's profile to filter out policies that the participant wishes to disregard, a workstation 101 in use by the participant may receive information including, for example, privacy related information on one or more policies from server 104, use the profile to filter out from these policies any policy the participant may wish to disregard, and then provide information (minus the privacy related information) on the remaining policies to the participant. Nonetheless, there may be various situations and/or reasons where a system 100/server 104, for example (and/or an operator thereof, for example), may not want to send/provide to workstation 101 such privacy related information.

Figure 7:
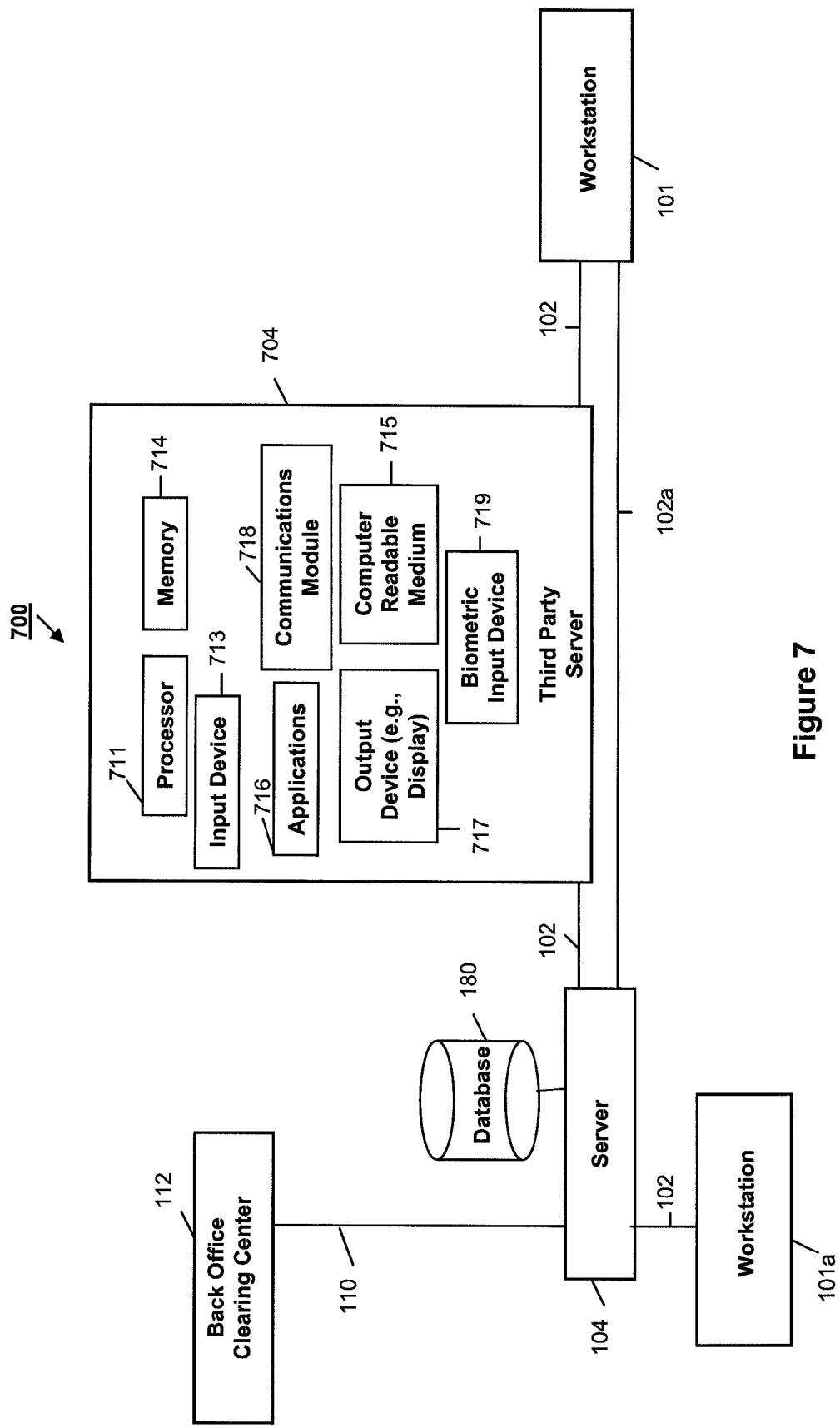
FIG. 7 shows another auction/trading system according to an embodiment of the invention.

Referring now to FIG. 7, there is shown an electronic trading system 700 according to an embodiment of the invention for transferring insurance policies. System 700 is similar to system 100 and further includes filtering server (or "third-party" filtering server) 704. Filtering server 704 may be connected to server 104 and one or more workstations 101 directly and/or through one or more communications networks, such as network 102. As further discussed below, at least a portion of the communications between a workstation 101 and server 104 may occur through server 704. As shown, not all workstations (such as workstation 101a) may be connected to/have access to server 704. In addition, system 700 may include more than one server 704, such that at least a portion of the communications between a first workstation 101 and server 104 may occur through a first server 704 and least a portion of the communications between a second workstation 101 and server 104 may occur through a second server 704, for example.

In general, server 704 may be any general purpose or special purpose computing device and in particular, may be any suitable server, processor, computer, mainframe computer, computing device, data processing device, and/or any combination thereof. As shown in FIG. 7, server 704 may include one or more processors 711, a memory 714, and one or more applications 716, which may be operable to providing filtering services as further disclosed herein. Applications 716 may be embodied as computing instructions including, for example, one or more software modules that reside in memory 714 and execute there from on processor 711 and/or one or more firmware and/or hardware modules. Server 704 may also include one or more communications modules 718 for interfacing with and communicating over communications network(s) 102 (and possibly other communications networks not shown) and for transmitting and/or receiving information to/from workstations 101 and server 104. Server 704 may also include a computer readable medium 715 (e.g., disk drive) for storing applications 716, for example, and/or participant profiles, for example, as further disclosed herein. Server 704 may also include at least one output device 717 and at least one input device 713, which devices may be used for example, by an administrator. Server 704 may also include at least one biometric input device 719 for entering biometric information, such as a fingerprint, to gain access to server 704, such as by an administrator. While server 704 is shown as a single server, one skilled in the art will recognize that server 704 may include a plurality of servers, including redundant/backup servers. According to an embodiment of the invention, server 704 may, at least in part, be a web server, such as an http (hypertext transfer protocol) web server.

According to an embodiment of the invention and as similarly discussed above, a participant may establish a profile, such as via a workstation 101, setting forth one or more characteristics of policies such that if a policy has the designated characteristic(s), the participant may disregard the policy. According to a further aspect of an embodiment of the invention, prior to policies being made available to a participant via a workstation 101 for example, server 704 may compare the policies to the participant's profile (e.g., filter the policies through the profile comparing, for example, privacy related information to the one or more characteristics set forth in the profile) and based at least in part on determining that there is a match between one or more characteristics set forth in the profile and a given policy, remove/filter-out such policies. Thereafter, server 704 may provide any remaining policies to the workstation 101, which may provide the remaining policies to the participant, such as through a graphical interface/display.

More specifically, according to an embodiment of the invention, a participant may establish a profile via a workstation 101 (e.g., through a graphical interface/display), which profile may then be stored as a permanent file, for example, at server 704 for example (as a database, for example, within computer-readable medium 715, for example), and/or which profile may be stored as a permanent file at workstation 101 and transferred to server 704 at the start a participant's use of system 700 (e.g., when a participant logs into and/or begins using system 700) for example, etc. Alternatively and/or in addition, a participant may establish a profile separate from workstation 101 and/or server 104, such as through direct communications with server 704, which profile may then be stored as a permanent file, for example, at server 704 (as a database, for example, within computer-readable medium 715, for example). Accordingly, the participant's profile may exist beyond each use of system 700 by the participant. According to another embodiment of the invention, a participant may establish a profile as a configuration of a system 700, for example, which configuration the participant may establish each time the participant uses system 700 (e.g., each time a participant logs into and/or begins using system 700) and which exists only for the duration of that use. For example, the participant may set forth the configuration via a graphical interface/display provided by workstation 101 (and/or by server 704—e.g., via a web interface), which configuration may then be forwarded to server 704 (and stored therein as a database, for example, within computer-readable medium 715, for example). One skilled in the art will recognize that a participant's profile for designating characteristics and thereby policies the participant wishes to disregard may bet set forth in fashions other than those discussed above.

Assuming a participant has established a profile, as similarly discussed above a participant may submit via a workstation 101 a request to obtain information on one or more policies (e.g., a search request with one or more search criteria—for example, all policies in a given state, all policies for which the insured is of a given age, etc.—and/or a request to obtain related policies, etc.). Assuming the participant submits a search request, according to an embodiment of the invention, workstation 101 may communicate the request (together with the search criteria) to server 104, for example, either directly, or via server 704, which may then forward the request to server 104. In turn, server 104 may submit the search request (e.g., query) to database 180, which may then return to server 104 one or more pieces of information for each policy matching the search criteria. According to an embodiment of the invention, included in this information may be one or more pieces of privacy related information (accordingly, the information may include, for example, first information such as policy profile information and second information such as privacy related information). In turn, server 104 may thereafter provide the information (including the privacy related information) on the obtained policies to server 704. Thereafter, server 704 may compare the returned policies (e.g., various aspects of the privacy related information) to the participant's profile (i.e., filter the policies through the profile comparing, for example, privacy related information to the one or more characteristics set forth in the profile) and then based at least in part on determining there is a match between one or more characteristics set forth in the participant's profile and a given policy, remove/filter-out from the policies any such policy. Server 704 may then provide information on the remaining policies (minus any privacy related information) to workstation 101, which may then provide the information to the participant, such as through a graphical interface/display. Accordingly, those policies that the participant wishes to disregard are removed by server 704 and not provided to the participant. In addition, the disregarded policies are removed without revealing to the participant and/or workstation 101 privacy related information. Similarly, the disregarded policies are removed without revealing to server 104 (and possibly workstation 101) for example, the characteristic(s) (e.g., the identifications of insured individuals) and thereby the policies that the participant wishes to disregard. According to an embodiment of the invention, server 704 may provide to workstation 101 the number of policies that were removed as a result of the participant's profile, which number may also be provided to the participant.

According to an embodiment of the invention, if a participant has not established a profile, a workstation 101 may forward any request from the participant directly to server 104, for example, and/or similarly, server 104 may forward any obtained policies (minus privacy related information) directly to workstation 101. Alternatively, such requests for policies may continue to go from a workstation 101 to server 704 and then to server 104 and/or similarly, from server 104 to server 704, and then to workstation 101 (minus privacy related information).

According to an embodiment of the invention, whether a participant has or has not established a profile, communications other than requests for policy information between a workstation 101 and server 104 may or may not proceed through server 704. For example, requests to purchase a policy (e.g., submitted bids) and any responses thereto between a workstation 101 and server 104 may or may not proceed through server 704 (as represented by network 102*a* in FIG. 7).

According to an embodiment of the invention, system 700 may limit how often/how frequently the participant may alter a profile, for example. For example, a participant may be limited to modifying the profile to "y" times every "x" months, days, hours, and/or minutes, etc. and/or may be limited to modifying the profile to only "z" times per use of system 700 (e.g., once per user-session of system 700). As another example, the participant may be limited to modifying a given characteristic set forth in a profile to "y" times every "x" months, days, hours, and/or minutes, etc. and/or may be limited to modifying a given characteristic to only "z" times per use of system 700. According to another embodiment of the invention, once a participant alters a profile and/or characteristic of the profile, the new profile (and/or modified characteristic) may not go into effect until a certain amount of time (e.g., "x" months, days, hours, and/or minutes, etc.) has passed. Once skilled in the art will recognize that other variations may be used including a combination of limiting the frequency in which a participant may alter a profile and controlling when an altered profile goes into effect.

According to another embodiment of the invention, rather than (and/or in addition to) a participant establishing a profile (e.g., as a permanent file and/or as a configuration of system 700) setting forth one or more characteristics and thereby policies that the participant wishes to disregard, as the participant makes a request to obtain information on one or more policies (e.g., a search request with one or more search criteria, and/or a request to obtain related policies, etc.), the participant may designate one or more characteristics and thereby policies the participant wishes to disregard with respect to that request. For example, according to an embodiment of the invention, a participant may submit via a workstation 101 a search request that includes one or more search criteria and one or more characteristics and thereby policies that the participant wishes to disregard. Thereafter, the workstation may communicate the request (together with the search criteria and characteristic(s)) to server 704, which may remove the designated characteristic(s) from the request and then forward the search request and the search criteria to server 104. In turn, server 104 may submit the search request (e.g., query) to database 180, which may then return to server 104 one or more pieces of information for each policy matching the search criteria including, for example, one or more pieces of privacy related information. In turn, server 104 may thereafter provide the information (including the privacy related information) on the obtained policies to server 704. Thereafter, server 704 may compare the returned policies (e.g., various aspects of the privacy related information) to the participant's designated characteristics (i.e., filter the policies against the characteristics) and based at least in part on determining that there is a match between one or more characteristics and a given policy, remove/filter-out from the policies any such policy. Server 704 may then provide information on the remaining policies (minus any privacy related information) to workstation 101, which may then provide the information to the participant, such as through a graphical interface/display. Again, server 704 may also provide to workstation 101 the number of policies that were removed as a result of the participant's designated characteristics, which number may also be provided to the participant.

According to an embodiment of the invention, if a request does not include any designated characteristics, a workstation 101 may forward the request directly to server 104, for example, and/or similarly, server 104 may forward any obtained policies (minus privacy related information) directly to workstation 101. Alternatively, such requests for policies may continue to go from a workstation 101 to server 704 and then to server 104 and/or similarly, from server 104 to server 704, and then to workstation 101 (minus privacy related information). Similarly, according to an embodiment of the invention, communications other than requests for policy information between a workstation 101 and server 104 may or may not proceed through server 704.

According to an embodiment of the invention, system 700 may limit how often/how frequently a participant may submit requests for policy information that include designated characteristics. For example, a participant may be limited to making requests for policies in which the requests include designated characteristics to "y" times every "x" months, days, hours, and/or minutes, etc. and/or may be limited to including designated characteristics in requests to only "z" times per use of system 700. As another example, a participant may be limited to including a given characteristic in requests for policies to "y" times every "x" months, days, hours, and/or minutes, etc. and/or may be limited to including a given characteristic in requests to only z times per use of system 100. Once skilled in the art will recognize that other variations may be used.

As similarly discussed above, the one or more characteristics a participant may designate as part of a profile and/or request, for example, may include/correspond to policy information that may be considered/referred to as "privacy related" information and similarly, may also/alternatively include/correspond to information that the participant could readily obtain/view once obtaining a policy (e.g., the gender of an insured).

As similarly discussed above, the one or more characteristics a participant may designate as part of the participant's profile and/or as a part of a request, for example, may include/correspond to current policy information. According to another embodiment of the invention, the one or more characteristics a participant may designate as part of the participant's profile and/or as a part of a request may include/correspond to non-current policy information. For example, as similarly discussed above a participant may establish as part of the profile the identification of one or more owners (or possible owners) of policies, thereby designating\indicating that the participant wishes to disregard any policy in which the "current" owner of the policy corresponds to any those set forth in the profile. According to an embodiment of the invention, a participant may also (and/or alternatively) establish as part of the profile the identification of one or more owners (or possible owners) of policies, thereby designating\indicating that the participant wishes to disregard any policy in which an owner that owned that policy at any time corresponds to any those set forth in the profile. As another example, a participant may establish as part of the profile the identification of one or more brokers (or possible brokers), thereby designating\indicating that the participant wishes to disregard any policy in which a broker that assisted in the buying and/or selling of that policy at any time corresponds to any those set forth in the profile. One skilled in the art will recognize that other examples are possible.

According to an embodiment of the embodiment of the invention, server 704 may be physically separate from any of workstations 101 and server 104. In addition, server 704 may be owned and/or operated by an entity separate from an entity that may own and/or operate server 104 and separate from any entity that may use and/or own and/or operate workstations 101, for example, to transfer policies. According to an embodiment of the invention, server 704 may be a trusted server in that:

1. An operator of server 104, for example, trusts transferring privacy related information to server 704 without concern that server 704 may transfer such information to a workstation 101, for example, and/or a participant user thereof; and
2. A participant user of a workstation 101, for example, trusts transferring profile/designated characteristics to server 704 without concern that server 704 may transfer such profile/designated characteristics to server 104, for example.

Not Allowing a Policy to be Transferred to Certain Participants

According to an embodiment of the invention, a seller participant, for example, may not want to transfer/sell a given policy to a particular buyer participant because the buyer participant is a particular individual and/or entity to which the seller participant does not want to transfer/sell the policy, for example, and/or because the buyer participant is a particular broker (assisting an individual and/or entity in obtaining policies) through which the seller participant does not want to transfer/sell the policy, for example, etc. According to an embodiment of the invention, a seller participant that is transferring/selling a policy via system 100 (and similarly system 700) may designate the identification (e.g., name) of one or more buyer participants (and similarly brokers), for example, to which the seller participant does not want to transfer/sell the policy.

For example, according to various embodiments of the invention, a seller participant may establish a profile via a workstation 101 (e.g., through a graphical interface/display) for example, setting forth the identification of one or more participants to which the seller participant does not want to sell a policy. The profile may be a general profile that corresponds to any policy being sold by the seller participant. Alternatively, the profile may be specific to a given policy being sold by the seller participant. The profile may be stored as a permanent file, for example, at server 104 (e.g., at database 180 and/or computer readable medium 115), for example. As another example, as a seller participant submits a policy to system 100 for sale, for example, the participant may designate via workstation 101 (e.g., through a graphical interface/display) the identification of one or more buyer participants to which the seller participant does not want to sell the policy. Such identification(s) may be maintained with the policy, such as in database 180. One skilled in the art will recognize that a seller participant may designate the identification of one or more buyer participants in fashions other than those discussed above.

According to an embodiment of the invention, a buyer participant may submit via a workstation 101 a request to obtain information on one or more policies (e.g., a search request with one or more search criteria, or a request to obtain related policies), as similarly discussed above. For example, assuming the buyer participant submits a search request, the workstation may communicate the search request to server 104, for example, which may in turn submit the search request (e.g., query) to database 180. In response, database 180 may return to server 104 one or more pieces of information for each policy matching the search criteria. In turn, server 104 may determine for a given policy whether a seller participant (e.g., owner) of that policy has designated the identification of one or more buyer participants to which the seller participant does not want to sell the policy (e.g., server 104 may review a profile and/or review information associated with a policy as obtained from database 180). Assuming the seller participant of a policy has designated the identification of one or more buyer participants, server 104 may next determine whether the buyer participant that submitted the search request is one of the designated participants. Assuming the buyer participant is one of the designated participants, server 104 may proceed in various fashions. For example, server 104 may remove (filter out) the policy from the search results and may thereafter provide information on the remaining policies to workstation 101, which may then provide the information to the buyer participant, such as through a graphical display. As another example, server 104 may mark the policy in some fashion and then provide information on this policy and other policies resulting from the search to workstation 101, which may then provide the information to the participant, such as through a graphical interface/display. However, as a result of the one policy, for example, being marked, workstation 101 may cause the policy to be displayed, for example, to the participant in such a fashion such that the participant readily recognizes that the participant may not purchase the policy. For example, the policy may be displayed in a particular font and/or color and/or have associated therewith a particular indicator. As another and/or additional example, the policy may be displayed to the buyer participant in such a fashion that prevents the buyer participant from purchasing the policy (e.g., from submitting a bid). For example, the mechanism (e.g., interface) server 104 and/or workstation 101 would normally provided to a participant to purchase the policy may not be made available and/or made operable to the buyer participant via workstation 101. As another example, in response to submitting a request to purchase the policy, the workstation may present a notification, such as an error message, to the buyer participant and not forward the request to server 104. As a further and/or additional example, in response to submitting a request to purchase the policy, the workstation may forward the request to server 104, which may again determine that the participant is not allowed to purchase the policy, and thereby deny the request and cause workstation 101 to present a notification, such as an error message, to the buyer participant. One skilled in the art will recognize that server 104 and/or workstation 101 may cause a policy to be presented to the buyer participant in other fashions such that the buyer participant may readily recognize that the participant may not purchase the policy and similarly, that server 104 and/or workstation 101 may cause a policy to not be purchasable by a participant in other fashions.

According to another embodiment of the invention, all policies may be presented to a buyer participant in such a fashion that the buyer participant is not readily able to determine whether the buyer participant may purchase the policy. Accordingly, the buyer participant may submit via a workstation 101 a request to purchase a policy (e.g., a bid request), as similarly discussed above. In response, the workstation may communicate the purchase request to server 104, for example. Prior to recording the bid, for example, from the purchaser, server 104 may determine for the given policy whether the seller participant (e.g., owner) of that policy has designated the identification of one or more buyer participants to which the seller participant does not want to sell the policy (e.g., server 104 may review a profile and/or review information obtained from database 180). Assuming the seller participant of a policy has designated the identification of one or more buyer participants, server 104 may next determine whether the buyer participant that submitted the bid is one of the designated participants. Assuming the buyer participant is one of the designated participants, server 104 may deny the purchase request and cause workstation 101 to present a notification, such as an error message, to the buyer participant indicating that the buyer participant may not purchase the policy.

According to another embodiment of the invention, the above described features/functions may be provided by a server 704. For example, a seller participant may establish a profile via a workstation 101 for example, setting forth the identification of one or more participants to which the seller participant does not want to sell a policy. The profile may be a general profile that corresponds to any policy being sold by the seller participant. Alternatively, the profile may be specific to a given policy being sold by the seller participant. The profile may be stored as a permanent file, for example, at server 704, for example. As another example, as a seller participant submits a policy to system 100 for sale, for example, the participant may designate via workstation 101 the identification of one or more buyer participants to which the seller participant does not want to sell the policy. Such identification(s) may be maintained with the policy, such as in database 180. According to an embodiment of the invention, a buyer participant may submit via a workstation 101 a request to obtain information on one or more policies, as similarly discussed above. For example, assuming the buyer participant submits a search request, the workstation may communicate the search request either directly, or via server 704, for example, to server 104, for example, which may in turn submit the search request (e.g., query) to database 180. In response, database 180 may return to server 104 one or more pieces of information for each policy matching the search criteria (which information may include, if applicable, the identification of participants not allowed to purchase a given policy). In turn, server 104 may thereafter provide the information on the obtained policies to server 704. Server 704 may then determine for a given policy whether a seller participant of that policy has designated the identification of one or more buyer participants to which the seller participant does not want to sell the policy (e.g., server 704 may review a profile, if applicable, and/or review information obtained from database 180, if applicable, as described above). Assuming the seller participant of a policy has designated the identification of one or more buyer participants, server 704 may next determine whether the buyer participant that submitted the search request is one of the designated participants. Assuming the buyer participant is one of the designated participants, server 704 may proceed in various fashions as discussed above. For example, server 704 may remove (filter out) the policy from the search results and may thereafter provide information on the remaining policies to workstation 101, which may then provide the information to the buyer participant, such as through a graphical interface/display. As another example, server 704 may mark the policy in some fashion and then provide information on this policy and other policies resulting from the search to workstation 101, which may then provide the information to the participant, such as through a graphical interface/display, as similarly described above, such that the participant knows that the policy may not be purchased. As another example, the policy may be displayed to the buyer participant in such a fashion that prevents the buyer participant from purchasing the policy (e.g., from submitting a bid), as similarly discussed above.

As another example, assuming a seller participant establishes a profile as discussed above and such a profile is stored at server 704, for example, as a buyer participant submits a request to purchase a policy (e.g., a bid request) via a workstation 101, the workstation may communicate the request via server 704 to server 104. In response to receiving the purchase request, server 704 may determine for the policy whether a seller participant of that policy has designated the identification of one or more buyer participants to which the seller participant does not want to transfer/sell the policy (e.g., server 704 may review a profile, if one exists). Assuming the seller participant of the policy has designated the identification of one or more buyer participants, server 704 may next determine whether the buyer participant that submitted the purchase request is one of the designated participants. Assuming the buyer participant is one of the designated participants, server 704 may deny the request (e.g., never forwarding it to server 104) and cause workstation 101 to present a notification, such as an error message, to the buyer participant that the purchase is not permitted. Alternatively, assuming the buyer participant is not one of the designated participants, 704 may forward the request to server 104, where the request is handle as normal, for example.

Converting a Term Policy to a Permanent Policy—System Initiated

According to an embodiment of the invention, system 100 (and similarly system 700) may notify a seller participant that is attempting to sell a convertible term policy (including, for example, a life settlement policy and/or a resale policy) that the policy may possibly be converted to a permanent policy and then sold and/or may assist the participant in at least deciding whether to convert the policy prior to selling the policy. For example, it may be of benefit for a seller participant that is seeking to sell a convertible term policy to first convert the policy to a permanent policy and then to sell the permanent policy. The benefit(s) may include, for example, that the permanent policy has a greater sale value than the convertible term policy.

For example, according to an embodiment of the invention, in the course of a seller participant accessing server 104 via workstation 101, for example, to transfer/sell a policy, server 104 (and/or similarly, workstation 101) may determine that the policy is a convertible term policy and then notify the participant via workstation 101, such as through a notification that appears as graphical interface/display, that it may be possible for the participant to first convert the policy to a permanent policy and then to sell the permanent policy. Server 104 (and/or similarly, workstation 101) may determine that a policy is a convertible term policy in various fashions. For example, if the policy is a policy for which there is information already in database 180 (e.g., because the policy was previously sold through system 100), server 104 may determine from this information (e.g., by the existence of a conversion provision in the policy) that the policy is a convertible term policy and provide the participant with notification thereof. As another example, server 104 may determine from information submitted by the participant in the course of indicating a desire to sell the policy that the policy is a convertible term policy (e.g., the participant may submit the policy). As a further example, in the course of the seller participant indicating a desire to sell a policy, server 104 may prompt the participant, for example, via workstation 101 to ask the participant whether the policy is a convertible term policy and based on a positive response from the participant as provided to server 104 by workstation 101, notify the participant via workstation 101 that it may be possible for the participant to first convert the policy to a permanent policy and then to sell the permanent policy. One skilled in the art will recognize that server 104 may determine that a policy is a convertible term policy in various other fashions.

In response to receiving such a notification from server 104, a participant may make an indication to server 104 via workstation 101 that the participant wishes to proceed with selling the policy as a convertible term policy. Alternatively, a participant may make an indication to server 104 via workstation 101 that the participant wishes to temporarily put-on-hold the selling of the policy to look further into converting the policy and/or to actually convert the policy (e.g., speak/interact with the issuer of the policy to convert the policy). As a result, server 104 may place the policy in the pending state, for example, until the participant later decides to proceed, for example, with the selling of the policy in either form (i.e., as a term policy or as a permanent policy).

As discussed above, server 104, for example, may determine that a policy is a convertible term policy (e.g., by the existence of a conversion provision) and provide such notification to the participant but may not actually determine whether the policy can be converted. In other words, although a policy may have a conversion provision, certain requirements may need to be met before the policy can be converted. For example, the insured may need to be of a minimum age, the insured may need to be younger than a maximum age, the policy may have a final conversion option expiry date after which the policy is non-convertible (which date may have passed), there may be an exclusion period in the early years of the policy during which the convertible policy cannot be converted, etc. According to an embodiment of the invention, prior to notifying a participant that the participant may possibly convert the policy to a permanent policy and then sell the permanent policy, server 104 may first determine whether the policy can be converted and only provide such a notification when the policy can be converted. Again, server 104 may make such a determination based on information (e.g., the age of the insured, the issue date of the policy, etc.) obtained in similar fashions as discussed above and by then comparing this information to the conversion provision/terms of the policy.

According to another embodiment of the invention, server 104 may alternatively and/or in addition also make a determination as to a value/benefit in converting a term policy to a permanent policy. Based on this determination (in addition, for example, to determining that the policy can be converted), server 104 may decide whether to send or not send a notification to a seller participant regarding converting the policy to a permanent policy. As another alternative, server 104 may provide as part of the notification to the participant information related to the determined value/benefit (if any) in converting the policy, thereby possibly assisting the seller participant in making a determination/decision as to whether to convert the policy.

For example, server 104 (and/or an administrator associated therewith) may determine a probability/estimate of the insured dying within the term of the term policy and/or the life expectancy of the insured. Server 104 may make such a determination based on the health/medical records of the insured, the age of the insured, etc. In addition and/or alternatively, server 104 may make such a determination based on one or more life expectancy evaluations on the insured. Server 104 may obtain such information (i.e., health/medical records of the insured, the age of the insured, and/or one or more life expectancy evaluations, etc.) from database 180 (e.g., because the policy was previously sold through system 100), may obtain such information from information submitted by the seller participant in the course of indicating a desire to sell the policy, and/or may obtain such information by prompting the participant, for example, via workstation 101 for the information. As another example, server 104 and/or an administrator associated therewith may interact with one or more other systems and/or individuals (e.g., health care providers and/or entities that provide life expectancy evaluations) to obtain such information. One skilled in the art will recognize that server 104 may obtain such information in various other fashions. Based at least in part on determining the life expectancy of the insured, for example, and/or the probability/estimate of the insured dying within the term of the term policy, for example, server 104 may determine (even though a policy can be converted to a permanent policy) whether there is value or no value in converting the policy and thereby notify or not notify the seller participant that the participant may convert the policy (e.g., if there is a high probability of the insured dying within the term of the term policy, there may be no value in converting the policy). When notifying the participant, server 104 may include the determined life expectancy of the insured, for example, and/or the probability/estimate of the insured dying within the term of the term policy. As another example, rather than make a determination on behalf of the participant whether there is value or no value in converting the policy and thereby notify or not notify the seller participant that the participant may convert the policy, server 104 may always notify the participant that the participant may convert the policy to a permanent policy (i.e., when it is convertible and can be converted) and include therein the life expectancy of the insured and/or the probability/estimate of the insured dying within the term of the term policy, for example, thereby possibly assisting the seller participant in making a determination/decision as to whether to convert the policy. Here, server 104 may also include a recommendation as to whether the participant should convert the policy.

As another example, server 104 (and/or an administrator associated therewith) may alternatively and/or in addition determine an estimated sale/monetary value (e.g., an approximate minimum sale value, an approximate average value, an estimated value) of the term policy and/or an estimated sale/monetary value that the policy may have as a permanent policy (i.e., once converted to a permanent policy, a possible value of the policy). Server 104, for example, may determine such values in various fashions. For example, server 104 may use, for example, one or more previous sale prices at which the term policy previously transferred. As another example, to determine such value(s), server 104 may need/use, for example, the health/medical records of the insured, the age of the insured, one or more life expectancy evaluations on the insured, etc. As a further example, to determine such values, server 104 may also need/use the life insurance policy of the term policy and possibly an illustration, for example, of the potential permanent policy (and/or a copy of the permanent policy) as may be obtained, for example, from the issuer of the policy. (One skilled in the art will recognize that the conversion provision of a term policy may allow that policy to be converted into one of several different types of permanent policies. Server 104 may determine a value for each variation. For purposes of description, it will be assumed that a convertible term policy may only be converted into a single type of permanent policy.) Again, server 104 may obtain such information as discussed above. In particular, regarding, for example, an illustration (and/or copy) of the permanent policy, server 104, for example, may request that the seller participant obtain such information from the issuer of the policy and thereafter submit the information to server 104, and/or server 104 and/or an administrator associated therewith may interact with one or more other systems and/or individuals associated with the issuer, for example, to obtain such information. Again, based at least in part on the estimated sale/monetary value of the term policy and the estimated sale/monetary value that the policy may have as a permanent policy, server 104 may determine (even though a policy can be converted to a permanent policy) whether there is any value in converting the policy and as a result, either notify or not notify the seller participant that the participant may convert the policy. For example, server 104 may determine whether the estimated sale/monetary value of the permanent policy exceeds (or exceeds by an appreciable amount and/or predetermined threshold) the estimated sale/monetary value of the term policy. In general, when converting a term policy to a permanent policy, a seller participant may need to make a payment, such as an increased premium payment, to the issuer of the policy as a result of, for example, the permanent policy costing more than the term policy. As part of determining whether there is any value in converting the policy to a permanent policy, server 104 may take into account this increased payment (e.g., the differential between the premium payment for the permanent policy as compared to the premium payment for term policy), and possibly other increased premium payments the seller participant may need to pay until the permanent policy sells. For example, server 104 may determine whether the estimated sale/monetary value of the permanent policy exceeds the estimated sale/monetary value of the term policy plus the increased premium payment(s). Server 104 may determine (and/or approximate) the increased premium payment(s), for example, from an illustration of the permanent policy (and/or a copy of the permanent policy), for example, may interact with one or more other systems and/or individuals associated with the issuer, for example, to obtain such information, may approximate the payment(s) based at least in part on the term policy, etc.

According to another embodiment of the invention, when notifying the participant, server 104 may include the estimated sale/monetary value of the term policy and/or the estimated sale/monetary value that the policy may have as a permanent policy and/or any increased premium payments the seller participant may need to pay, etc.

As another example, rather than (and/or in addition to) determining a value of the term policy, server 104 may prompt, for example, the participant to provide a desired minimum selling price for the term policy and compare this price to the estimated value of the permanent policy (and possibly the increased premium payment(s)) and make a determination there from whether there is any value in converting the policy. As a result, server 104 may either notify or not notify the seller participant that the participant may convert the policy.

As a further example, rather than make a determination on behalf of the participant whether there is value or no value in converting the policy and thereby notify or not notify the seller participant that the participant may convert the policy as described above, server 104 may always notify the participant that the participant may convert the policy to a permanent policy (i.e., when it is convertible and can be converted) and may also provide to the participant any of the above estimated monetary values. Here, server 104 may also include a recommendation as to whether the participant should convert the policy.

According to another embodiment of the invention, rather than automatically determine, for example, a life expectancy of the insured, a probability/estimate of the insured dying within the term of the term policy, an estimated value for the term policy, an estimated value for the permanent policy, and/or estimated increased premium payment(s) etc., server 104 may provide a notification to the participant that the participant may convert the policy to a permanent policy and then query (separately and/or together with the notification) the participant as to whether the participant would like such additional information and then provide such information if requested. Based on such information, server 104 may also include a recommendation as to whether the participant should convert the policy. According to an embodiment of the invention, server 104/system 100 may provide such information at no fee, may provide such information at cost (e.g., server 104/system 100/an administrator/owner of system 100 may incur a fee for obtaining life expectancy evaluations on an insured), and/or may provide such information for a fee. Such fee may need to be paid by the participant in advance (e.g., prior to obtaining the information) and/or server 104/system 100/administrator/owner of system 100 may obtain such a fee from any proceeds resulting from a sale of the policy, whether sold as a term policy or a permanent policy.

As discussed above, server 104 may make available to a participant the above described notification regarding the conversion of a term policy in the course of the participant accessing server 104 to sell a policy. Thereafter, the participant may convert the policy to a permanent policy and then sell the permanent policy. According to another embodiment of the invention, rather than making such a notification as the participant accesses server 104 to sell the policy, server 104 may allow a participant to submit for sale the convertible term policy and allow the policy to proceed, for example, to the active state where bids, for example, may be received for the policy. During the course of receiving bids, server 104 may make a determination (e.g., after determining that the policy has a conversion provision and can be converted) as to whether it is beneficial to convert (whether there is value in converting) the policy to a permanent policy and sell the permanent policy. In addition to making such a determination as discussed above, server 104 may also/alternatively make such a determination based on "current activity" regarding the sale of the term policy including, for example:

1. The size (i.e., offered price) of the bids being offered for the policy;
2. The size of the bids being offered for the policy as compared to a minimum bid/selling price/amount as indicated by the seller participant;
3. Whether the minimum bid/selling price/amount as indicated by the seller participant has been met;
4. If the minimum bid amount as indicated by the seller participant has been met, how quickly it took for bids to meet/exceed this price (e.g., amount of time since the start of the auction period before the minimum bid amount was met, the number of bids it took to reach/exceed the minimum bid amount, etc.).
5. The size of the bids being offered for the policy as compared to a "trade it now" price as indicated by the seller participant;
6. The size of the bids being offered for the policy as compared to one or more previous sale prices for the policy at which the policy was transferred;
7. The size of the bids being offered for the policy as compared to an estimated sale/monetary value (e.g., an approximate minimum sale value, an approximate average value, an estimated value) that the policy may have as a permanent policy (as discussed above);
8. The rate at which bids are being submitted for the policy;
9. The number of different participants submitting bids on the policy; and/or
10. The number of participants that have requested to view (not necessarily bid on) the policy (e.g., since the start of the auction period).

In other words, based on "current activity" regarding the sale of a term policy, server 104 may determine a level of interest in the policy, may determine probable/projected sale price of the policy as a term policy, and/or may determine a possible/projected sale/monetary value the policy may have as a permanent policy (e.g., such a possible/projected sale/ monetary value may be a further refinement of the estimated sale/monetary value discussed above). Accordingly, if the policy has a high degree of interest, for example, server 104 may determine that it may be beneficial to convert the policy. As another example, based on a probable/projected sale price of the policy as a term policy as compared to an estimated sale/monetary value that the policy may have as a permanent policy (including, for example, estimated increased premium payments as discussed above), server 104 may determine that it may be beneficial to convert the policy. As a further example, based on a probable/projected sale price of the policy as a term policy as compared to a possible/projected sale/monetary value that the policy may have as a permanent policy, server 104 may determine that it may be beneficial to convert the policy. One skilled in the art will recognize that server 104 may make such a determination in other fashions.

Once making such a determination, server 104 may notify the seller participant that the participant may wish to withdraw the policy from sale, convert the policy to a permanent policy, and then sell the permanent policy. As part of this notification, server 104 may provide (possibly for a fee) any of the above described information (i.e., information related to current activity regarding the sale of the term policy including, for example, a determined level of interest in the policy, a determined probable/projected sale price of the policy as a term policy, a determined possible/projected sale/monetary value the policy may have as a permanent policy) and possibly also, for example, an estimated sale/monetary value the policy may have as a permanent policy, a life expectancy of the insured, a probability/estimate of the insured dying within the term of the term policy, etc. As a further example, rather than make a determination on behalf of the seller participant whether there is value or no value in converting the policy and thereby notify or not notify the seller participant that the participant may convert the policy, server 104 may always notify the participant during the course of receiving bids (e.g., during the active state) that the participant may convert the policy to a permanent policy and may also provide to the participant any of the above information. Here, server 104 may also include a recommendation as to whether the participant should convert the policy. As a still further example, in the course of receiving bids, server 104 may notify the seller participant that the participant may convert the policy to a permanent policy and then query the participant as to whether the participant would like to receive any of the above described information (as similarly described above), possibly for a fee. Here, server 104 may again also include a recommendation as to whether the participant should convert the policy.

Regardless of what information the notification may include, the notification may be provided one or more times during the course of receiving bids (e.g., half way through the auction period; at a random time; if the auction period is such that the participant cannot withdraw the policy from sale after a certain time, the notification may be provided just prior to this time, etc.). In general, server 104 may provide notification to the participant via a workstation 101, assuming the seller participant is accessing system 100. As another example, server 104 may cause some other electronic based notification to be sent to the seller participant, such as via email, page, fax, short message service, automated voice system, etc. As a further example, server 104 may cause an administrator of server 104, for example, to contact the seller participant. Again, in response to receiving such a notification, a seller participant may proceed with selling the policy as a convertible term policy. Alternatively, after determining that it may be beneficial to convert the policy, the participant may make an indication to server 104 via workstation 101, for example, to withdraw the policy from sale, and then convert the policy to a permanent policy and then resubmit the permanent policy to server 104 for sale.

As discussed above and according to an embodiment of the invention, system 100/an owner thereof, for example, may charge a service fee for assisting in the transferring/selling of a policy. Such a fee may be a straight/constant/flat fee. Alternatively, such a fee may be a percentage, for example, of the final sale price of a policy (e.g., before or after broker fees are removed), for example. Such a fee may be charged to the seller participant and/or to the buyer participant. According to an embodiment of the invention, when a seller participant converts a term policy to a permanent policy, system 100 may charge a different fee than if the seller participant decides to sell the policy as a term policy. For example, system 100 may charge a first flat fee when the policy is sold as a term policy and a second flat fee when the policy is converted and sold as a permanent policy. The first flat fee may be larger than the second flat fee. As another example, system 100 may charge a first percentage fee when the policy is sold as a term policy and a second percentage fee when the policy is converted and sold as a permanent policy. The first percentage fee may be larger than the second percentage fee. One skilled in the art will recognize that other fee structures are possible. For example (and/or in addition), the fee charged when the policy is converted to a permanent policy may be a function of how close the sale price (e.g., the winning bid amount) is to a determined estimated and/or possible/projected sale/monetary value that the policy may have as a permanent policy, as discussed above. For example, if the sale price exceeds (e.g., is within some predetermine first threshold of) the estimated sale/monetary value of the policy, a first predetermined fee/value may be charged; if the sale price approximately equals (e.g., is within some predetermine second possibly different threshold of) the estimated sale/monetary value of the policy, a second lesser predetermined fee/value may be charged; and if the sale price is less than (e.g., is within some predetermine third possibly different threshold of) the estimated sale/monetary value, a third still lesser predetermined fee/value may charged (an inverse of this structure may also be used). As another example, if the sale price approximately equals the estimated sale/monetary value of the policy, a predetermined fee/value may be charged; if the sale price exceeds the estimated sale/monetary value, the predetermined fee/value may gradually increase with the larger the deviation/difference; and if the sale price is less than the estimated sale/monetary value, the predetermined fee/value may gradually decrease the larger the deviation/difference (again, an inverse of this structure may also be used). As another example (and/or in addition) and in a similar fashion, the fee charged when the policy is converted to a permanent policy may be a function of how close the sale price is to a minimum bid amount the seller participant wanted to obtain for the permanent policy.

According to an embodiment of the invention, server 104 may automatically notify the seller participant of the different fee structures when notifying the participant that the participant may convert the policy. According to another embodiment of the invention, server 104 may notify the seller participant of the different fee structures if the participant makes an indication to server 104 that the participant does not want to convert the policy. Here, server 104 may notify the seller participant of the different fee structures as an incentive to convert the policy, for example (e.g., that a lesser fee may be charged for a converted policy as compared to an unconverted policy, that a lesser fee may be charged if certain prices are not obtained for the converted policy, etc.). According to another embodiment of the invention, server 104 may, by default, charge the same fee structure whether the participant converts or does not convert the policy and only offer to provide a second fee structure if the participant makes an indication to server 104 that the participant does not want to convert the policy. Again, server 104 may notify the seller participant of the different fee structures as an incentive to convert the policy, for example (e.g., that a lesser fee may be charged for a converted policy as compared to an unconverted policy).

Converting a Term Policy to a Permanent Policy—Participant Initiated

According to another embodiment of the invention, rather than system 100 (and/or similarly system 700) notifying a seller participant that is attempting to transfer/sell a convertible term policy that the policy may possibly be converted to a permanent policy and then sold, the seller participant may initiate the interaction. For example, according to an embodiment of the invention, in the course of a seller participant accessing server 104 via workstation 101, for example, to transfer/sell a policy, the participant may query (make a request to) server 104 (and/or similarly, workstation 101), such as via graphical interface/provided option at workstation 101, as to whether the policy can be converted from a term policy to a permanent policy. In response thereto, server 104 (and/or similarly, workstation 101) may determine whether the policy is a convertible term policy as similarly discussed above (e.g., by determining whether the policy has a conversion provision) and if so, provide such notification/response to the participant via workstation 101 (possibly further indicating that it may be possible for the participant to convert the policy prior to selling the policy). In addition, server 104 (and/or similarly, workstation 101) may also determine whether the policy can be converted (i.e., are all of the requirements of the conversion provision met), as similarly discussed above.

According to another embodiment of the invention, server 104 may also provide to the participant information related to a determined value/benefit in converting the term policy to a permanent policy (e.g., server 104 may determine a probability/estimate of the insured dying within the term of the term policy and/or may determine the life expectancy of the insured and/or may determine an estimated sale/monetary value of the term policy and/or an estimated sale/monetary value that the policy may have as a permanent policy, etc.), as similarly discussed above. Server 104 may provide such information to the participant as part of the above notification/response or may provide such information in response to a further request from the participant. As another alternative, based on such information, server 104 may make a determination as to whether there is value or no value in converting the policy and provide such a determination (e.g., as a recommendation) to the participant as part of the above notification/response, or may provide such a determination in response to a further request from the participant. Again, as similarly discussed above, server 104/system 100 may provide any of the above described information and/or determinations possibly for a fee.

According to another embodiment of the invention, a participant may know a term policy can be converted to a permanent policy prior to sale and as part of attempting to sell the convertible term policy, for example, may query (make a request to) server 104 via workstation 101, such as via graphical interface/provided option, to provide information related to a determined value/benefit in converting the term policy to a permanent policy and/or to make a determination as to whether there is value or no value in converting the policy, as described above. Again, as similarly discussed above, server 104/system 100 may provide any of the above described information/determinations possibly for a fee.

As discussed above, in any scenario, a participant may proceed with selling the policy as a convertible term policy. Alternatively, a participant may make an indication to server 104 via workstation 101 that the participant wishes to temporarily put-on-hold the selling of the policy to look further into converting the policy and/or to actually convert the policy (e.g., speak/interact with the issuer of the policy to convert the policy). As a result, server 104 may place the policy in the pending state, for example, until the participant later decides to proceed, for example, with the selling of the policy in either form (i.e., as a term policy or as a permanent policy).

As similarly discussed above, when a seller participant converts a term policy to a permanent policy, system 100 may charge a different service fee (i.e., a fee for assisting in the policy transfer) than if the seller participant decides to sell the policy as a term policy.

According to another embodiment of the invention, a seller participant may submit a convertible term policy to server 104 for sale, or example, and allow the policy to proceed, for example, to the active state where bids, for example, may be received for the policy. During the course of receiving bids, the participant may query (make a request to) server 104 via workstation 101, such as via graphical interface/provided option, as to whether the policy can be converted from a term policy to a permanent policy. In response thereto, server 104 may determine whether the policy is a convertible term policy as similarly discussed above, and may also determine whether the policy can be converted, as similarly discussed above, and provide such notification/response to the participant via workstation 101.

According to another embodiment of the invention, server 104 may also provide to the participant information related to, for example: a probability/estimate of the insured dying within the term of the term policy, the life expectancy of the insured, a determined estimated sale/monetary value that the policy may have as a permanent policy, etc., as discussed above. In addition and/or alternatively, server 104 may provide information related to current activity regarding the sale of the term policy (as discussed above) including, for example: a determined level of interest in the policy, a determined probable/projected sale price of the policy as a term policy, a determined possible/projected sale/monetary value the policy may have as a permanent policy, as similarly discussed above. Server 104 may provide such information to the participant as part of the above notification/response or may provide such information in response to a further request from the participant. As another alternative, based on any such information, server 104 may make a determination as to whether there is value or no value in converting the policy and provide such a determination (e.g., as a recommendation) to the participant as part of the above response, or may provide such a determination in response to a further request from the participant. Again, as similarly discussed above, server 104/system 100 may provide any of the above described information/determinations possibly for a fee.

According to another embodiment of the invention, a participant may know a term policy can be converted to a permanent policy and during the course of receiving bids on the convertible term policy, for example, may query (make a request to) server 104 via workstation 101, such as via graphical interface/provided option, to provide any of the above described information (i.e., a probability/estimate of the insured dying within the term of the term policy, information related to current activity regarding the sale of the term policy, etc.) and/or to make a determination/recommendation as to whether there is value or no value in converting the policy. Again, as similarly discussed above, server 104/system 100 may provide any of the above described information and/or determinations possibly for a fee.

As discussed above, in any scenario, a seller participant may proceed with selling the policy as a convertible term policy. Alternatively, after determining that it may be beneficial to convert the policy, the participant may make an indication to server 104 via workstation 101, for example, to withdraw the policy from sale, and then convert the policy to a permanent policy and then resubmit the permanent policy to server 104 for sale.

Delayed Conversion

As generally described above, server 104 (and similarly server 704), for example, may notify a participant that it may be possible for the participant to convert a term policy to a permanent policy and then to sell the permanent policy. As indicated, server 104 may provide such a notification to the seller participant during the course of the seller participant accessing server 104 to transfer/sell a policy, and/or may provide such a notification to the seller participant during the course of receiving bids, for example, on the policy. In the former case, the participant may thereafter convert the policy to a permanent policy and sell the permanent policy. In the latter case, the participant may withdraw the term policy from sale, convert the policy to a permanent policy, and then sell the permanent policy.

According to another embodiment of the invention, whenever the seller participant decides to convert the policy to a permanent policy, server 104 (and similarly server 704) may allow the participant to delay the actual conversion of the policy until a later time, such as until after the bidding period, for example, is closed and a buyer participant/winning bid is determined, for example. By delaying the conversion of the policy, the seller participant may be viewed as selling a permanent policy that has not yet been converted. By doing so, for example, the seller participant may be able to delay, for example, having to make one or more increased payments, such as premium payments, to the issuer of the policy as a result of, for example, the permanent policy costing more than the term policy. In addition, by selling the policy in this fashion, the seller participant may monitor/view, for example, bids on the "permanent policy" and if such bids are not to the participant's satisfaction, for example, may withdraw the policy from sale and then resubmit the policy as a term policy.

As an example, as part of the notification to the seller participant that the participant may convert a policy to a permanent policy, server 104 may indicate to the participant that the participant may either convert the policy to a permanent policy and then sell the permanent policy (as described above) and/or that the participant may delay the conversion of the policy until after the policy is sold. One skilled in the art will recognize that server 104 may provide such a notification to a seller participant at various times as described above including, for example, after making a determination that there is value in converting the policy to a permanent policy. When opting to delay the conversion of a policy, the seller participant, while indicating a desire to sell the insurance policy, may indicate to server 104, such as via a graphical interface/option at a workstation 101, that the policy will be sold as a delayed conversion. In response thereto, server 104 may indicate to the seller participant that the participant needs to submit any of the information described herein regarding the term policy and/or may also indicate that the participant needs to submit, for example, an illustration of the permanent policy as obtained from the issuer, a copy of the permanent policy in an unexecuted form, etc. (i.e., may indicate to the participant that the participant needs to submit sufficient information so that a potential buyer participant may value the permanent policy). Alternatively, server 104 and/or an associated administrator may obtain such information from the issuer, etc. The seller participant may also submit to server 104, for example, a minimum bid/selling price/amount and/or starting bid the seller participant is willing to accept for the policy as a permanent policy, and/or may indicate a "trade it now" price, or in other words, a price at which the seller participant is willing to sell the policy as a permanent policy, etc. According to an embodiment of the invention, the seller participant may need to also enter into one or more agreements, such as with system 100/an owner thereof. For example, the seller participant may need to agree that the seller participant will convert the policy once a buyer participant is determined (e.g., once a winning bid/sale price is determined) and/or will assist in the conversion, if necessary (and may possibly be assessed a fee, for example, if he does not convert the policy). The seller participant may also enter into an agreement with system 100/an owner thereof as to who will pay for any initial fees associated with the conversion, such as any initial/first premium payment that may need to be paid to the issuer of the policy as a result of, for example, the policy being converted (paying of such fees is further discussed below).

Thereafter, server 104 may designate the type of the policy within database 180 as a permanent policy (i.e., the type of permanent policy to which the seller participant intends to convert the policy) and maintain an indication that the policy is to "be converted." In addition, when providing information on the policy to other participants (such as potential buyer participants), server 104 may indicate that the policy type as a permanent policy but provide an additional indication that the policy is to "be converted." For example, the type of the policy may be shown as, "Whole Life (to be converted)."

Once all necessary information has been obtained on the policy and the policy goes through an approval process, for example, server 104, for example, may deem the policy as ready to proceed to the active/live state. During the active/live state, buyer participants, for example, via a workstation 101 may submit one or more bids on the policy, possibly valuing the policy as a permanent policy.

According to an embodiment of the invention, the length/duration of the active/live state (e.g., bidding period) may be tied to how long an illustration, for example, on the permanent policy is good for. For example, as indicated, a seller participant may need to obtain from the issuer an illustration on the permanent policy and/or an actual policy the participant needs to execute and may need to submit these to server 104, thereby allowing potential buyer participants to view information on the permanent policy and value the policy. Such documents may only be valid for a set duration of time. Accordingly, it may be necessary to convert the policy prior to these documents expiring so that the policy a buyer participant eventually purchases is the same one bid on, for example.

Nonetheless, at the end of the active/live state/auction period server 104 may move the policy to the closed state, where a buyer participant (e.g., a winning bid/sale price) maybe determined, for example. Server 104 may notify, via workstations 101 for example, the seller participant and/or the buyer participant (that submitted the winning bid) of the pending sale/transfer. During the closed state, the purchased policy may be cleared, as discussed above.

As part of this clearing, the seller participant may actually convert the policy to a permanent policy (e.g., execute, for example, any documents (e.g., the permanent policy) needed to actually convert the policy) and/or assist in such conversion, if necessary, and then execute, for example, any agreement needed to transfer ownership of the permanent policy to the buyer participant, for example. According to an embodiment of the invention, the buyer participant may need to place at least a portion of the sale price/winning bid amount in escrow, for example, prior to the seller participant having to convert the policy. In this fashion, the seller participant may convert the policy without the fear that the buyer participant may possibly thereafter not proceed with the transfer of ownership of the policy. Alternatively, the seller participant may execute, for example, any agreement needed to transfer ownership of the term policy to the buyer participant, for example, and then allow the buyer participant to convert the policy to a permanent policy. According to an embodiment of the invention, back office clearing center 112/system 100/server 104/an administrator thereof, for example, may assist in the conversion. For example, back office clearing center 112 may obtain from the issuer any required documents and/or submit any executed documents to the issuer. According to an embodiment of the invention, server 104, for example, may update database 180 to reflect the policy having been converted and to store therein, for example, associated documents.

In either case, as part of clearing, the selling and/or buyer participant may pay, for example, any initial fees associated with the conversion, such as any initial/first premium payment that may need to be paid to the issuer of the policy as a result of, for example, the policy being converted. For example, the seller participant may pay such a fee, the buyer participant may pay such a fee, or a combination of both the buyer and seller participants may pay proportionate parts of the fee (possibly equal amounts or non-equal amounts). As to which participant(s) will pay the fee may be predetermined, for example, by system 100/an administrator thereof. As another example, the seller participant (e.g., as part of indicating a desire to sell the policy) may specify/determine which participant(s) will pay the fee and possibly in what proportions. In either case, server 104 may make such information available to a possible/potential buyer participant when the participant requests to view information on the policy. According to another embodiment of the invention, system 100/an owner thereof, may cover/pay at least in part of the fee. Such a payment may be made as an incentive, for example, for a seller participant to sell the policy as a delayed conversion.

How the fee/premium payment is paid to the issuer may occur in various fashions. For example, the seller participant and/or the buyer participant may pay the fee (or a portion thereof) directly to the issuer. Alternatively, the seller participant and/or the buyer participant may pay the fee (or a portion thereof) to system 100/an administrator thereof, which may then pay the fee to the issuer. Alternatively, back office clearing center 112/system 100/an administrator thereof, for example, may deduct such fees from an account of the buyer participant and/or an account of the seller participant and then pay such fees to the issuer. Alternatively, in the process of transferring monetary funds from the buyer participant to the seller participant in exchange for the sold policy, for example, back office clearing center 112/system 100/an administrator thereof, for example, may deduct such fees from these funds and then pay such fees to the issuer. One skilled in art the will recognize that the fee may be paid in other fashions.

As generally described above, server 104, as part of a notification to a seller participant that the participant may convert a policy, may also indicate to the participant that the participant may either convert the policy to a permanent policy and then sell the permanent policy and/or that the participant may delay the conversion of the policy until after the policy is sold. According to another embodiment of the invention, server 104 may not provide such a notification. In other words, a seller participant may know a term policy can be converted to a permanent policy prior to sale. Accordingly, in the course of a seller participant indicating to server 104 (and similarly server 704) a desire to sell the policy, server 104 may provide, such as via a graphical interface/display at a workstation 101, an indication/option that if the policy is a convertible term policy, the participant may sell the policy as a delayed conversion. Thereafter, the seller participant may select such an option, for example, with the sale of the policy proceeding as described above, for example.

According to another embodiment of the invention, in response to the participant selecting such an option, server 104 may first provide, via workstation 101 for example, information related to a determined value/benefit in converting the term policy to a permanent policy and/or may provide a determination (e.g., a recommendation) as to whether there is value or no value in converting the policy, as described above (such information/determinations may take into consideration as to whether the seller participant will be paying any of the fees/premiums to convert the policy). Again, server 104 may provide such information automatically and/or query the participant as to whether the participant wishes to obtain such information (possibly for a fee). After presenting such information, for example, to the participant, server 104 may again present the participant with the option to sell the policy as a delayed conversion, which option the participant may accept or decline.

According to another embodiment of the invention, rather than server 104 providing such information in response to the participant selecting the option to sell the policy as a delayed conversion, server 104 may provide the participant (together with the option to sell the policy as a delayed conversion) the ability to request from server 104 such information (possibly for a fee). After viewing such information, for example, the participant may proceed or not proceed with the delayed conversion.

According to another embodiment of the invention and as similarly discussed above, system 100/an owner thereof, for example, may charge a different service fee structure (i.e., for assisting in the transfer of the policy) when a seller participant decides to sell a policy as a delayed conversion as compared to when the seller participant decides to sell the policy as a term policy.

Converting a Term Policy to a Permanent Policy—Covering Premium Payments

As discussed above, when converting a term policy to a permanent policy and transferring/selling the permanent policy, a seller participant may need to pay an initial fee/make a payment(s), such as an initial/increased premium payment, to the issuer of the policy as a result of, for example, the permanent policy costing more than the term policy. According to an embodiment of the invention, system 100 (and similarly system 700)/an owner thereof, for example, (hereinafter collectively referred to as system 100) may assist a seller participant in covering this payment, at least in part. In other words, system 100 may pay the fee/premium payment on behalf of the seller participant and in addition, may then later recoup the paid premium payment (possibly in addition to a service fee) from the buyer participant and/or the seller participant, possibly from the proceeds paid by the buyer participant for the policy. According to a further embodiment of the invention, system 100 may also assist the seller participant in covering any premium payment(s), at least in part, that may come due while the policy is in the pending, active/live, and/or closed states and prior to closing on the sale of the policy, for example. Again, system 100 may pay the fee/premium payment(s) on behalf of the seller participant and in addition, may then later recoup the paid premium payment(s) (possibly in addition to a service fee) from the buyer participant and/or the seller participant, possibly from the proceeds paid by the buyer participant for the policy.

For example, once a seller participant makes an indication to server 104 to convert a term policy to a permanent policy as described in various embodiments above, server 104 may query the participant, such as via a workstation 101, and thereby offer the participant the option of having system 100 cover, at least in part, one or more of the fees/premium payments. For example, the query may include an indication to cover all and/or a part of the initial/increased premium payment that may result from the policy conversion, an indication to cover all and/or a part of any premium payment that may come due while the policy is in, for example, the pending, active, and/or closed states and prior to closing on the transfer/sale of the policy, an indication to cover all and/or a part of only a designated number of premium payments that may come due while the policy is in, for example, the pending, active, and/or closed states, an indication to cover up to a designated amount in total of premium payments (including, for example, the initial payment) that may come due, etc. As another example, the query may also include an option of allowing the seller participant to indicate the amount and/or number of premium payments the participant may want system 100 to cover. One skilled in the art will recognize that other variations are possible. Thereafter, the participant may respond to server 104, via a workstations 101, for example, either in the affirmative or the negative and in particular, my also indicate (depending on the form of the query) an amount and/or number of premium payments the participant would like covered (which amount and/or number may be less than and/or equal to the offer, for example).

As another example, in response to a seller participant indicating to server 104 that the participant does not want to convert a policy as discussed above, server 104 may query the participant and thereby offer the participant the option of having system 100 cover, at least in part, one or more of the fees/premium payments, as discussed above. In this fashion, server 104 may offer an incentive to convert the policy. Thereafter, the participant may respond to server 104, as discussed above, indicating a desire to convert the policy and to have system 100 cover, at least in part, one or more of the fees/premium payments for example.

As another example, prior to server 104 querying the participant regarding premium payments as discussed above, server 104/an administrator thereof may first make a determination (as further discussed below) as to whether system 100 should cover one or more of the fees/premium payments and/or the amount and/or number of premium payments to cover and based on this determination either make the offer or not make the offer to the participant to cover premium payments, as discussed above. Assuming server 104 makes the offer, the participant may thereafter respond to server 104 either in the affirmative or the negative and in particular, my also indicate (depending on the form of the query) an amount and/or number of premium payments the participant would like covered (which amount and/or number may be less than and/or equal to the offer, for example).

As further example, in response to a seller participant making an indication to server 104 to convert a term policy to a permanent policy (or to not convert the policy), server 104 may indicate to the participant that system 100 "can possibly" cover one or more of the fees/premium payments and whether the participant would like this option. Assuming the participant responds in the affirmative, server 104 may then make a determination (as further discussed below) as to whether system 100 should cover one or more of the fees/premium payments and/or the amount and/or number of premium payments to cover and based on this determination either make the offer or not make the offer to the participant, as discussed above. Assuming server 104 extends the offer, the participant may thereafter respond to server 104 either in the affirmative or the negative and in particular, may also indicate (depending on the form of the query) an amount and/or number of premium payments the participant would like covered (which amount and/or number may be less than and/or equal to the offer, for example).

As another example, rather than server 104 initiating a query/offer to the participant as to whether the participant wants system 100 to cover one or more of the fees/premium payments, a seller participant, as part of attempting to sell a convertible term policy, for example, and/or while selling a term policy (e.g., while the policy is in the active state), for example, etc. may query (make a request to) server 104 via workstation 101, such as via graphical interface/provided option, for system 100 to cover such fees/premium payments. For example, the query/request may include a general request to cover such fees/premium payments and/or may include an indication as to an amount and/or number of premium payments the participant may want system 100 to cover. In response thereto, server 104 may respond in the affirmative or negative to the request and/or may possibly indicate an amount and/or number of premium payments system 100 will cover. Alternatively, server 104 may first make a determination (as further discussed below) as to whether system 100 should cover one or more of the fees/premium payments and/or an amount and/or number of premium payments to cover and based on this determination either make an offer or not make an offer to the participant. In both cases (assuming the system 100 will cover one or more premiums), depending on the form of the query from the participant, the amount and/or number of premium payments system 100 will cover may or may not be the same as the participant's request. Regardless, depending on the form of the response from the server, the participant may thereafter respond to server 104, if appropriate, either in the affirmative or the negative and may also indicate an amount and/or number of premium payments the participant would like covered (which amount and/or number may be less than and/or equal to that offered in a response from the server, for example). One skilled in the art will recognize that how system 100 may come to cover or not cover the fee/premium payments may occur in other fashions than those described above.

Assuming that system 100 will cover the initial fee/increased premium payment (or a portion thereof) and that the participant wants the system to cover such a payment, thereafter the participant may convert the policy to a permanent policy and submit/list the permanent policy with server 104, with system 100 paying at least a portion of the fee/increased premium payment for the conversion. In particular, the participant may pay the issuer the fee or a portion thereof, for example, with system 100 reimbursing the participant, such as by transferring funds to an account of the participant. As another example and/or in addition, system 100 may directly pay the issuer the fee or a portion thereof based on, for example, authorization from the participant. In either or both cases, for example, assuming system 100/an owner thereof, for example, is to recoup the paid fee/premium payment, the seller participant may also enter into one or more agreements with system 100/an owner thereof regarding how system 100 may be repaid the fee/premium payment including for example, who may be responsible for repaying the fee/premium payment, what amount of the fee/premium payment must be repaid, how the fee/premium payment will be repaid, whether there are any service charges, for example, in connection with system 100 having paid the fee/premium payment, etc. In general, server 104 may make available to a participant, such as a buyer participant, that requests to view information on the permanent policy any of i) that system 100 has paid at least in part the initial fee/increased premium payment, ii) the amount of the fee paid, iii) whether the fee is to be repaid, iv) whether there are service fees associated with repayment, v) who is to repay the fees/premium payment and/or service fees, etc. Regardless, the policy may thereafter proceed to the active state, for example, where bids, for example, may be received on the permanent policy and then proceed to the closed state, for example, where a buyer participant/winning bidder/bid amount, for example, may be determined and the purchased policy cleared.

Similarly, assuming that system 100 will cover one or more premium payments (or portions thereof) that may come due while the policy is in, for example, the pending, active, and/or closed states and prior to a closing on the sale of the policy and that the participant wants the system to cover such payment(s), system 100 may pay these premium payments as they come due. In particular, as a premium payment comes due, the participant may pay the issuer the payment or a portion thereof, for example, with system 100 reimbursing the participant, such as by transferring funds to an account of the participant. As another example and/or in addition, system 100 may directly pay the issuer the fee or a portion thereof based on, for example, authorization from the participant. In either or both cases, for example, assuming system 100/an owner thereof, for example, is to recoup the paid premium payment(s), the seller participant may also enter into one or more agreements (such as those discussed above) with system 100/an owner thereof regarding how system 100 may be repaid the premium payment(s) including for example, who may be responsible for repaying the premium payment(s), what amount of the premium payment(s) must be repaid, how the premium payment(s) will be repaid, whether there are any service charges, for example, in connection with system 100 having paid the premium payment(s), etc. In general, server 104 may make available to a participant, such as a buyer participant, that requests to view information on the permanent policy any of i) that system 100 has paid at least in part one or more premium payments, ii) the amount system 100 has paid as of the time the participant is viewing the policy, for example, iii) whether the amount paid is to be repaid, iv) whether there are service fees associated with repayment, v) who is to repay the premium payments and/or service fees, etc.

Should Premium Payments be Covered

As discussed above, server 104 may make a determination as to whether system 100 should cover, at least in part, the initial fee/increased premium payment for converting a term policy to permanent policy, and if so, an amount it will cover. Similarly, as discussed above server 104 may also make a determination as to whether system 100 should cover, at least in part, one or more subsequent premium payments that may come due while the policy is in, for example, the pending, active, and/or closed states and prior to closing on the sale of the policy, and if so, a number and/or a total amount of such payments it will cover. According to an embodiment of the invention, server 104/an administrator thereof may make such determinations based at least in part on one or more of the following factors:

1. The amount of the initial fee/increased premium payment for converting the term policy to a permanent policy.
2. The amount of the premium payment for the permanent policy.
3. When the premium payments are due.
4. An estimated number of premium payments system 100 may need to make, which estimate may be based at least in part on a determined estimated duration of time the policy may be in the pending, active, and/or closed states, for example. Server 104 may determine an estimated duration of time the policy may be in the active state, for example, by determining a length of the auction period (e.g., as specified by the seller participant). Server 104 may also determine an estimated duration of time the policy may be in the active state, for example, by determining how fast the policy may sell, such as how fast a trade it now price may be reached. Such a determination may be made, for example, by comparing, for example, an estimated sale/monetary value of the permanent policy (as discussed above) to a trade it now price (as specified by the seller participant). For example, a policy that has an estimated value that exceeds the trade it now price may sell quickly, with the converse also being possible. Server 104 may also determine an estimated duration of time the policy may be in the active state, for example, by comparing, for example, an estimated sale/monetary value of the permanent policy to a minimum bid/selling price/amount and/or starting bid amount the seller participant is willing to accept for the policy. For example, a policy that has an estimated value that is below the minimum bid amount may not sell quickly, with the converse also being possible. Server 104 may also determine an estimated duration of time the policy may be in the active state, for example, by determining how fast the policy may have transferred/sold in the past. Server 104 may determine an estimated duration of time the policy may be in the closed state, for example, by determining an estimate length for the policy to clear.

5. A risk that the policy may not sell. Server 104 may make this determination by comparing an estimated sale/monetary value of the permanent policy to a minimum bid/selling price/amount and/or starting bid amount the seller participant is willing to accept for the policy. For example, a policy that has an estimated value that is below the minimum bid amount may not sell, with the converse also being true.

6. Whether system 100 is already covering premium payments of one or more other policies also being sold by the seller participant and/or a total amount of such premium payments being covered. For example, if system 100 has already covered and/or is obligated to cover a large number/amount of premium payments of one or more other policies also being sold by the seller participant, system 100 may not want to cover additional premium payments.

7. A credit history/ranking of the seller participant. For example, if the seller participant has a bad credit history/ranking and the policy does not sell, the seller participant may not be able to repay the premium payments system 100 has paid.

Accordingly, server 104/an administrator may be able to determine/estimate, for example, a total number of premium payments system 100 may need to cover until a policy clears, for example. In addition, server 104/an administrator may be able to determine a risk of the policy not selling and/or a risk of not being repaid for covered premiums, for example. Accordingly, based on the total number of premium payments system 100 may need to cover and the risk of not being repaid for covered premiums, server 104/an administrator may determiner whether system 100 should cover, at least in part, one or more premium payments, and if so, a number and/or a total amount of such payments it will cover. One skilled in the art will recognize that server 104/an administrator may make such determinations in other fashions.

Repaying Covered Premium Payments

As discussed above, assuming system 100 pays one or more premium payments/portions thereof, system 100 may later recoup these payments and possibly a service fee for making these payments. With respect to the service fee, such a fee may be a straight/flat fee and/or may be a time based interest fee that is computed over the period of time from when each premium payment is made on behalf of the seller participant and subsequently repaid, for example. One skilled in the art will recognize that other fee structures are possible. Alternatively, no service fee may be assessed. As to the type and/or amount of a service fee, this may be predetermined, for example, by system 100/an administrator thereof. Alternatively, the seller participant may be given an option as to the type of service fee and/or may be able to negotiate the amount of the fee.

With respect to recouping any premium payments paid and possibly a service fee, system 100 may be repaid such premium payments (in whole or in part) and the service fee as part of a clearing of a transfer/sale of the policy, for example, from the seller participant to a buyer participant. For example, according to various embodiments of the invention, the seller participant may repay such premium payments/service fee, the buyer participant may repay the premium payments/service fee, or a combination of both the buyer and seller participants may repay proportionate parts of the premium payments/service fee (possibly equal amounts or non-equal amounts). As to which participant(s) will repay the premium payments/service fee may be predetermined, for example, by server 104/system 100/an administrator thereof, etc. As another example, the seller participant may specify/determine which participant(s) will repay the premium payments/service fee and possibly in what proportions. Again, server 104 may make available to a participant, such as a buyer participant, that requests to view information on the policy any of i) that system 100 has paid at least in part one or more premium payments, ii) the amount of the premium payments paid, iii) whether the premium payments are to be repaid and the amount to be repaid, iv) whether there is a service fee, v) who is to repay the premium payments and/or service fee, etc.

Example ways in which system 100 may recoup the premium payments/service fee may include:

1. The seller participant and/or the buyer participant may repay the premium payments/service fee directly to system 100/an administrator thereof.
2. Back office clearing center 112/system 100/an administrator thereof, for example, may deduct the premium payments/service fee from an account of the buyer participant and/or an account of the seller participant.
3. In the process of transferring monetary funds (e.g., the winning bid amount/proceeds/sale price from the sale of the policy) from the buyer participant to the seller participant in exchange for the transferred/sold policy, back office clearing center 112/system 100/an administrator thereof, for example, may deduct at least in part the premium payments/service fee from these funds, transferring the premium payments/service fee to system 100/an administrator thereof and transferring the remaining funds at least in part to the seller participant (e.g., other portions of the funds may be transferred to brokers and/or to system 100 for assisting in the transfer of the policy). Again, such a transferring of monetary funds may include, for example, receiving from the buyer participant the funds and sending the funds to the seller participant and/or an account to account transfer, and/or a combination thereof, etc.
4. In the process of transferring monetary funds (e.g., the winning bid amount/proceeds/sale price from the sale of the policy) from the buyer participant to the seller participant in exchange for the transferred/sold policy, back office clearing center 112/system 100/an administrator thereof, for example, may receive both the sale price/winning bid amount and the premium payments/service fee, at least in part, from the buyer participant and then transfer the premium payments/service fee to system 100/an administrator thereof and the sale price/winning bid amount, at least in part, to the seller participant.

One skilled in art the will recognize that system 100 may recoup the premium payments/service fees paid in other fashions.

Assuming, for example, that a policy does not sell and that system 100 has paid at least in part one or premium payments, to recoup any premium payments paid and possibly a service fee, system 100 may collect the premium payments/service fee from the seller participant (e.g., transfer such funds from an account of the participant) at the time a transfer/sale is determined to not have occurred (e.g., will not occur), for example. As another example, system 100 may maintain an interest in the policy, and later recoup any premium payments/service fee at later time when the policy is sold. During this time, system 100 may continue to cover, at least part, the premium payments. As another example, system 100/an administrator thereof may recoup the premium payments/service fee from the sale/proceeds of another policy being sold by the seller participant.

System Covered Premium Payments

As discussed above, when converting a term policy to a permanent policy and selling the permanent policy, system 100 may pay the initial/increased premium payment and/or any subsequent premium payments on behalf of the seller participant as they come due. According to another embodiment of the invention, system 100 (and similarly system 700)/an owner thereof, for example, (hereinafter collectively referred to as system 100) may assist the seller participant of any type of policy listed/maintained on system 100, such as for transfer/sale, in covering any premium payment(s), at least in part, that may come due while the policy is in, for example, the pending, active, and/or closed states and in particular, that may come due while the policy is in the pending, active, and/or closed states and prior to a closing on the transfer/sale of the policy. System 100 may pay the premium payment(s) on behalf of the seller participant and in addition, may then later recoup the premium payment(s) (possibly in addition to a service fee) from a buyer participant and/or the seller participant, possibly from the proceeds paid by the buyer participant for the policy.

For example, as a seller participant makes an indication to server 104 to sell a policy as described in various embodiments above, server 104 may query the participant, such as via a workstation 101, and thereby offer the participant the option of having system 100 cover, at least in part, one or more of the premium payments. For example, the query may include an indication to cover all and/or a part of any premium payment that may come due while the policy is in, for example, the pending, active, and/or closed states and prior to closing on the sale of the policy, an indication to cover all and/or a part of only a designated number of premium payments that may come due while the policy is in the pending, active, and/or closed states, an indication to cover up to a designated amount in total of premium payments that may come due, etc. As another example, the query may also include an option of allowing the seller participant to indicate the amount and/or number of premium payments the participant may want system 100 to cover. One skilled in the art will recognize that other variations are possible. Thereafter, the participant may respond to server 104, via a workstation 101, for example, either in the affirmative or the negative and in particular, may also indicate (depending on the form of the query from server 104) an amount and/or number of premium payments the participant would like covered (which amount and/or number may be less than and/or equal to the offer, for example).

As another example, prior to server 104 querying the participant as discussed above, server 104/an administrator thereof may first make a determination as to whether system 100 should cover one or more of the premium payments and/or the amount and/or number of premium payments to cover and based on this determination either make the offer or not make the offer to the participant, as discussed above. As similarly discussed above, server 104/an administrator thereof may make such a determination based at least in part on one or more factors such as, for example, the amount of the premium payment, when the premium payments are due, an estimated number of premium payments system 100 may need to make, a risk that the policy may not transfer/sell, whether system 100 is already covering premium payments of one or more other policies also being sold by the seller participant and/or a total amount of such premium payments being covered, a credit history/ranking of the seller participant, etc. Assuming server 104 makes the offer, in response to the query, the participant may thereafter respond to server 104 either in the affirmative or the negative and in particular, my also indicate (depending on the form of the query) an amount and/or number of premium payments the participant would like covered (which amount and/or number may be less than and/or equal to the offer, for example).

As further example, in response to a seller participant making an indication to server 104 sell a policy, server 104 may indicate to the participant that system 100 "can possibly" cover one or more of the premium payments and whether the participant would like this option. Assuming the participant responds in the affirmative, server 104 may then make a determination as to whether system 100 should cover one or more of the premium payments and/or the amount and/or number of premium payments to cover and based on this determination either make the offer or not make the offer to the participant, as discussed above. Assuming server 104 extends the offer, the participant may thereafter respond to server 104 either in the affirmative or the negative and in particular, may also indicate (depending on the form of the query) an amount and/or number of premium payments the participant would like covered (which amount and/or number may be less than and/or equal to the offer, for example).

As another example, rather than server 104 initiating a query/offer to the participant as to whether the participant wants system 100 to cover one or more of the premium payments, a seller participant, as part of making an indication to server 104 to a sell a policy, for example, may query (make a request to) server 104 via workstation 101, such as via graphical interface/provided option, for system 100 to cover such premium payments. For example, the query/request may include a general request to cover the premium payments and/or may include an indication as to an amount and/or number of premium payments the participant may want system 100 to cover. In response thereto, server 104 may respond in the affirmative or negative to the request and/or may possibly indicate an amount and/or number of premium payments system 100 will cover. Alternatively, server 104 may first make a determination as to whether system 100 should cover one or more of the premium payments and/or an amount and/or number of premium payments to cover and based on this determination either make an offer or not make an offer to the participant. In both cases (assuming the system 100 will cover one or more premiums), depending on the form of the query from the participant, the amount and/or number of premium payments system 100 will cover may or may not be the same as the participant's request. Regardless, depending on the form of the response from the server, the participant may thereafter respond to server 104, if appropriate, either in the affirmative or the negative and may also indicate an amount and/or number of premium payments the participant would like covered (which amount and/or number may be less than and/or equal to that offered in a response from the server, for example).

As another example, rather than server 104 initiating a query/offer to the seller participant as the participant accesses server 104 to transfer/sell a policy, server 104 may allow a participant to submit the policy for sale and allow the policy to proceed, for example, to the active state where bids, for example, may be received for the policy and/or to the closed state, for example, where, for example, the policy may be cleared after determining a buyer participant/winning bid, for example. During the course of receiving bids and/or clearing the policy, for example, server 104 may then query/offer to the seller participant as to whether the participant wants system 100 to cover one or more of the premium payments that may come due while the policy is in the active and/or closed states, for example. Server 104 may initiate the query/offer based at least in part on determining that a premium payment is coming due and/or based at least in part on determining that the seller participant has made a certain number of premium payments since listing the policy for sale. One skilled in the art will recognize that server 104 may initiate the query/offer based on other factors. Again, prior to making the offer, server 104 may first make a determination as to whether system 100 should cover one or more of the premium payments and/or the amount and/or number of premium payments to cover and based on this determination either make the offer or not make the offer to the participant, as discussed above. In general, server 104 provide query the participant via a workstation 101, assuming the seller participant is accessing system 100. As another example, server 104 may cause some other electronic based notification to be sent to the seller participant, such as via email, page, fax, short message service, automated voice system, etc. As a further example, server 104 may cause an administrator of server 104, for example, to contact the seller participant. Assuming server 104 extends the offer, the participant may thereafter respond to server 104 either in the affirmative or the negative and in particular, my also indicate (depending on the form of the query) an amount and/or number of premium payments the participant would like covered (which amount and/or number may be less than and/or equal to the offer).

As another example, a seller participant may list a policy for sale and allow the policy to proceed, for example, to the active state, for example, where bids, for example, may be received for the policy and/or to the closed state, for example, where, for example, the policy may be cleared after determining a buyer participant/winning bid, for example. During the course of receiving bids and/or clearing the policy, for example, the seller participant may query (make a request to) server 104 via workstation 101, such as via graphical interface/provided option, for system 100 to cover one or more premium payments. Again, the query/request may include, for example, a general request to cover the premium payments and/or may include an indication as to an amount and/or number of premium payments the participant may want system 100 to cover.

In response thereto, server 104 may respond in the affirmative or negative to the request and/or may possibly indicate an amount and/or number of premium payments system 100 will cover. Alternatively, server 104 may first make a determination as to whether system 100 should cover one or more of the premium payments and/or an amount and/or number of premium payments to cover and based on this determination either make an offer or not make an offer to the participant. In both cases (assuming the system 100 will cover one or more premiums), depending on the form of the query from the participant, the amount and/or number of premium payments system 100 will cover may or may not be the same as the participant's request. Regardless, depending on the form of the response from the server, the participant may thereafter respond to server 104, if appropriate, either in the affirmative or the negative and may also indicate an amount and/or number of premium payments the participant would like covered (which amount and/or number may be less than and/or equal to that offered in a response from the server, for example).

One skilled in the art will recognize that how system 100 may come to cover or not cover the premium payment(s) may occur in other fashions than those described above.

As similarly discussed above, assuming that system 100 will cover one or more premium payments (or portions thereof) that may come due while the policy is in, for example, the pending, active, and/or closed states and prior to, for example, a closing on the sale of the policy and that the participant wants the system to cover such payment(s), system 100 may pay these premium payments as they come due. In particular, as a premium payment comes due, the participant may pay the issuer the payment or a portion thereof, for example, with system 100 reimbursing the participant, such as by transferring funds to an account of the participant. As another example and/or in addition, system 100 may directly pay the issuer the fee or a portion thereof based on, for example, authorization from the participant. In either or both cases, for example, assuming system 100/an owner thereof, for example, is to recoup the paid premium payment(s), the seller participant may also enter into one or more agreements (such as those discussed above) with system 100/an owner thereof regarding how system 100 may be repaid the premium payment(s) including for example, who may be responsible for repaying the premium payment(s), what amount of the premium payment(s) must be repaid, how the premium payment(s) will be repaid, whether there is a service fee(s), for example, in connection with system 100 having paid the premium payment(s), etc. With respect to the service fee, again, such a fee may be a straight/flat fee and/or may be a time based interest fee that is computed over the period of time from when each premium payment is made on behalf of the seller participant and subsequently repaid, for example. One skilled in the art will recognize that other fee structures are possible. Alternatively, no service fee may be assessed. As to the type and/or amount of a service fee, this may be predetermined, for example, by system 100/an administrator thereof. Alternatively, the seller participant may be given an option as to the type of service fee and/or may be able to negotiate the amount of the fee.

Again, server 104 may make available to a participant, such as a buyer participant, that requests to view information on a policy any of i) that system 100 has paid at least in part one or more premium payments, ii) the amount system 100 has paid as of the time the participant is viewing the policy, for example, iii) whether the amount paid is to be repaid, iv) whether there is service fee associated with repayment, v) who is to repay the premium payments and/or service fee, etc.

Again, system 100 may recoup the premium payments/service fee in similar fashions as discussed above.

Buyer Participant Covered Premium Payments

According to another embodiment of the invention, a seller participant may pay each of the premium payments that may come due while a policy is for sale including, for example, while the policy is in, for example, the pending, active, and/or closed states and prior to, for example, a closing on the sale of the policy. However, server 104, for example, may track each payment made and once a buyer participant/winning bid, for example, is determined for the policy, add at least a portion of the premiums paid to the winning bid amount. In this fashion, the buyer participant may pay the seller participant, at least in part, for the premium payments made while the policy is in the pending, active, and/or closed states.

As an example, a seller participant, as part of making an indication to server 104 to a sell a policy, for example, may query (make a request to) server 104 via workstation 101, such as via graphical interface/provided option, for this option. The seller participant may also indicate for example, whether all or a portion of the premium payments paid should be transferred to the buyer, the number of payments that should be transferred, whether only payments made during certain states (e.g., the active state) should be transferred, etc.

Again, server 104 may make available to a participant, such as a buyer participant, that requests to view information on the policy that the seller participant has placed this restriction/option upon the policy.

Guidelines for Interpreting the Present Application

Terms

The term "herein" means "in the present application, including anything which may be incorporated by reference", unless expressly specified otherwise.

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The terms "including", "comprising" and variations thereof mean "including but not limited to", unless expressly specified otherwise.

The term "plurality" means "two or more", unless expressly specified otherwise.

The terms "a", "an" and "the" mean "one or more", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things, does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The phrase "based on" does not mean "based only on", unless expressly specified otherwise. In other words, the phrase "based on" describes both "based only on" and "based at least on". The phrase "based at least on" is equivalent to the phrase "based at least in part on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Indication

The term "indication" is used in an extremely broad sense. The term "indication" may, among other things, encompass a sign, symptom, or token of something else.

The term "indication" may be used to refer to any indicia and/or other information indicative of or associated with a subject, item, entity, and/or other object and/or idea.

As used herein, the phrases "information indicative of" and "indicia" may be used to refer to any information that represents, describes, and/or is otherwise associated with a related entity, subject, or object.

Indicia of information may include, for example, a code, a reference, a link, a signal, an identifier, and/or any combination thereof and/or any other informative representation associated with the information.

In some embodiments, indicia of information (or indicative of the information) may be or include the information itself and/or any portion or component of the information. In some embodiments, an indication may include a request, a solicitation, a broadcast, and/or any other form of information gathering and/or dissemination.

Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g., weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a particular sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

Incorporation by Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An apparatus comprising at least one computing device having instructions associated therewith that when executed by the at least one computing device make the at least one computing device operable to:
   receive from a workstation in use by a participant a request to obtain information on insurance policies that match at least one criteria;
   forward the request to a server, in which the server is configured to control the purchasing and selling of insurance policies;
   receive from the server information on at least one insurance policy that matched the at least one criteria, in which the information on the at least one insurance policy includes:
      first information, and
      second information;
   compare the second information on the at least one insurance policy to at least one predefined characteristic;
   determine that there is a match between the second information and the at least one predefined characteristic;
   based at least in part on determining that there is the match between the second information and the at least one predefined characteristic, filter-out the at least one insurance policy such that the information on the at least one insurance policy is not communicated to the workstation in use by the participant, and in which filtering-out the at least one insurance policy further includes not providing to the server the at least one predefined characteristic;
   determine that there is not a match between the second information and the at least one predefined characteristic; and
   based at least in part on determining that there is not the match between the second information and the at least one predefined characteristic, communicate the first information but not the second information on the at least one insurance policy to the workstation in use by the participant.

2. The apparatus of claim 1, in which the request comprises a search request to obtain, from a plurality of insurance policies, information on those insurance policies that match the at least one criteria.

3. The apparatus of claim 1, in which the request and the at least one criteria comprise a request to obtain, from a plurality of insurance policies, information on those insurance policies for which bids to purchase the policies may be made by the participant.

4. The apparatus of claim 1,
   in which the at least one criteria comprises a specified insurance policy; and
   in which the request comprise a request to obtain, from a plurality of insurance policies, information on insurance policies that are related to the specified insurance policy.

5. The apparatus of claim 1, in which the at least one predefined characteristic is specified by the participant.

6. The apparatus of claim 5, in which the instructions, that when executed by the at least one computing device make the at least one computing device further operable to obtain the at least one predefined characteristic from a database.

7. The apparatus of claim 1, in which the request comprises the at least one predefined characteristic.

8. The apparatus of claim 1,
   in which the at least one predefined characteristic comprises an identity of a possible insured; and
   in which to determine that there is the match between the second information and the at least one predefined characteristic comprises to determine that an insured of the at least one insurance policy matches the identity of the possible insured.

9. The apparatus of claim 1,
   in which the at least one predefined characteristic comprises an identity of a possible owner of insurance policies; and
   in which to determine that there is a match between the second information and the at least one predefined characteristic comprises to determine that an owner of the at least one insurance policy matches the identity of the possible owner of insurance policies.

10. The apparatus of claim 1,
    in which the at least one predefined characteristic comprises an identity of an individual; and
    in which to determine that there is a match between the second information and the at least one predefined characteristic comprises to determine that an insured of the at least one insurance policy is related to the individual.

11. The apparatus of claim 1,
    in which the first information comprises information accessible to the participant even though the participant may not own the at least one insurance policy; and
    in which the second information comprises information not accessible to the participant unless the participant owns the at least one insurance policy.

12. The apparatus of claim 11, in which the second information comprises an identity of at least one insured of the at least one insurance policy.

13. The apparatus of claim 11, in which the second information comprises an identity of at least one owner of the at least one insurance policy.

14. The apparatus of claim 1, in which different entities own the server and the at least one computing device.

15. An apparatus comprising at least one computing device having instructions associated therewith that when executed by the at least one computing device make the at least one computing device operable to:
receive from a server information on at least one insurance policy, in which the server is configured to control the purchasing and selling of insurance policies, and in which the information on the at least one insurance policy includes:
first information, and
second information;
compare the second information on the at least one insurance policy to at least one predefined characteristic;
determine that there is a match between the second information and the at least one predefined characteristic;
based at least in part on determining that there is the match between the second information and the at least one predefined characteristic, filter-out the at least one insurance policy such that the information on the at least one insurance policy is not communicated to a workstation in use by a participant, and in which filtering-out the at least one insurance policy further includes not providing to the server the at least one predefined characteristic;
determine that there is not a match between the second information and the at least one predefined characteristic; and
based at least in part on determining that there is not the match between the second information and the at least one predefined characteristic, communicate the first information but not the second information on the at least one insurance policy to the workstation.

16. The apparatus of claim 15,
in which the at least one predefined characteristic comprises an identity of a possible insured; and
in which to determine that there is the match between the second information and the at least one predefined characteristic comprises to determine that an insured of the at least one insurance policy matches the identity of the possible insured.

17. The apparatus of claim 15,
in which the first information comprises information accessible to the participant even though the participant may not own the at least one insurance policy; and
in which the second information comprises information not accessible to the participant unless the participant owns the at least one insurance policy.

18. The apparatus of claim 15,
in which different entities own the server and the at least one computing device.

19. A method comprising:
receiving, by at least one computing device, from a workstation is use by a participant a request to obtain information on insurance policies that match at least one criteria;
forwarding, by the at least one computing device, the request to a server, in which the server is configured to control the purchasing and selling of insurance policies;
receiving, by the at least one computing device, from the server information on at least one insurance policy that matched the at least one criteria, in which the information on the at least one insurance policy includes:
first information, and
second information;
comparing, by the at least one computing device, the second information on the at least one insurance policy to at least one predefined characteristic;
determining, by the at least one computing device, that there is a match between the second information and the at least one predefined characteristic; and
based at least in part on determining that there is the match between the second information and the at least one predefined characteristic, filtering-out, by the at least one computing device, the at least one insurance policy such that the information on the at least one insurance policy is not communicate to the workstation in use by the participant, and in which filtering-out the at least one insurance policy further includes not providing to the server the at least one predefined characteristic.

20. The method of claim 19,
in which the at least one predefined characteristic comprises an identity of a possible insured; and
in which determining that there is the match between the second information and the at least one predefined characteristic comprises determining that an insured of the at least one insurance policy matches the identity of the possible insured.

* * * * *